US008983955B2

(12) United States Patent
Lessing et al.

(10) Patent No.: US 8,983,955 B2
(45) Date of Patent: *Mar. 17, 2015

(54) MALTWEB MULTI-AXIS VIEWING INTERFACE AND HIGHER LEVEL SCOPING

(71) Applicant: Timebase PTY Limited, Sydney, New South Wales (AU)

(72) Inventors: Abha Lessing, Bondi Junction (AU); Christophe Schnelle, Ranwick (AU); Peter Mariani, Warrington (AU)

(73) Assignee: Timebase PTY Limited, Sydney NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/722,333

(22) Filed: Dec. 20, 2012

(65) Prior Publication Data

US 2013/0124975 A1    May 16, 2013

Related U.S. Application Data

(63) Continuation of application No. 11/600,778, filed on Nov. 17, 2006, now Pat. No. 8,386,484, which is a continuation of application No. 09/689,927, filed on Oct. 12, 2000, now Pat. No. 7,293,228, which is a (Continued)

(30) Foreign Application Priority Data

Jan. 31, 1997    (AU) ...................................... PO4892

(51) Int. Cl.
*G06F 17/30*  (2006.01)
*G06F 17/22*  (2006.01)

(52) U.S. Cl.
CPC ...... *G06F 17/2247* (2013.01); *G06F 17/30333* (2013.01); *G06F 17/30914* (2013.01)

USPC .......................................................... 707/736

(58) Field of Classification Search
None
See application file for complete search history.

(56) References Cited

U.S. PATENT DOCUMENTS 4,558,413 A    12/1985   Schmidt et al.
4,627,019 A    12/1986   Ng (Continued)

FOREIGN PATENT DOCUMENTS

WO    98/34179    5/1997
WO    97/15890    8/1998

OTHER PUBLICATIONS

Dozier, C., Morton, J., "Introduction to Westlaw Database File Organization,"(1991).

(Continued)

*Primary Examiner* — Bai D. Vu
(74) *Attorney, Agent, or Firm* — Clifford H. Kraft

(57) ABSTRACT

A method, apparatus and computer program product for navigating in a multi-dimensional space containing an electronic publication formed from predefined portions of text-based data encoded using a markup language are disclosed. A selected predefined portion is displayed in a first display region. A point on a primary axis of the multi-dimensional space corresponding to the displayed pre-defined portion is also displayed. Also, a method, apparatus and computer program product for publishing an electronic publication formed from predefined portions of text-based data encoded using a markup language are also disclosed. Predefined portions are stored in terminal nodes. Higher level nodes are provided for organizing the terminal nodes into an hierarchical structure embodied in said electronic publication. Each higher level node contains the identity of a parent node, a position indicator for the higher level node and an associated identifier.

86 Claims, 23 Drawing Sheets

Related U.S. Application Data continuation-in-part of application No. 09/108,999, filed on Jul. 1, 1998, now Pat. No. 6,233,592, which is a continuation of application No. PCT/AU98/00050, filed on Jan. 30, 1998.

(56) References Cited

U.S. PATENT DOCUMENTS

| | | |
|---|---|---|
| 4,714,992 A | 12/1987 | Gladney et al. |
| 4,853,843 A | 8/1989 | Ecklund |
| 4,875,159 A | 10/1989 | Cary et al. |
| 4,914,590 A | 4/1990 | Loatman et al. |
| 5,148,154 A | 9/1992 | MacKay et al. |
| 5,193,185 A | 3/1993 | Lanter |
| 5,287,496 A | 2/1994 | Chen et al. |
| 5,302,660 A | 4/1994 | Klinksiek et al. |
| 5,307,456 A | 4/1994 | MacKay |
| 5,355,472 A | 10/1994 | Lewis |
| 5,440,730 A | 8/1995 | Elmasri |
| 5,671,482 A | 9/1997 | Muranga et al. |
| 5,732,257 A | 3/1998 | Atkinson et al. |
| 5,740,425 A | 4/1998 | Povilus |
| 5,767,854 A | 6/1998 | Anwar |
| 5,786,814 A | 7/1998 | Moran et al. |
| 5,801,702 A | 9/1998 | Dolan et al. |
| 5,831,617 A | 11/1998 | Bhukhanwala |
| 5,835,087 A | 11/1998 | Heiz et al. |
| 5,877,766 A | 3/1999 | Bates et al. |
| 5,892,513 A | 4/1999 | Fay |
| 5,893,908 A | 4/1999 | Cullen et al. |
| 5,935,210 A | 8/1999 | Stark |
| 5,963,208 A | 10/1999 | Dolan et al. |
| 6,026,388 A | 2/2000 | Liddy et al. |
| 6,031,537 A | 2/2000 | Hugh |
| 6,047,126 A | 4/2000 | Imai |
| 6,061,697 A | 5/2000 | Nakao |
| 6,078,934 A | 6/2000 | Lahey et al. |
| 6,144,962 A | 11/2000 | Weinberg et al. |
| 6,154,213 A | 11/2000 | Rennison et al. |
| 6,185,576 B1 | 2/2001 | McIntosh |
| 6,189,019 B1 | 2/2001 | Blumer et al. |
| 6,204,850 B1 | 3/2001 | Green |
| 6,233,592 B1 | 5/2001 | Schnelle et al. |
| 6,366,933 B1 | 4/2002 | Ball et al. |
| 6,421,656 B1 | 7/2002 | Cheng et al. |
| 6,470,490 B1 | 10/2002 | Hansen |
| 6,502,101 B1 | 12/2002 | Verprauskus et al. |
| 6,505,191 B1 | 1/2003 | Baclawski |
| 6,529,905 B1 | 3/2003 | Bray et al. |
| 6,542,911 B2 | 4/2003 | Chakraborty et al. |
| 6,581,062 B1 | 6/2003 | Draper et al. |
| 6,584,459 B1 | 6/2003 | Chang et al. |
| 6,584,480 B1 | 6/2003 | Ferrel et al. |
| 6,601,065 B1 | 7/2003 | Nelson et al. |
| 6,606,653 B1 | 8/2003 | Ackermann et al. |
| 6,636,845 B2 | 10/2003 | Chau et al. |
| 6,643,633 B2 | 11/2003 | Chau et al. |
| 6,708,186 B1 | 3/2004 | Claborn et al. |
| 6,708,214 B1 | 3/2004 | La Fleur |
| 6,721,727 B2 | 4/2004 | Chau et al. |
| 6,772,139 B1 | 8/2004 | Smith, III |
| 6,823,495 B1 | 11/2004 | Vedula et al. |
| 6,826,726 B2 | 11/2004 | Hsing et al. |
| 6,832,219 B2 | 12/2004 | Lal |
| 6,836,778 B2 | 12/2004 | Manikutty et al. |
| 6,853,997 B2 | 2/2005 | Wotring et al. |
| 6,886,005 B2 | 4/2005 | Davis |
| 6,912,536 B1 * | 6/2005 | Ochitani ............ 707/737 |
| 6,934,712 B2 | 8/2005 | Kieman |
| 6,944,817 B1 | 9/2005 | Danneels |
| 6,947,945 B1 | 9/2005 | Carey et al. |
| 6,950,913 B2 | 9/2005 | Glasco |
| 7,028,147 B2 | 4/2006 | Wu et al. |
| 7,075,536 B1 | 7/2006 | Goldschmidt |
| 7,293,228 B1 | 11/2007 | Lessing et al. |
| 7,376,674 B2 | 5/2008 | Lastovica |
| 7,412,535 B2 | 8/2008 | Agarwalla et al. |
| 7,526,479 B2 | 4/2009 | Zenz |
| 2001/0037345 A1 | 11/2001 | Kieman et al. |
| 2001/0047372 A1 | 11/2001 | Gorelik et al. |
| 2002/0010700 A1 | 1/2002 | Wotring et al. |
| 2002/0010711 A1 | 1/2002 | Nakanishi et al. |
| 2002/0023091 A1 | 2/2002 | Silberberg et al. |
| 2002/0116371 A1 | 8/2002 | Dodds et al. |
| 2002/0120630 A1 | 8/2002 | Christianson et al. |
| 2002/0129052 A1 | 9/2002 | Glazer et al. |
| 2002/0133484 A1 | 9/2002 | Chau et al. |
| 2002/0133497 A1 | 9/2002 | Draper et al. |
| 2002/0156811 A1 | 10/2002 | Krupa |
| 2002/0169788 A1 | 11/2002 | Lee et al. |
| 2002/0194357 A1 | 12/2002 | Harris et al. |
| 2003/0023754 A1 | 1/2003 | Eichstadt et al. |
| 2003/0041305 A1 | 2/2003 | Schnelle et al. |
| 2003/0070144 A1 | 4/2003 | Schnelle et al. |
| 2003/0140308 A1 | 7/2003 | Murthy et al. |
| 2003/0167420 A1 | 9/2003 | Parsons |
| 2003/0167456 A1 | 9/2003 | Sabharwal |
| 2003/0177443 A1 | 9/2003 | Schnelle et al. |
| 2003/0226108 A1 | 12/2003 | Oezgen |
| 2004/0093469 A1 | 5/2004 | Glasco |
| 2004/0139327 A1 | 7/2004 | Brown et al. |
| 2004/0162807 A1 | 8/2004 | Montagne |
| 2004/0183831 A1 | 9/2004 | Ritchy et al. |
| 2004/0220927 A1 | 11/2004 | Murthy et al. |
| 2005/0039109 A1 | 2/2005 | Schumacher et al. |
| 2005/0171946 A1 | 8/2005 | Maim |
| 2005/0278475 A1 | 12/2005 | Karatal et al. |
| 2006/0181531 A1 | 8/2006 | Goldschmidt |
| 2007/0174541 A1 | 7/2007 | Chandrasekaran et al. |
| 2007/0192246 A1 | 8/2007 | Futamase |
| 2007/0288890 A1 | 12/2007 | Wells |

OTHER PUBLICATIONS

AMPEX markup file for California Statute CA Bus & Prof Code § 2 (1996) ("AMPEX § 2").

Tasmanian State Service, "Legislation System Project: Business Case,"(Nov. 14, 1994) ("TSS 1994").

Tasmanian State Service, "Legislation System Project: System Design Specification," (Dec. 1994) ("TSS 1994-2").

Tasmanian State Service, "Legislation System Project: Functional Requirements Specification,"(Mar. 18, 1996) ("LSP: Functional Reqs").

RMIT Multimedia Database Systems, SIM 2.3 Administrator Manual Series. Database Server Reference Manual, (Mar. 2, 1999). [SAIC014543-SAIC014574].

RMIT Multimedia Database Systems, SIM 2.3 Administrator Manual Series. SIM Administration Manual, (Feb. 25, 1999). [SAIC015000-SAIC015039].

RMIT Multimedia Database Systems, SIM 2.3 Administrator Manual Series. Web Server Reference Manual, (Feb. 25, 1999). [SAIC015269-SAIC015292].

RMIT Multimedia Database Systems, SIM 2.3 Programmer Manual Series. Ace Programmer's Guide, (Feb. 25, 1999). [SAIC013718-SAIC013820].

Volume 10: SIM Scripting Language. Reference Manual. Ferntree Computer Corporation, Release 1.4 (Nov. 1, 1996). [SAIC009889-SAIC009930].

Volume 15: SIM General Support Library Programmers Manual. Ferntree Computer Corporation, Release 1.4 (Sep. 2, 1996). [SAIC007323-SAIC007332].

Volume 7: SIM PC Interface Tutorial and Reference Manual. Ferntree Computer Corporation, Release 1.4 (Sep. 4, 1996). [SAIC007750-SAIC007805].

Volume 8: SIM PC Interface Administrators Manual. Ferntree Computer Corporation, Release 1.4 (Nov. 1, 1996). [SAIC008570-SAIC008581].

ActiveTEXT Datasheet, available at: http://web.archive.org/web/19970630042435/www.ais.co.uk/atds.html, 1997.

Arnold-Moore et al. "Connected to the Law: Tasmanian Legislation Using EnAct", InQuirion Pty Ltd., 2002.

(56) References Cited

OTHER PUBLICATIONS

Arnold-Moore et al. "Models for Structured Document Database Systems", Royal Melbourne Institute of Technology, 1998.
Arnold-Moore et al., "The ELF data model and SGQL query language for structured document databases", Sixth Australasian Database Conf., ADC'95, Adelaide, AU, [Online] vol. 17, No. 2, Jan. 30, 1995-Jan. 31, 1995, pp. 17-26, XP002204886, Australian Computer Science Communications ISSN: 0157-3055 Retrieved from the Internet: URL:http://www.mds.rmit.edu.au/~tja/papers/index.html>.
Arnold-Moore, "Automatic Generation of Amendment Legislation", ACM 1997.
Arnold-Moore, "Automatically, Processing Amendments to Legislation", ACM 1995.
Berners, uniform Resource Identifiers (URI): Generic Syntax, Aug. 1998, RFC 2396, pp. 1-41.
Communication from Applicant Responsive to Jul. 25, 2002 Search Report in EP 98901249.7, Oct. 1, 2002.
Communication from Applicant Responsive to Sep. 8, 2005 Communication in EP 98901249.7, Sep. 19, 2005.
Communication from Applicant Responsive to Jan. 25, 2007 Communication in EP 98901249.7, Apr. 5, 2007.
Communication from Applicant Responsive to Apr. 23, 2007 Communication in EP 98901249.7, Jun. 25, 2007.
Davis, "Hypertext Link Integrity", Dec. 1999, pp. 1-6.
DeRose et al., XML XLink Requirements Verision 1.0, Feb. 1999, W3C, pp. 1-15.
Ducharme, "Links that are More Valuable than the Information they Link", Jul. 25, 1998, xml.com pp. 1-3.
Duhig, "Separating Links Content using XML, Xlink and Xpointer", May 2001, Internationanales Congress Centrum (ICC), pp. 1-19.
Eckhert, "Processing Hypertext Links after Xlink", 2004, pp. 1-58.
Eisenberg et al., "SQL/XML is Making Good Progress", SIGMOD Record, vol. 31, No. 2, Jun. 2002, pp. 101-108.
Fong et al. "Converting Relational Databases into XML Document", IEEE 2001, pp. 61-65.
Jan. 18, 2007 letter enclosing website entitled "The Information Society Creative Awards 1996", available at: http://met.open.ac.uk/isca/, 1996.
Jan. 19, 2007 letter in response to Jan. 18, 2007 letter enclosing website entitled "The Information Society Creative Awards 1996", available at: http://met.open.ac.uk/isca/, 1996.
Khan et al., "A performance Evaluation of Storing XML Data in Relational Database Management Systems", ACM 2001, pp. 31-38.
Kim et al., "OOHS: An Object-Oriented Hypermedia System", COMPSAC, Seoul, KR, Aug. 21, 1996-Aug. 23, 1996, pp. 496-501, IEEE, XP 000684382, IEEE Comp. Soc. Los Alamitos, CA US ISBN: 0-8186-7579-9.
Lim et al., "An Automated Approach for Retrieving Hierarchical Data from HTML Tables", CIKM '99, 11/99, Kansas City, MO, USA, pp. 466-474.
Lowe et al. "Improving Web Linking Using Xlink", Jul. 2001, pp. 1-19.
Maioli C. et al., "Versioning Issues in a Collaborative Distributed Hypertext System" Technical Report Universita Di Bologna, Apr. 1993.
Maier, "XML and Broken Links (How can the XML Pointer Language, Xlink and Xpointer help solve the problem of Broken Links of the Net?", Mar. 1998 p. 1.
McFall et al. "Automaticall Finding and Repairing Broken Lings Between XML Documents" Dec. 1998, Department of Computer Science, Michigan State University, pp. 1-18.
Nambiar et al., "Current Approaches to XML Management", IEEE 2002, pp. 43-51.
Office Action of Corresponding European Appl. No. 98 901 249.7-1527, Jan. 28, 2005.
Office Action of Corresponding European Appl. No. 98 901 249.7-1527, Jan. 25, 2007.
Office Action of Corresponding European Appl. No. 98 901 249.7-1527, Feb. 27, 2008.
Order Granting Reexamination Request from US Patent No. 6,233,592, Apr. 3, 2007.
P. Francois, "Generalized SGML repositories: Requirements and modeling", Computer Standards and Interfaces, vol. 18, No. 1, 1996, pp. 11-24, XP004006104, Elsevier Sequoia, Lausanne, CH ISSN: 0920-5489.
Promenschenkel, "STEPS: toward a new era in electronic publishing", OCLC Newsletter, Jul./Aug. 1995, No. 216, found at website: http://digitalarchive.oclc.org/da/ViewObjectMain.jsp;jsessionid=4ae0c5fi82409328f8d87a14475bd40eaaceff43afd7fileid=000000 1695:000000042504&reqi.
Reexamination Request from US Patent No. 6,233,592; Jan. 29, 2007.
Sacks-Davis et al. "Database Systems for Structured Documents", International Symposium on Advanced Database Technologies and Their Integration, Japan, 1994.
Sacks-Davis et al., "A Standards-Based Approach to Combining Information Retrieval and Database Functionality", International Journal of information Technology, 1(1):1-15, 1995.
Shanmugasundaram et al., "Efficiently Publishing Relational Data as XML Documents", Google Apr. 2001, pp. 133-154.
Simpson, "Top Ten Tips to Using Xpath and Xpointer", Aug. 21, 2002, xml.com, pp. 1-12.
Third Party Observation Under Article 115 EPC filed Apr. 18, 2007 in EP 98901429.7.
Third Party Observation Under Article 115 EPC filed Nov. 23, 2006 in EP 98901429.7.
Wang, Wen Qiang et al., "XstorM: A Scalable Mapping Scheme for XML Data", World Wide Web, vol. 4, Nos. 1-2, Mar. 2001, pp. 101-119.
WR Communication pursuant to Article 115(c) and responsive to "WR Communication pursuant to Article 115(c) EPC, Nov. 30, 2006" EPC, Jan. 26, 2007.
WR Communication pursuant to Article 115(c) EPC, Nov. 30, 2006.
XML—Sitemaps, Find and Fix Broken Links, 2005-2008, XML—Sitemaps, pp. 1-8.
Xsoft Premieres Astoria: A simpler way to mange "Mega-Documents" dated Mar. 12, 1996, 1996—http://www.highbeam.com/doc/1G1-18079234.html.
Zhu, Yan et al., "Data Transformation for Warehousing Web Data", WECWIS, Jun. 21-22, 2001, pp. 74-85.
Rule 26(f) Report dated Jun. 21, 2007 for *Timebase Pty Ltd.* v. *The Thomson Corp.*, Case No. 07 CV 1687 (D. Minn.).
Electronic Discovery Protocol filed with Rule 26(f) Report dated Jun. 21, 2007 for *Timebase Pty Ltd.* v. *The Thomson Corp.*, Case No. 07 CV 1687 (D. Minn.).
Plaintiffs Proposed Protective Order filed with Rule 26(f) Report dated Jun. 21, 2007 for *Timebase Pty Ltd.* v. *The Thomson Corp.*, Case No. 07 CV 1687 (D. Minn.).
Defendant's Proposed Protective Order filed with Rule 26(f) Report dated Jun. 21, 2007 for *Timebase Pty Ltd.* v. *The Thomson Corp.*, Case No. 07 CV 1687 (D. Minn.).
Transcript of Proceedings filed Feb. 26, 2008 for *Timebase Pty Ltd.* v. *The Thomson Corp.*, Case No. 07 CV 1687 (D. Minn.).
Letter from Grey Plant & Moody dated Jun. 1, 2007 for *Timebase Pty Ltd.* v. *The Thomson Corp.*, Case No. 07 CV 1687 (D. Minn.).
Letter from Niro, Scavone, Haller & Niro dated Dec. 21, 2007 for *Timebase Pty Ltd.* v. *The Thomson Corp.*, Case No. 07 CV 1687 (D. Minn.).
Letter from Faegre and Benson dated Dec. 20, 2007 for *Timebase Pty Ltd.* v. *The Thomson Corp.*, Case No. 07 CV 1687 (D. Minn.).
Letter from Faegre and Benson dated Apr. 1, 2008 for *Timebase Pty Ltd.* v. *The Thomson Corp.*, Case No. 07 CV 1687 (D. Minn.).
Letter from Niro, Scavone, Haller & Niro dated Apr. 17, 2008 for *Timebase Pty Ltd.* v. *The Thomson Corp.*, Case No. 07 CV 1687 (D. Minn.).
Motion to Stay Litigation Pending Reexamination Proceedings dated Jun. 14, 2007 for *Timebase Pty Ltd.* v. *The Thomson Corp.*, Case No. 07 CV 1687 (D. Minn.).
Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

(56) References Cited

OTHER PUBLICATIONS

Exhibit 1 for Defendant's Memorandum in Support of Motion to Stay Litigation Pending Reexamination Proceedings dated Jun. 14, 2008 for *Timebase Pty Ltd. v. The Thomson Corp.*, Case No. 07 CV 1687 (D. Minn.).

Exhibit 2 for Defendant's Memorandum in Support of Motion to Stay Litigation Pending Reexamination Proceedings dated Jun. 14, 2008 for *Timebase Pty Ltd. v. The Thomson Corp.*, Case No. 07 CV 1687 (D. Minn.).

Exhibit 3 for Defendant's Memorandum in Support of Motion to Stay Litigation Pending Reexamination Proceedings dated Jun. 14, 2008 for *Timebase Pty Ltd. v. The Thomson Corp.*, Case No. 07 CV 1687 (D. Minn.).

Exhibit 4 for Defendant's Memorandum in Support of Motion to Stay Litigation Pending Reexamination Proceedings dated Jun. 14, 2008 for *Timebase Pty Ltd. v. The Thomson Corp.*, Case No. 07 CV 1687 (D. Minn.).

Exhibit 5 for Defendant's Memorandum in Support of Motion to Stay Litigation Pending Reexamination Proceedings dated Jun. 14, 2008 for *Timebase Pty Ltd. v. The Thomson Corp.*, Case No. 07 CV 1687 (D. Minn.).

Exhibit 6 for Defendant's Memorandum in Support of Motion to Stay Litigation Pending Reexamination Proceedings dated Jun. 14, 2008 for *Timebase Pty Ltd. v. The Thomson Corp.*, Case No. 07 CV 1687 (D. Minn.).

Exhibit 7 for Defendant's Memorandum in Support of Motion to Stay Litigation Pending Reexamination Proceedings dated Jun. 14, 2008 for *Timebase Pty Ltd. v. The Thomson Corp.*, Case No. 07 CV 1687 (D. Minn.).

Exhibit 8 for Defendant's Memorandum in Support of Motion to Stay Litigation Pending Reexamination Proceedings dated Jun. 14, 2008 for *Timebase Pty Ltd. v. The Thomson Corp.*, Case No. 07 CV 1687 (D. Minn.).

Exhibit 9 for Defendant's Memorandum in Support of Motion to Stay Litigation Pending Reexamination Proceedings dated Jun. 14, 2008 for *Timebase Pty Ltd. v. The Thomson Corp.*, Case No. 07 CV 1687 (D. Minn.).

Timebase's Response to Thompson's Motion to Stay dated Jun. 21, 2007 for *Timebase Pty Ltd. v. The Thomson Corp.*, Case No. 07 CV 1687 (D. Minn.).

Exhibit A for Timebase's Response to Thompson's Motion to Stay dated Jun. 21, 2007 for *Timebase Pty Ltd. v. The Thomson Corp.*, Case No. 07 CV 1687 (D. Minn.).

Exhibit B for Timebase's Response to Thompson's Motion to Stay dated Jun. 21, 2007 for *Timebase Pty Ltd. v. The Thomson Corp.*, Case No. 07 CV 1687 (D. Minn.).

Exhibit C for Timebase's Response to Thompson's Motion to Stay dated Jun. 21, 2007 for *Timebase Pty Ltd. v. The Thomson Corp.*, Case No. 07 CV 1687 (D. Minn.).

Exhibit D for Timebase's Response to Thompson's Motion to Stay dated Jun. 21, 2007 for *Timebase Pty Ltd. v. The Thomson Corp.*, Case No. 07 CV 1687 (D. Minn.).

Exhibit E for Timebase's Response to Thompson's Motion to Stay dated Jun. 21, 2007 for *Timebase Pty Ltd. v. The Thomson Corp.*, Case No. 07 CV 1687 (D. Minn.).

Exhibit F for Timebase's Response to Thompson's Motion to Stay dated Jun. 21, 2007 for *Timebase Pty Ltd. v. The Thomson Corp.*, Case No. 07 CV 1687 (D. Minn.).

Exhibit G for Timebase's Response to Thompson's Motion to Stay dated Jun. 21, 2007 for *Timebase Pty Ltd. v. The Thomson Corp.*, Case No. 07 CV 1687 (D. Minn.).

Exhibit H for Timebase's Response to Thompson's Motion to Stay dated Jun. 21, 2007 for *Timebase Pty Ltd. v. The Thomson Corp.*, Case No. 07 CV 1687 (D. Minn.).

Exhibit I for Timebase's Response to Thompson's Motion to Stay dated Jun. 21, 2007 for *Timebase Pty Ltd. v. The Thomson Corp.*, Case No. 07 CV 1687 (D. Minn.).

Exhibit J for Timebase's Response to Thompson's Motion to Stay dated Jun. 21, 2007 for *Timebase Pty Ltd. v. The Thomson Corp.*, Case No. 07 CV 1687 (D. Minn.).

Order dated Feb. 7, 2008 for *Timebase Pty Ltd. v. The Thomson Corp.*, Case No. 07 CV 1687 (D. Minn.).

Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd. v. The Thomson Corp.*, Case No. 07 CV 1687 (D.. Minn.).

Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd. v. The Thomson Corp.*, Case No. 07 CV 1687 (D. Minn.).

Exhibit 1 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd. v. The Thomson Corp.*, Case No. 07 CV 1687 (D. Minn.).

Exhibit 2 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd. v. The Thomson Corp.*, Case No. 07 CV 1687 (D. Minn.).

Exhibit 3 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd. v. The Thomson Corp.*, Case No. 07 CV 1687 (D. Minn.).

Exhibit 4 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd. v. The Thomson Corp.*, Case No. 07 CV 1687 (D. Minn.).

Exhibit 5 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd. v. The Thomson Corp.*, Case No. 07 CV 1687 (D. Minn.).

Exhibit 6 for Index to Exhibits for Defendants Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd. v. The Thomson Corp.*, Case No. 07 CV 1687 (D. Minn.).

Exhibit 7 for Index to Exhibits for Defendants Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd. v. The Thomson Corp.*, Case No. 07 CV 1687 (D. Minn.).

Complaint dated Jan. 24, 2007 for *Timebase Pty Ltd. v. The Thomson Corp.*, Case No. 07 CV 1687 (D. Minn.).

Document 19-3 Complaint dated Mar. 28, 2007 for *Timebase Pty Ltd. v. The Thomson Corp.*, Case No. 07 CV 1687 (D. Minn.).

Plaintiffs Motion for Leave to Serve and File Amended Complaint dated May 10, 2007 for *Timebase Pty Ltd. v. The Thomson Corp.*, Case No. 07 CV 1687 (D. Minn.).

Exhibit A Amended Complaint dated May 10, 2007 for *Timebase Pty Ltd. v. The Thomson Corp.*, Case No. 07 CV 1687 (D. Minn.).

Plaintiffs Memorandum in Support of Motion for Leave to Serve and File Amended Complaint dated May 10, 2007 for *Timebase Pty Ltd. v. The Thomson Corp.*, Case No. 07 CV 1687 (D. Minn.).

Stipulation to Plaintiffs Amended Complaint dated Jun. 1, 2007 for *Timebase Pty Ltd. v. The Thomson Corp.*, Case No. 07 CV 1687 (D. Minn.).

Order dated Jun. 6, 2007 for *Timebase Pty Ltd. v. The Thomson Corp.*, Case No. 07 CV 1687 (D. Minn.).

Amended Complaint dated Jun. 18, 2007 for *Timebase Pty Ltd. v. The Thomson Corp.*, Case No. 07 CV 1687 (D. Minn.).

Defendants' Joint Answer and Defenses to Plaintiffs Amended Complaint dated Jun. 18, 2007 for *Timebase Pty Ltd. v. The Thomson Corp.*, Case No. 07 CV 1687 (D. Minn.).

Notice of Motion dated Feb. 9, 2007 for *Timebase Pty Ltd. v. The Thomson Corp.*, Case No. 07 CV 1687 (D. Minn.).

(56) References Cited

OTHER PUBLICATIONS

Defendant Thompson Corporation's Motion to Transfer Venue to the District of Minnesota and for a More Definite Statement dated Feb. 9, 2007 for *Timebase Pty Ltd. v. The Thomson Corp.*, Case No. 07 CV 1687 (D. Minn.).
Declaration of Andrew Martens dated Feb. 9, 2007 for *Timebase Pty Ltd. v. The Thomson Corp.*, Case No. 07 CV 1687 (D. Minn.).
Declaration of Chad Drown dated Feb. 9, 2007 for *Timebase Pty Ltd. v. The Thomson Corp.*, Case No. 07 CV 1687 (D. Minn.).
Exhibits A-D for Defendant Thompson Corporation's Motion to Transfer Venue to the District of Minnesota and for a More Definite Statement dated Feb. 9, 2007 for *Timebase Pty Ltd. v. The Thomson Corp.*, Case No. 07 CV 1687 (D. Minn.).
Exhibits E-H for Defendant Thompson Corporation's Motion to Transfer Venue to the District of Minnesota and for a More Definite Statement dated Feb. 9, 2007 for *Timebase Pty Ltd. v. The Thomson Corp.*, Case No. 07 CV 1687 (D. Minn.).
Exhibit I for Defendant Thompson Corporation's Motion to Transfer Venue to the District of Minnesota and for a More Definite Statement dated Feb. 9, 2007 for *Timebase Pty Ltd. v. The Thomson Corp.*, Case No. 07 CV 1687 (D. Minn.).
Timebase's Response to the Thompson Corporation's Motion to Transfer dated Feb. 26, 2007 for *Timebase Pty Ltd. v. The Thomson Corp.*, Case No. 07 CV 1687 (D. Minn.).
Exhibits 1-5 for Timebase's Response to the Thompson Corporation's Motion to Transfer dated Feb. 26, 2007 for *Timebase Pty Ltd. v. The Thomson Corp.*, Case No. 07 CV 1687 (D. Minn.).
Defendant Thompson Corporation's Reply Brief in Support of its Motion to Transfer Venue to the District of Minnesota and for a More Definite Statement dated Mar. 5, 2007 for *Timebase Pty Ltd. v. The Thomson Corp.*, Case No. 07 CV 1687 (D. Minn.).
Second Declaration of Andrew Martens dated Mar. 5, 2007 for *Timebase Pty Ltd. v. The Thomson Corp.*, Case No. 07 CV 1687 (D. Minn.).
Certificate of Service dated Mar. 5, 2007 for *Timebase Pty Ltd. v. The Thomson Corp.*, Case No. 07 CV 1687 (D. Minn.).
Court Docket Entry dated Mar. 9, 2007 for *Timebase Pty Ltd. v. The Thomson Corp.*, Case No. 07 CV 1687 (D. Minn.).
Memoranum Opinion and Order dated Mar. 9, 2007 for *Timebase Pty Ltd. v. The Thomson Corp.*, Case No. 07 CV 1687 (D. Minn.).
Document 19-1 Memorandum Opinion and Order dated Mar. 28, 2007 for *Timebase Pty Ltd. v. The Thomson Corp.*, Case No. 07 CV 1687 (D. Minn.).
Cover Letter for Transfer of Case dated Mar. 26, 2007 for *Timebase Pty Ltd. v. The Thomson Corp.*, Case No. 07 CV 1687 (D. Minn.).
Timebase's First Set of Requests for the Production of Documents (Nos. 1-40) to the Thompson Corporation dated Mar. 3, 2008 for *Timebase Pty Ltd. v. The Thomson Corp.*, Case No. 07 CV 4551 (D. Minn.).
Timebase's First Set of Requests for the Production of Documents (Nos. 1-40) to West Publishing Corporation dated Mar. 3, 2008 for *Timebase Pty Ltd. v. The Thomson Corp.*, Case No. 07 CV 4551 (D. Minn.).
Timebase's First Set of Requests for the Production of Documents (Nos. 1-40) to West Services Inc. dated Mar. 3, 2008 for *Timebase Pty Ltd. v. The Thomson Corp.*, Case No. 07 CV 4551 (D. Minn.).
Defendant the Thompson Corporation's Objections to Plaintiff Timebase's First Set of Requests for Production of Documents (Nos. 1-40) dated Apr. 7, 2008 for *Timebase Pty Ltd. v. The Thomson Corp.*, Case No. 07 CV 4551 (D. Minn.).
Defendants' First Set of Requests for Production of Documents and Things to Plaintiff Timebase Pty Ltd. dated Apr. 3, 2008 for *Timebase Pty Ltd. v. The Thomson Corp.*, Case No. 07 CV 4551 (D. Minn.).
Defendant Thompson Corporation's Objections and Responses to Plaintiff Timebase's First Set of Requests for Production of Documents (Nos. 1-40) dated Apr. 24, 2008 for *Timebase Pty Ltd. v. The Thomson Corp.*, Case No. 07 CV 4551 (D. Minn.).
Defendant West Corporation's Objections and Responses to Plaintiff Timebase's First Set of Requests for Production of Documents (Nos. 1-40) dated Apr. 24, 2008 for *Timebase Pty Ltd. v. The Thomson Corp.*, Case No. 07 CV 4551 (D. Minn.).
Defendant West Services, Inc.'s Objections and Responses to Plaintiff Timebase's First Set of Requests for Production of Documents (Nos. 1-40) dated Apr. 24, 2008 for *Timebase Pty Ltd. v. The Thomson Corp.*, Case No. 07 CV 4551 (D. Minn.).
Timebase's Response to Defendant's First Set of Requests for Production of Documents (Nos. 1-49) dated May 5, 2008 for *Timebase Pty Ltd. v. The Thomson Corp.*, Case No. 07 CV 4551 (D. Minn.).
Transcript of Proceedings Re. Defendants' Motion to Consolidate dated Jan. 24, 2008 for *Timebase Pty Ltd. v. The Thomson Corp.*, Case No. 07 CV 4551 (D. Minn.).
Transcript of Proceedings Re. Defendants' Motion to Consolidate (filed Feb. 26, 2008) dated Jan. 24, 2008 for *Timebase Pty Ltd. v. The Thomson Corp.*, Case No. 07 CV 4551 (D. Minn.).
Transcript of Proceedings Re. Defendants' Motion to Stay (filed Feb. 26, 2008) for *Timebase Pty Ltd. v. The Thomson Corp.*, Case No. 07 CV 4551 (D. Minn.).
Timebase's Interrogatories Nos. 1-5 for the Defendant, The Thompson Corporation dated Mar. 24, 2008 for *Timebase Pty Ltd. v. The Thomson Corp.*, Case No. 07 CV 4551 (D. Minn.).
Timebase's Interrogatories Nos. 1-5 for the Defendant, West Publishing Corporation dated Mar. 24, 2008 for *Timebase Pty Ltd. v. The Thomson Corp.*, Case No. 07 CV 4551 (D. Minn.).
Timebase's Interrogatories Nos. 1-5 for the Defendant, West Services, Inc. dated Mar. 24, 2008 for *Timebase Pty Ltd. v. The Thomson Corp.*, Case No. 07 CV 4551 (D. Minn.).
Defendant West Publishing Corporation's Objections to Plaintiff Timebase's First Set of Requests for Production of Documents (Nos. 1-40) dated Apr. 7, 2008 for *Timebase Pty Ltd. v. The Thomson Corp.*, Case No. 07 CV 4551 (D. Minn.).
Defendant West Services Inc.'s Objections to Plaintiff Timebase's First Set of Requests for Production of Documents (Nos. 1-40) dated Apr. 7, 2008 for *Timebase Pty Ltd. v. The Thomson Corp.*, Case No. 07 CV 4551 (D. Minn.).
The Thompson Corporation's Objections and Answers to Timebase's First Set of Interrogatories (Nos. 1-5) dated Apr. 28, 2008 for *Timebase Pty Ltd. v. The Thomson Corp.*, Case No. 07 CV 4551 (D. Minn.).
West Publishing Corporation's Objections and Answers to Timebase's First Set of Interrogatories (Nos. 1-5) dated Apr. 28, 2008 for *Timebase Pty Ltd. v. The Thomson Corp.*, Case No. 07 CV 4551 (D. Minn.).
West Services Inc.'s Objections and Answers to Timebase's First Set of Interrogatories (Nos. 1-5) dated Apr. 28, 2008 for *Timebase Pty Ltd. v. The Thomson Corp.*, Case No. 07 CV 4551 (D. Minn.).
Letter from Faegre and Benson enclosing Verification Pages dated May 5, 2008 for *Timebase Pty Ltd. v. The Thomson Corp.*, Case No. 07 CV 4551 (D. Minn.).
Letter from David J. F. Gross dated Apr. 1, 2008 for *Timebase Pty Ltd. v. The Thomson Corp.*, Case No. 07 CV 4551 (D. Minn.).
Letter from Niro, Scavone, Haller & Niro dated Apr. 17, 2008 for *Timebase Pty Ltd. v. The Thomson Corp.*, Case No. 07 CV 4551 (D. Minn.).
Defendants' Memorandum in Support of Motion to Consolidate with Case No. 07-CV-1687 and Stay Pending Reexamination of U.S. Patent No. 6,233,592 dated Jan. 10, 2008 for *Timebase Pty Ltd. v. The Thomson Corp.*, Case No. 07 CV 4551 (D. Minn.).
Timebase's Response to Thompson's Motion to Stay and Consolidate dated Jan. 17, 2008 for *Timebase Pty Ltd. v. The Thomson Corp.*, Case No. 07 CV 4551 (D. Minn.).
Order (filed Feb. 12, 2008) dated Feb. 7, 2008 for *Timebase Pty Ltd. v. The Thomson Corp.*, Case No. 07 CV 4551 (D. Minn.).
Defendant's Appeal of and Objections to Orders Denying a Stay of the '228 Case (No. 07-4551) and Lifting the Stay of the '592 Case (No. 07-1687) dated Feb. 26, 2008 for *Timebase Pty Ltd. v. The Thomson Corp.*, Case No. 07 CV 4551 (D. Minn.).
Defendant's Memorandum in Support of Appeal of and Objections to Orders Denying a Stay of the '228 Case (No. 07-4551) and Lifting the Stay of the '592 Case (No. 07-1687) dated Feb. 26, 2008 for *Timebase Pty Ltd. v. The Thomson Corp.*, Case No. 07 CV 4551 (D. Minn.).

(56) References Cited

OTHER PUBLICATIONS

Order (Exhibit 1) dated Feb. 7, 2008 for *Timebase Pty Ltd. v. The Thomson Corp.*, Case No. 07 CV 4551 (D. Minn.).
Order (Exhibit 2) dated Feb. 7, 2008 for *Timebase Pty Ltd. v. The Thomson Corp.*, Case No. 07 CV 4551 (D. Minn.).
Timebase's Response to Defendant's Memorandum in Support of Appeal of and Objections to Orders Denying a Stay of the '228 Case (No. 07-4551) and Lifting the Stay of the '592 Case (No. 07-1687) dated Mar. 11, 2008 for *Timebase Pty Ltd. v. The Thomson Corp.*, Case No. 07 CV 4551 (D. Minn.).
Order dated Apr. 18, 2008 for *Timebase Pty Ltd. v. The Thomson Corp.*, Case No. 07 CV 4551 (D. Minn.).
Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd. v. The Thomson Corp.*, Case No. 07 CV 4551 (D. Minn.).
Order dated May 6, 2008 for *Timebase Pty Ltd. v. The Thomson Corp.*, Case No. 07 CV 4551 (D. Minn.).
Complaint dated Nov. 7, 2007 for *Timebase Pty Ltd. v. The Thomson Corp.*, Case No. 07 CV 4551 (D. Minn.).
Defendant's Answer to Plaintiffs Complaint dated Nov. 29, 2007 for *Timebase Pty Ltd. v. The Thomson Corp.*, Case No. 07 CV 4551 (D. Minn.).
Order of Direction to the Clerk of the Court for Reassignment of Related Case dated Nov. 28, 2007 for *Timebase Pty Ltd. v. The Thomson Corp.*, Case No. 07 CV 4551 (D. Minn.).
Defendant's Motion to Consolidate with Case No. 07-CV-1687 and Stay Pending Reexamination of U.S. Patent No. 6,233,592 dated Jan. 10, 2008 for *Timebase Pty Ltd. v. The Thomson Corp.*, Case No. 07 CV 4551 (D. Minn.).
Defendant's Memorandum in Support of Motion to Consolidate with Case No. 07-CV-1687 and Stay Pending Reexamination of U.S. Patent No. 6,233,592 dated Jan. 10, 2008 for *Timebase Pty Ltd. v. The Thomson Corp.*, Case No. 07 CV 4551 (D. Minn.).
Defendant's Prior Art Statement for *Timebase Pty Ltd. v. The Thomson Corp.*, Case No. 07 CV 1687 (D. Minn.) Oct. 23, 2009.
Appendix A to Defendant's Prior Art Statement for *Timebase Pty Ltd. v. The Thomson Corp.*, Case No. 07 CV 1687 (D. Minn.) Oct. 23, 2009.
Appendix B to Defendant's Prior Art Statement for *Timebase Pty Ltd. v. The Thomson Corp.*, Case No. 07 CV 1687 (D. Minn.) Oct. 23, 2009.
Appendix C to Defendant's Prior Art Statement for *Timebase Pty Ltd. v. The Thomson Corp.*, Case No. 07 CV 1687 (D. Minn.) Oct. 23, 2009.
Appendix D to Defendant's Prior Art Statement for *Timebase Pty Ltd. v. The Thomson Corp.*, Case No. 07 CV 1687 (D. Minn.) Oct. 23, 2009.
Appendix E to Defendant's Prior Art Statement for *Timebase Pty Ltd. v. The Thomson Corp.*, Case No. 07 CV 1687 (D. Minn.) Oct. 23, 2009.
Appendix F to Defendant's Prior Art Statement for *Timebase Pty Ltd. v. The Thomson Corp.*, Case No. 07 CV 1687 (D. Minn.) Oct. 23, 2009.
Appendix G to Defendant's Prior Art Statement for *Timebase Pty Ltd. v. The Thomson Corp.*, Case No. 07 CV 1687 (D. Minn.) Oct. 23, 2009.
Thompson's First Supplemental Objections and Answers to Timebase's First Set of Interrogatories (Nos. 1-5) (Redacted) for *Timebase Pty Ltd. v. The Thomson Corp.*, Case No. 07 CV 1687 (D. Minn.) Sep. 3, 2009.
Defendant's Supplemental Prior Art Statement for *Timebase Pty Ltd. v. The Thomson Corp.*, Case No. 07 CV 1687 (D. Minn.) Apr. 2, 2010.
Appendix A to Defendant's Supplemental Prior Art Statement for *Timebase Pty Ltd. v. The Thomson Corp.*, Case No. 07 CV 1687 (D. Minn.) Apr. 2, 2010.
Appendix B to Defendant's Supplemental Prior Art Statement for *Timebase Pty Ltd. v. The Thomson Corp.*, Case No. 07 CV 1687 (D. Minn.) Apr. 2, 2010.
Appendix C to Defendant's Supplemental Prior Art Statement for *Timebase Pty Ltd. v. The Thomson Corp.*, Case No. 07 CV 1687 (D. Minn.) Apr. 2, 2010.
Appendix D to Defendant's Supplemental Prior Art Statement for *Timebase Pty Ltd. v. The Thomson Corp.*, Case No. 07 CV 1687 (D. Minn.) Apr. 2, 2010.
Appendix E to Defendant's Supplemental Prior Art Statement for *Timebase Pty Ltd. v. The Thomson Corp.*, Case No. 07 CV 1687 (D. Minn.) Apr. 2, 2010.
Appendix F to Defendant's Supplemental Prior Art Statement for *Timebase Pty Ltd. v. The Thomson Corp.*, Case No. 07 CV 1687 (D. Minn.) Apr. 2, 2010.
Appendix G to Defendant's Supplemental Prior Art Statement for *Timebase Pty Ltd. v. The Thomson Corp.*, Case No. 07 CV 1687 (D. Minn.) Apr. 2, 2010.
Timebase's Response to Defendant's Prior Art Statement for *Timebase Pty Ltd. v. The Thomson Corp.*, Case No. 07 CV 1687 (D. Minn.) Feb. 1, 2010.
Claim Chart comparing claims of US Patent No. 6,233,592 to Agosti for Timebase's Response to Defendant's Prior Art Statement for *Timebase Pty Ltd. v. The Thomson Corp.*, Case No. 07 CV 1687 (D. Minn.) Feb. 1, 2010.
Claim Chart comparing claims of US Patent No. 6,233,592 to Anwar for Timebase's Response to Defendant's Prior Art Statement for *Timebase Pty Ltd. v. The Thomson Corp.*, Case No. 07 CV 1687 (D. Minn.) Feb. 1, 2010.
Claim Chart comparing claims of US Patent No. 6,233,592 to Arnold Moore 1997-2 for Timebase's Response to Defendant's Prior Art Statement for *Timebase Pty Ltd. v. The Thomson Corp.*, Case No. 07 CV 1687 (D. Minn.) Feb. 1, 2010.
Claim Chart comparing claims of US Patent No. 6,233,592 to Arnold-Moore 1994 for Timebase's Response to Defendant's Prior Art Statement for *Timebase Pty Ltd. v. The Thomson Corp.*, Case No. 07 CV 1687 (D. Minn.) Feb. 1, 2010.
Claim Chart comparing claims of US Patent No. 6,233,592 to Arnold-Moore 1994-2 for Timebase's Response to Defendant's Prior Art Statement for *Timebase Pty Ltd. v. The Thomson Corp.*, Case No. 07 CV 1687 (D. Minn.) Feb. 1, 2010.
Claim Chart comparing claims of US Patent No. 6,233,592 to Arnold-Moore 1995 for Timebase's Response to Defendant's Prior Art Statement for *Timebase Pty Ltd. v. The Thomson Corp.*, Case No. 07 CV 1687 (D. Minn.) Feb. 1, 2010.
Claim Chart comparing claims of US Patent No. 6,233,592 to Arnold-Moore 1997 for Timebase's Response to Defendant's Prior Art Statement for *Timebase Pty Ltd. v. The Thomson Corp.*, Case No. 07 CV 1687 (D. Minn.) Feb. 1, 2010.
Claim Chart comparing claims of US Patent No. 6,233,592 to Astoria for Timebase's Response to Defendants Prior Art Statement for *Timebase Pty Ltd. v. The Thomson Corp.*, Case No. 07 CV 1687 (D. Minn.) Feb. 1, 2010.
Claim Chart comparing claims of US Patent No. 6,233,592 to Azaria for Timebase's Response to Defendants Prior Art Statement for *Timebase Pty Ltd. v. The Thomson Corp.*, Case No. 07 CV 1687 (D. Minn.) Feb. 1, 2010.
Claim Chart comparing claims of US Patent No. 6,233,592 to Bachman 1973 for Timebase's Response to Defendants Prior Art Statement for *Timebase Pty Ltd. v. The Thomson Corp.*, Case No. 07 CV 1687 (D. Minn.) Feb. 1, 2010.
Claim Chart comparing claims of US Patent No. 6,233,592 to Bentley for Timebase's Response to Defendants Prior Art Statement for *Timebase Pty Ltd. v. The Thomson Corp.*, Case No. 07 CV 1687 (D. Minn.) Feb. 1, 2010.
Claim Chart comparing claims of US Patent No. 6,233,592 to Campbell for Timebase's Response to Defendants Prior Art Statement for *Timebase Pty Ltd. v. The Thomson Corp.*, Case No. 07 CV 1687 (D. Minn.) Feb. 1, 2010.
Claim Chart comparing claims of US Patent No. 6,233,592 to Documentum for Timebase's Response to Defendants Prior Art Statement for *Timebase Pty Ltd. v. The Thomson Corp.*, Case No. 07 CV 1687 (D. Minn.) Feb. 1, 2010.

(56) References Cited

OTHER PUBLICATIONS

Claim Chart comparing claims of US Patent No. 6,233,592 to Dolan for Timebase's Response to Defendants Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Elmasri 1990 for Timebase's Response to Defendants Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Fay 1996 for Timebase's Response to Defendants Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Haake for Timebase's Response to Defendants Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Hansen for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Hirohama 1990 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Horne 1997 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Kim 1996 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Kimball for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Liddy for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Lo 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Lo 1996 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Osterbye 1992 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Povilus 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Promenschenkel 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Sacks-Davis 1994 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Sacks-Davis 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to SCALEplus for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Sciore 1991 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Sciore 1994 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Stonebraker 1994 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Taylor for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Travis Waldt for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Wilkinson for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Wilson 1988 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Wilson 1990 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Wilson 1992 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Agosti for T)mebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Anwar for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Arnold Moore 1997-2 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Arnold-Moore 1994 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Arnold-Moore 1994-2 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Arnold-Moore 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Arnold-Moore 1997 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Astoria for Timebase's Response to Defendant's Prior Art Statement for *Timebase Pty Ltd.* v. *The Thomson Corp.*, Case No. 07 CV 1687 (D. Minn.) Feb. 1, 2010.

(56) References Cited

OTHER PUBLICATIONS

Claim Chart comparing claims of US Patent No. 7,293,228 to Azaria for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Bachman 1973 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Bentley for Timebase's Response to Defendant's Prior Art StateMent for *Timebase Pty Ltd.* v. *The Thomson Corp.*, Case No. 07 CV 1687 (D. Minn.) Feb. 1, 2010.
Claim Chart comparing claims of US Patent No. 7,293,228 to Campbell for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Caplinger for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Documentum for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Elmasri 1990 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Fay 1996 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Haake for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Hansen for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Hirohama 1990 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Horne 1997 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Kim 1996 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Kimball for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Liddy for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Lo 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Lo 1996 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Noik for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Osterbye 1992 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Povilus 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Promenschenkel 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Sacks-Davis 1994 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Sacks-Davis 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to SCALEplus for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Sciore 1991 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Sciore 1994 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Stonebraker 1994 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Taylor for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Travis Waldt for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Weinberg for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Wilkinson for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Wilson 1988 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Wilson 1990 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Wilson 1992 for Timebase's Response to Defendant's Prior Art Statement for *Timebase Pty Ltd.* v. *The Thomson Corp.*, Case No. 07 CV 1687 (D. Minn.) Feb. 1, 2010.
Timebase's Supplemental Response to Defendant's Prior Art Statement for *Timebase Pty Ltd.* v. *The Thomson Corp.*, Case No. 07 CV 1687 (D. Minn.) May 28, 2010.

(56) References Cited

OTHER PUBLICATIONS

Claim Chart comparing claims of US Patent No. 7,293,228 to Larson for Timebase's Supplemental Response to Defendant's Prior Art Statement for *Timebase Pty Ltd.* v. *The Thomson Corp.*, Case No. 07 CV 1687 (D. Minn.) May 28, 2010.
Claim Chart comparing claims of US Patent No. 7,293,228 to Peltonen for Timebase's Supplemental Response to Defendant's Prior Art Statement for *Timebase Pty Ltd.* v. *The Thomson Corp.*, Case No. 07 CV 1687 (D. Minn.) May 28, 2010.
Claim Chart comparing claims of US Patent No. 7,293,228 to SCALEPlus System for Timebase's Supplemental Response to Defendant's Prior Art Statement for *Timebase Pty Ltd.* v. *The Thomson Corp.*, Case No. 07 CV 1687 (D. Minn.) May 28, 2010.
Claim Chart comparing claims of US Patent No. 6,233,592 to Larson for Timebase's Supplemental Response to Defendant's Prior Art Statement for *Timebase Pty Ltd.* v. *The Thomson Corp.*, Case No. 07 CV 1687 (D. Minn.) May 28, 2010.
Claim Chart comparing claims of US Patent No. 6,233,592 to Peltonen for Timebase's Supplemental Response to Defendant's Prior Art Statement for *Timebase Pty Ltd.* v. *The Thomson Corp.*, Case No. 07 CV 1687 (D. Minn.) May 28, 2010.
Claim Chart comparing claims of US Patent No. 6,233,592 SCALEPlus System for Timebase's Supplemental Response to Defendant's Prior Art Statement for *Timebase Pty Ltd.* v. *The Thomson Corp.*, Case No. 07 CV 1687 (D. Minn.) May 28, 2010.
Agosti, M., Colotti, R., Gradenigo, G "A Two-Level Hypertext Retrieval Model for Legal Data,"(1991) ("Agosti 1991").
Arnold-Moore, T. & Sacks-Davis, R., "Databases of Legislation: the Problems of Consolidation,"Collaborative Information Technology Research Institute, TR-94-9, Jul. 4, 1994 ("Arnold-Moore 1994").
Arnold-Moore, T., "Automatically Processing Amendments to Legislation,"1995 ACM 0-89791-758-8/95/0005/0297 ("Arnold-Moore 1995").
Arnold-Moore, T., "Automatic Generation of Amendment Legislation,"1997 ACM 0-89791-924-6/97/96 ("Arnold-Moore 1997").
Arnold-Moore, T., Anderson, P., Sacks-Davis R., "Managing a Digital Library of Legislation,"(1997) ("Arnold-Moore 1997-2").
Azaria, A., Network World, "SGML: a Lifesaver in a Sea of Electronic Documents,"(Dec. 12, 1994) ("Azaria 1994").
Bachman, C., "The Programmer as Navigator,"(1973) ("Bachman 1973").
Bentley, J., Friedman, J., "Data Structures for Range Searching,"(1979) ("Bentley 1979").
Campbell, B., Goodman, J "HAM: A General Purpose Hypertext Abstract Machine,"(1988) ("Campbell 1988").
Caplinger, M., "Graphical Database Browsing,"(1986) ("Caplinger 1986").
Haake, A., "CoVer: A Contextual Version Server for Hypertext Applications,"Proceedings of the ACM ECHT Conference, Nov. 30-Dec. 4, 1992 ("Haake 1992").
Horne, Roger, "The Statute Law Database,"(1997) ("Horne 1997").
Kim, H., Shin, H., Chang, J., "OOHS: An Object-Oriented Hypermedia System," Proceedings of the COMPSAC '96, 0730-3157/96 ("Kim 1996").
Kimball, R., "The Data Warehouse Toolkit: Practical Techniques for Building Dimensional Data Warehouses,"(1996) ("Kimball 1996").
Lo, C., "Integrating Links and Versioning in Document Management,"(1995) ("Lo 1995").
Lo, C., "Link and Versioning Management in an SGML Based Document Management System," (1996) ("Lo 1996").
Noik, E., "Exploring Large Hyperdocuments: Fisheye Views of Nested Networks,"(1993) ("Noik 1993").
Osterbye, K., "Structural and Cognitive Problems in Providing Version Control for Hypertext,"(1992) ("Osterbye 1992").
Promenschenkel, G., "STEPS toward a new era in electronic publishing,"OCLC Newsletter No. 216, published by OCLC, Jul./Aug. 1995 ("Promenschenkel 1995").
Sacks-Davis, R., Kent, A., Ramamohanarao, K., Thom, J., Zobel, J., "Atlas: A Nested Relational Database System for Text Applications,"(1995) ("Sacks-Davis 1995").

Sciore, E., "Multidimensional Versioning for Object-Oriented Databases,"Lecture Notes in Computer Science, Deductive and Object-Oriented Databases, Munich Germany (1991) ("Sciore 1991").
Sciore, E., "Versioning and Configuration Management in an Object-Oriented Data Model," VLDB Journal 3, 77-106 (1994) ("Sciore 1994").
Stonebraker, M., Rowe, L., Hirohama, M., "The Implementation of Postgres,"(1990) "Hirohama 1990").
Stonebraker, M., Chen, J., Nathan, N., Paxson, C., Wu, J., "Tioga: Providing Data Management Support for Scientific Visualization Applications," 1994 IEEE Symposium on Visual Languages (1994) ("Stonebraker 1994").
Taylor, C., Tudhope, D., Beynon-Davies, P., "Technical Briefing Representation and Manipulation of Conceptual Temporal and Geographical Knowledge in a Museum Hypermedia System,"(1994) ("Taylor 1994").
Travis, B., Waldt, D., "The SGML Implementation Guide: A Blueprint for SGML Migration,"(1995) ("Travis & Waldt").
Wilkinson, R., Arnold-Moore, T., Fuller, M., Sacks-David, R., Thom, J., Zobel, J., "Document Computing: Technologies for Managing Electronic Document Collections,"(1998) ("Wilkinson 1998").
Wilson, E., "Reference and Reference Inversion in Statutes and Cases: a Hypertext Solution,"(1988) ("Wilson 1988").
Wilson, E., "Cases for Justus: Preparing a Case Database for a Hypertext Information Retrieval System,"(1990) ("Wilson 1990").
Wilson, E., "Guiding Lawyers: Mapping Law into Hypertext,"Artificial Intelligence Review 6, 161-89 (1992) ("Wilson 1992").
Larson R., "Hypertext and Information Retrival: Towards the Next Generation of Information Systems," (1988) (Larson 1988).
Peltonen, H. Mannisto, T., Alho, K., Sulonen, R., "An Engineering Document Management System" (1993) ("Peltonen 1993").
Westlaw DataBasics(1993) ("DataBasics 1993").
Teply, L., "Legal Research and Citation,"(1992) ("Teply 1992").
Johnson, N., Berring, R., Woxland, T., "Winning Research Skills,"(1991) ("Johnson 1991").
Password: Power Research,(May 1991)("Password 1991").
Westlaw Reference Manual(1993) ("Westlaw Ref 1993").
Wren, C., Wren, J., "Using Computers in Legal Research: A Guide to LEXIS and WESTLAW,"(1994) ("Wren 1994").
Discovering Westlaw: The Essential Guide (1992) (DOCNO 00078880) ("Essential Guide").
Westmate 5.1 for Windows, User Manual, (1993) ("Westmate User Guide 1993").
Discovering Westlaw: The Essential Guide (1996) ("Essential Guide").
Arnold-Moore, T., "Information Systems for Legislation,"(thesis) (1998?) ("Arnold-Moore Thesis").
Arnold-Moore, T., Clemes, J., Tadd, M. "Connected to the Law: Tasmanian Legislation Using EnAct,"1999. ("Arnold-Moore 1999").
Cook, J., Arnold-Moore, T., Paice, S., "Legislation in Its Natural State,"SGML Asia-Pacific Conference (Sep. 25, 1996).
McGhie, L. O'Sullivan, C., Australian Law Librarian, "Tasmanian, Western Australian and Queensland Legislation on the Internet,"(Jun. 1998) ("McGhie 1998").
Tasmanian State Service, "Legislative System Project Newsletter,"(Jun. 1997) ("LSP Newsletter 1997") ("TSS 1997").
Tasmanian State Service, "Legislative System Project Newsletter,"(Feb. 1998) ("LSP Newsletter 1998") ("TSS 1998").
Wilkinson, R., Arnold-Moore, T., Fuller, M., Sacks-David, R., Thom, J., Zobel, J., "Document Computing: Technologies for Managing Electronic Document Collections," (1998) ("Wilkinson 1998").
ELI 1997 Conference Program ("ELI Program").
Kerr, P., Hoyle, A., Gilchrist, J., A n Introduction to Legal Resources on the Internet (2000) ("Kerr 2000").
SCALEplus User Manual (Version 3.0, Jan. 20, 1998) ("SCALEplus UM").
SCALEplus User Manual (Version 3.0, Jan. 20, 1998) ("SCALplus UM 2").
Documentum LeafConnect for Interleaf (1996) ("Leafconnect 1996").
Interleaf 6 SGML (1995) ("Interleaf 6 1995").

(56) References Cited

OTHER PUBLICATIONS

Interleaf 6 Workgroup Tools (1995) ("Interleaf Workgroup 1995").
Interleaf 5 <SGML> User's Guide (1994) ("Interleaf UG 1994").
Documentum Workspace(Oct. 14, 1996) ("Documentum Workspace 1996").
Documentum Announces First Industrial-Strength Product for Web Content Management: Documentum RightSiteTM assembles current and individualized information for diverse user needs,(Oct. 14, 1996) ("RightSite 1996").
Ovum Evaluation of Documentum (1996) ("Ovum Documentum 1996").
Ovum Evaluation of Interleaf (1996) ("Ovum Interleaf 1996").
De Mets, G., "Consleg Interleaf: SGML Applied in Legislation,"(1996) ("Consleg 1996").
Astoria: Information Repository & Management Infrastructure,(Apr. 1997) ("Astoria 1997-1").
XSoft Premieres Document Component Management System,(Mar. 1996) ("Astoria 1996").
Chrystal Software Recognizes that Organizations Want to Reach Out to the Consumers of Their Document Information,(1997) ("Astoria 1997-2").
Astoria Delivers a Complete Document Management System that Offers Powerful Tools to Search, Edit, Share, and Track Documents and Their Components,(1997) ("Astoria 1997-3").
XSoft, A Division of Xerox, Astoria (Jul. 12, 1996), found at http://xml.coverpages.org/duCharme-sgmldbms.html.
XSoft Premieres Astoria; A Simpler Way to Manage 'Mega-Documents', from PR Newswire (Mar. 12, 1996), found at http://www.highbeam.com/doc/1G1-18079234.html.
Law Desk NY Official Reports, 2nd Series, Lawyers Cooperative Publishing (1995) ("NY Official Reports") on CD Labeled THOM00213522-24.
New York Consolidated Laws Service, Lawyers Cooperative Pub. Co. (1992) ("NY CLS Beta") on CD Labeled THOM00213530.
Social Security Plus, Version 1.1, Clark Broadman Callaghan (Nov. 1994) ("Social Security Plus") on CD Labeled THOM00213521.
RIA OnPoint CD-ROM Tax Library, Research Institute of America (1992) ("OnPoint") on CD Labeled THOM00213529.
Core Materials on Legal Ethics: An Electronic Publication of the Legal Information Institute Cornell Law School, Cornell University (1995) ("Core Materials on Legal Ethics") on CD Labeled THOM00213536.
New Mexico Law on Disk, The Michie Company (1991) ("New Mexico Law") on CD Labeled THOM00213527.
Federal Rules of Civil Procedure, Cornell University (1995) ("Federal Rules of Civil Procedure") on CD Labeled THOM00213532-33.
Uniform Commercial Code, Disk #1, Articles 1,2,3: An Electronic Publication of the Legal Information Institute of Cornell Law School (1995) ("UCC") on CD Labeled THOM00213531.
Law Desk NY Official Reports, 2d Series, Lawyers Cooperative Publishing (1995) ("Law Desk NY") on CD Labeled THOM00213528.
Law Desk United States Code Service Titles 1-50, US Constitution, Court Rules, Tables, 4th Quarter 1995, Lawyers Cooperative Publishing (1995) ("Law Desk USCS") on CD Labeled THOM00213525.
"Celebrating a Decade of SGML," SGML'96 Conference Proceedings, (Nov. 18-21, 1996).
Campbell, C. and McGurk, J., "Revising Statutes with Computer Support," 8 Statute Law Review 104 (1987).
Chang, E.E., et al., "The Design and Implementation of a Version Server for Computer Aided Design Data," 19 Software—Practice and Experience 199 (1989).
Corbett, M., "Indexing and Searching Statutory Text," 84 Law Library Journal 759-67 (1992).
Cunliffe, D., Taylor, C., Tudhope, D., Query-Based Navigation in Semantically Indexed Hypermedia, Proceedings of the Eighth ACM Conference on Hypertext Hypertext '97 Publisher: ACM Press (Apr. 1997).
DeRose, S., Maier, E., Orchard, D., XML Linking Language (XLink) Version 1.0, W3C Proposed Recommendation (Dec. 20, 2000). [THOMOO198594 THOMOOOO198627].
Dymalski, S., "InterleafTips and Tricks," (1994).
Edelweiss, N., de Oliveira, J.P., Pernici, B., "An Object-Oriented Approach to a Temporal Query Language," 5th International Conference, DEXA 225 (1994).
Elmasri, R. and Wuu, G., "A Temporal Model and Query Language for ER Databases," Proceedings of the Sixth International Conference on Data Engineering 76 (1990).
Elmasri, R. et al., "The Time Index: An Access Structure for Temporal Data," Proceedings of the Very Large Data Bases Conference (VLDC) (1990).
Folio Views Software (See, e.g., Folio Views Infobase Production Kit Utilities Manual, Version 3.1, Provo, Utah: Folio Corporation (Jun. 1, 1994)).
Francois, P., "Generalized SGML Repositories: Requirements and Modeling," (1996). [THOMOOI98989-THOMOOI99002].
Fuller, M., Sacks-Davis, R., Wilkinson, R., "Presenting Query Results in a Hyperbase," (May 21, 1996). [SAIC000568-SAIC000577].
Goldfarb, C.F., "The SGML Handbook," (Feb. 28, 1991).
Greenleaf, G.et at, "Public Access to Law via Internet: the Australian Legal Information Institute," 6 Journal of Law (1995).
Guttman, A, "R-Trees: A Dynamic Index Structure for Spatial Searching," Proceedings of the ACM International Conference on the Management of Data (SIGMOD) (1984).
Haake, A, "Under CoVer: The Implementation of a Context Virtual Server for Hypertext Applications," ACM ECHT '94 Proceedings (1994).
Harold, E., "XML: Extensible Markup Language," (1990). [THOMOO198945-THOM198967].
Hoey, M., "The Discourse Properties of the Criminal Statue," in Computer Power and Legal, Walter (ed.) (1988).
Kimball, R. and Strehlo, K., "Why Decision Support Fails and How to Fix It," ACM SIGMOD Record, vol. 24, No. 3, (Sep. 1995).
Kimball, R. "Is ER Modeling Hazardous to DSS?", DBMS, (Oct. 1995).
Kolovson, C.P. and Stonebreaker, M., "Indexing Techniques for Historical Databases," Proceedings of the IEEE Data Engineering Conference 127 (1989).
Kolovson, C.P. et al., S-Trees: Database Indexing Techniques for Multi-Dimensional Interval Data, Technical Report UCB/ERL M90/35, Electronics Research Laboratory, College of Engineering, University of California, Berkeley (1990).
Li, C. and Wang, S., "Efficient Storage Structures for Temporal Object-Oriented Databases," 5th International Conference, DEXA 246 (1994).
Lo, C., "Link and Versioning Management in an SGML Based Document Management System," (1996). [THOM00202985-THOM00203208].
Lum, Y, et al., "Designing DBMS Support for the Temporal Dimension," ACM SIGMOD Record, vol. 14, Issue 2 (Jun. 1984).
Maioli, C., Sola, S., Vitali, F., "Versioning Issues in a Collaborative Distributed Hypertext System," Technical Report UBLCS-93-6 (Apr. 1993).
Rotem, D. and Segev, A., "Physical Organization of Temporal Data," Proceedings of the Third International Conference on Data Engineering 547 (1987).
Snodgrass, R. and Ilsoo, A, "A Taxonomy of Time in Databases," Proceedings of the ACM SIGMOD International Conference on Management of Data 236 (1985).
Spinellis, D., "The Design and Implementation of a Legal Text Database," 5th International Conference, DEXA 339 (1994).
Stonebraker, M., The Design of the Postgres Storage System (1987).
Travis, B., Waldt, D., "The SGML Implementation Guide: A Blueprint for SGML Migration," (1995). [THOM00204371-THOM00204649].
Van Herwijnen, E. "Practical SGML, Second Edition," (1994).
Wagner, R. and Mansfield, R., "XML All-In-One Desk Reference for Dummies," (2003).
Whitehead, E. James, "Versioning in Hypertext Systems," (1999).

(56) References Cited

OTHER PUBLICATIONS

Wilkinson, R., Arnold-Moore, T., Fuller, M., Sacks-Davis, R., Thom, J., Zobel, J., "Document Computing: Technologies for Managing Electronic Document Collections," (1998).

Zizi, M., Beaudouin-Lafon, M., "Accessing Hyperdocuments Through Interactive Dynamic Maps," (1994). [THOM00198637-THOM00198646].

Zobel, J., Wilkinson, R., Thom, J., Sacks-David, R., Macki, E. Kent, A., Fuller, M., "An Architecture for Hyperbase Systems Technical Report 42," (Jun. 1991). [THOM00206364-THOM00206378].

Article entitled "An SGML based hypertext information retrieval system" by Anthony Botham et al. Date is unclear. The latest ref it cites is 1992.

Article entitled "A Formal Model of Databases of Structured Text" by Brian Lowe et al dated Sep. 1994.

Article entitled "SQL a data model and quey language for structured documents" by Tim Arnold-Moore et al dated May 1, 1994.

Article entitled "Querying a large Hyperbase" by Michael Fuller et al undated. Latest reference cited is 1994.

Article entitled "Simple Anaphoric Reference Resolution for Document Retrieval" by Michael Fuller et al undated. Latest ref cited is 1990.

Asset Management, SGML and Database publishing Recapping Seabold 1997.

Ashman, Helen, Electronic Document Addressing: Dealing with Change, University of Nottingham, ACM Computing Surveys, vol. 32, No. 3, Sep. 2000, p. 201-212.

Prevelakis, Vassilis, A Framework for the Organization and Dynamic Reconfiguration of the World Wide Web, University of Geneva, Aug. 1996.

Sacks-Davis et al., The Structured Information Manager (SIM), ACM 1998.

Sacks-Davis, The Structured Information Manager: A Database System for SGML Documents, Proceedings of the 22nd VLDB Conference, 1996.

Lee et al., Management of Multi-structured Hypermedia Documents: A Data Model, Query Language, and Indexing Scheme, Kluwer Academic Publishers, May 1, 1991.

Cowan et al., Enhancing Code for Readability and Comprehension Using SGML, IEEE 1994.

Deposition Transcript of Timothy J. Arnold-Moore Ph.D. including Exhibits 1-9, 11, 14-18 for for *Timebase Pty Ltd.* v. *The Thomson Corp.*, Case No. 07 CV 1687 (D. Minn.) Jun. 22, 2010.

Deposition Transcript of Christoph Schnelle including Exhibits A.M. 2, A.M.3, A.M.14, 59-61, 123, 125, and Schnelle 1-5 for *Timebase Pty Ltd.* v. *The Thomson Corp.*, Case No. 07 CV 1687 (D. Minn.) Aug. 11, 2010.

Deposition Transcript of Nicola Jane Lessing including Exhibits 59-61, 95, 113-117, 119, and 120 for *Timebase Pty Ltd.* v. *The Thomson Corp.*, Case No. 07 CV 1687 (D. Minn.) Aug. 10, 2010.

Morrison Michael et al. XML Unleashed, Sam's Publishing Indianapolis, IN, Dec. 1999, pp. 398-415, 482-489, 506-507 and 518-519.

Baru, Chaitanya, "Xviews: VML Views of Relational Schemas" San Diego Supercomputer Center Technical Report, SDSC TR-100-3, Oct. 1999, 18 pages.

Sturm, Jake Developing XML Solutions, Microsoft Press, Redmond, WA 2000, pp. 287-289, 347-348 and 359-366.

DeRose, W3C: XML Linking Language XLink, Dec. 20, 2000, W3C, Version 1.0, pp. 1-27.

Arnold-Moore, Timothy and Sacks-Davis, Ron; Databases of Legislation: the Problems of Consolidations, Collaborative Information Technology Research Institute, May 15, 1994.

Freeman, Simon and Callum, Euan; A Brief History of Time Travel; Legal Information Management 4 (2004) pp. 28-30.

Adrenne Azaria "SGML: A lifesaver in a Sea of Electronic Documents." Network World 11/50, Dec 12, 1994.

Legal Database program entitled Status utilizing Folio Bound Views, Pub 1994.

"Cyclic cvsweb page" Cyclic Software, Archive Jan. 27, 1998 http:www.cyclic.com/cyclic-pages/webcvsweb.html Fenner, William, cvs © 1996.

Memorandum dated Oct. 7, 2011 for *Timebase Pty Ltd.* v. *The Thomson Corp.*, Case No. 07 CV 1687 (D. Minn.).

Helen Ashman, Electronic Addressing: Dealing with Change. Sep. 2000, ACM, pp. 201-212.

Lee et al., CPI: Constraints-Preserving Inlining Algorithm for Mapping XML DTD to Relational Schema, Data & Knowledge Engineering 39, 2001, pp. 3-25.

Second Amended Complaint—Civil case 3:13-cv-00422-WHR, US District Court, Southern District of Ohio, Western Div., Apr. 15, 2014.

Exhibit H from Second Amended Complaint of item #1this list, Claim Chart, Apr. 15, 2014.

Complaint from sister patent 8,386,484 filed in Northern District of Illinois, Sep. 9, 2013 in civil case: 1:13 cv-05044.

Defendants Answer from sister patent 8,386,484 filed in Northern District of Illinois, Sep. 9, 2013 in civil case: 1:13 cv-05044.

Communication of the Board of Appeals (EPO)—EP-98901249.7 Appeal No. TO328/09-3.5.07, Nov. 21, 2014.

\* cited by examiner

MALTWEB MULTI-AXIS VIEWING INTERFACE AND HIGHER LEVEL SCOPING

CROSS REFERENCE TO RELATED APPLICATIONS

This application is a continuation of U.S. application Ser. No. 11/600,778, filed on Jul. 17, 2006, now allowed, which is a continuation of U.S. application Ser. No. 09/689,927, filed on Oct. 12, 2000, now allowed, which is a continuation-in-part of U.S. application Ser. No. 09/108,999, filed on Jul. 1, 1998, now U.S. Pat. No. 6,233,592, which is a continuation of International Application No. PCT/AU1998/000050, filed Jan. 30, 1998, which designated the United States and was published in English, and which claimed priority to Australian Application No. PO4892, filed on Jan. 31, 1997. Each of these applications, in their entirety, are incorporated herein by reference.

FIELD OF THE INVENTION

The present invention relates to an electronic publishing system, and in particular to an electronic publishing system for the delivery of information which is not limited as to storage space and is not governed by predetermined pathways.

The present invention relates generally to an electronic publishing system and, in particular, to aids for navigating in an electronic publishing system and a method of organising data in an electronic publishing system.

BACKGROUND

Conventionally, information is published in document form as a printed publication, or in electronic form but again using the document or book metaphor. In the past, the concept of a "multidimensional space" in electronic publishing has been intuitively understood (that is, instinctively desired). However, a comprehensive display, discussion or treatment has been rejected by publishers and information providers as too difficult to develop and manage. Instead, publishers and information providers have managed large amounts of data:

(1) by limiting the size or coverage of the information space; and (2) by setting or predetermining the path through that information space.

The effect of this is clearest when the dimension of time is considered. The conventional approach to information storage and publishing is centred on the notion that information is either "current information" (ie, present day) or "historical information" (ie, the day before the present day and all days prior to that). Thus, information is traditionally retained (stored) and/or published (sold) as either current or historical information.

The effect of this has been to leave the end user with a collection of non-integrated repositories and many additional tasks to do before the information is useful to them. For example, the end user is required to:

(1) make most of their own connections between related pieces of information;

(2) do their own analysis of the type and subject of information they require or are seeking; and (3) find information appropriate to the point in, or period of, time with which they are concerned.

To illustrate the disadvantages of conventional publishing systems, an example of using such conventional techniques and publishing systems to research information is provided. If a person were interested in information regarding the powers of the Secretary under Australian legislation with respect to couples in a family relationship, when and how the Secretary is restricted, and what did the relevant legislation provide prior to that, the person would refer to relevant legal information, which is the Social Security legislation of the Commonwealth of Australia. The relevant provisions are set forth in Appendix A under the heading "Example Research". This would be determined by the end user's own knowledge of the broad subject and/or reference to secondary material.

The relevant legislative provision is Section 4, which in conventional electronic legal publishing systems might be found by looking for words or phrases such as "family", "family relationships", and "family relationships" AND "social security", where AND is a logical operator.

Once the above is established, it can be seen from the information found that Section 4 of the Social Security Act, as at Sep. 8, 1996, has been amended ten times (see Appendix A: A1. AMENDMENTS TO SECTION AT Sep. 8, 1996).

There is however nothing in the current Commonwealth Government Reprint, in either the electronic or print versions (see heading EXAMPLE RESEARCH of Appendix A), that allows the end user to see the text of those amendments or what part(s) of Section 4 were changed by them.

Thus, unless the end user is prepared to refer to many statute books, reading each piece of text against another, the end user is not able to see easily or reliably what section 4 looked like before it was amended by any one of a number of prior amending Acts. However, if the end user has a library complete enough to provide access to the prior amending Acts, the person would eventually determine that Act No 105 of 1995 is the relevant amending Act.

Further, it should be noted that, while the Commonwealth Government Reprint indicates that the Social Security Act was amended by Act No 105 of 1995, it does not indicate what section or schedule in Act No 105 of 1995 actually amended Section 4. This again requires the end user to have access to the amending Acts themselves and renders the information provided by the Reprint as to commencement (see Appendix A: B. COMMENCEMENT INFORMATION FOR ACT NO 105 of 1995 CONTAINED IN REPRINT) of little utility without a copy of the amending Act No 105 of 1995 from which it can be established that Section 14 of Act No 105 amended Section 4 of the Social Security Act with respect to powers of the Commissioner (see Appendix A: D. AMENDING ACT 1995 NO 105 AMENDING SECTION 14).

Eventually, the required information can be found but several pieces of information need to be searched by the end user. This is an arduous, time consuming, tedious and complex task that must be manually repeated for each research topic and if the same search is to be carried out again.

Conventional publishing systems, including electronic publishing systems that typically are speeded-up, paper-based publishing systems, are based on a book-metaphor. The smallest piece of information used by such conventional publishing systems is either (I) an Act or Regulation (in the case of reprints, a whole Act or Regulation is printed again), or (II) a word. Typically, conventional publishing systems choose a word as the smallest piece when legislation is amended. To track such amendments, a lawyer or their assistant may actually use scissors to cut and paste pieces of legislation or the publisher cuts and pastes each word electronically. If a whole Act or Regulation is tracked as in (I) above, it is necessary to store each new version of an Act or Regulation in its entirety.

This has a number of consequences, including:

a) only a few versions of each Act or Regulation are stored;

b) the end user rarely searches more than one reprint at a time;

c) it is very difficult to know which particular section or schedule has changed, to track how that particular section or schedule has changed, to find the relevant section of the Amending Act or Regulation that effected the section or schedule as shown in the reprint;

d) if multiple changes have occurred on a particular section or schedule between reprints, the latest version of the section or schedule can only be seen in the reprint;

e) issues like commencement of the latest version of a particular section or schedule and so-called "Application, Saving or Transitional Provisions" are difficult to recreate; and f) it is difficult to come to a full understanding of the legislation by means of the reprints.

If every single word is tracked, as in (II) above, a level of complexity results that is difficult to administer and maintain without a large number of errors. For example, some legislative sections and schedules are amended several times annually.

Table 1 provides an example where Section 6 of the Income Tax Assessment Act has been amended 70 times:

TABLE 1

| S. 6 | am. No. 88, 1936; No. 30, 1939; No. 50, 1942; No. 3, 1944; No. 6, 1946; No. 44, 1948; No. 48, 1950; No. 1, 1953; No. 65, 1957; No. 55, 1958; No. 85, 1959; Nos. 18 and 108, 1960; No. 17, 1961; No. 69, 1963; No. 110, 1964; No. 103, 1965; No. 85, 1967; Nos. 4, 60 and 87, 1968; No. 93, 1969; No. 54, 1971; Nos. 51 and 164, 1973; No. 216, 1973 (as am. by No. 20, 1974); No. 126, 1974; Nos. 80 and 117, 1975; Nos. 50, 143 and 205, 1976; Nos. 87 and 172, 1978; No. 27, 1979; No. 24, 1980; Nos. 108 and 154, 1981; No. 103, 1983; Nos. 47 and 123, 1984; No. 168, 1985; Nos. 41, 48, 52 and 154, 1986; No. 138, 1987; Nos. 73, 97, 105 and 107, 1989; Nos. 20, 35 and 135, 1990; Nos. 4, 5, 100 and 216, 1991; Nos. 80, 98 and 224, 1992; Nos. 17, 18, 57 and 82, 1993; Nos. 138 and 181, 1994; Nos. 5 and 169, 1995 |
|---|---|

It is both difficult and impractical to store the complete amendment history of every word and phrase within section 6. Trying to track all changes on such a detailed level leads to unmanageable complexity.

Largely, the split between historical and present information has come about because of the publishing and information industry's own development, and not because such is the desired or best way to manage information. Thus, a need clearly exists for an electronic publishing system that can overcome one or more of the disadvantages of conventional techniques and systems.

International Publication No. WO 98/34179 (PCT/AU98/00050), corresponding to U.S. patent application Ser. No. 09/108,999, is incorporated herein by cross reference and discloses an electronic publishing system that provides a sparse multidimensional matrix of data using a set of flat file records. In particular, the computer-implemented system publishes an electronic publication using text-based data. Predefined portions of the text-based data are stored and used for the publication. At least one of the predefined portions is modified, and the modified version is stored as well. The predefined portion is typically a block of text, greater in size than a single word, but less than an entire document. Thus, for example, in the case of legislation, the predefined portion may be a section of the Act. Each predefined portion and the modified portion(s) are marked up with one or more links using a markup language, preferably SGML or XML. The system also has attributes, each being a point on an axis of a multidimensional space for organising the predefined portions and the modified portion(s) of the text-based data. This system is simply referred to as the Multi Access Layer Technology or "MALT" system hereinafter.

Existing methods of navigating electronic publications have been derived from traditional methods used to navigate printed publications. Typical of these methods is the use of a bookmark, which is merely an indicator which identifies a page or section of interest. Bookmarks are typically limited in the information provided to users. Bookmarks follow a single axis, perhaps indicating the current page, chapter and title of the publication. However, bookmarks do not necessarily provide the user with adequate context pertaining to how the user arrived at the current page. If a user knows the exact publication desired and then navigates through the same publication, a bookmark is probably adequate for the user's needs. In the event that the user has conducted a number of searches and trawled through various versions of different documents to arrive at the current page of a publication, it is impossible for a bookmark to capture all the relevant information and provide the user with an adequate reading context. The book metaphor fails to address the abilities and complexities of electronic publications.

Existing methods of navigating compact disc based publications and Internet sites are typically ill-suited to displaying the complex data provided by MALT. Known web solutions, for example, typically handle two axes, sequential and hierarchical, using either embedded links such as Previous, Next and Contents, or expandable content frames, as provided in Windows Explorer. Further axes may be handled by incorporating embedded links in the body of the text. Such embedded links are point to point, and provide limited navigational value to the user.

Object databases are capable of providing the required functionality, but search queries employed by these databases are too complicated for untrained users, both in terms of the complexity and amount of information required.

Thus, a need clearly exists for a detailed context to be provided to users of electronic publishing, overcoming one or more disadvantages of existing systems.

SUMMARY

In accordance with a first aspect of the invention, there is provided a system for publishing electronic information, comprising:

a plurality of predefined portions of data with each predefined portion being encoded with at least one linking means, and, for each predefined portion, the each predefined portion is stored and, where such predefined portion has been modified, each such modified predefined portion is stored; and a plurality of attributes, each attribute being a point on an axis of a multidimensional space for organising the data.

In accordance with a second aspect of the invention, there is provided a recording medium for publishing electronic information, comprising:

a plurality of predefined portions of data with each predefined portion being encoded with at least one linking means, and, for each predefined portion, the each predefined portion is stored and, where such predefined portion has been modified, each such modified predefined portion is stored; and a plurality of attributes, each attribute being a point on an axis of a multidimensional space for organising the data.

In accordance with a third aspect of the invention, there is provided a method for publishing electronic information, comprising:

providing a plurality of predefined portions of data with each predefined portion being encoded with at least one linking means, and, for each predefined portion, the each predefined portion is stored and, where such predefined portion has been modified, each such modified predefined portion is stored; and providing a plurality of attributes, each attribute being a point on an axis of a multidimensional space for organising the data.

According to a first aspect of the invention, there is provided a method of navigating in a multidimensional space having three or more dimensions. The method includes the steps of:

displaying in a first display region a selected predefined portion of an electronic publication formed from predefined portions of text-based data encoded using a markup language, each predefined portion having at least one attribute being a coordinate of an axis of the multidimensional space, wherein logical connections among the predefined portions, and any logical connections between the predefined portions and predefined portions of any further electronic publication data in the multidimensional space, correspond to one or more axes of the multidimensional space;

displaying a point on a primary axis of the multidimensional space dependent upon an attribute of the displayed predefined portion;

displaying a second point on a second, viewing axis orthogonal to the first axis, the second point being derived from the first point dependent upon a logical connection between the displayed predefined portion and a predefined portion associated with the second point; and displaying information regarding the second point of the second axis in a second display region, the first and second points being displayed in two display regions.

According to a second aspect of the invention, there is provided a method of navigating in a multidimensional space having three or more dimensions, the multidimensional space containing an electronic publication formed from predefined portions of text-based data encoded using a markup language. The method includes the steps of:

providing a view comprising at least two anchor sets;

displaying at least one base point and at least a first axis depending from the base point;

displaying at least one of a further point and an axis derived from the base point;

navigating a multidimensional space formed by the points and axes;

returning to the base point when required; and adjusting the view so a current view point becomes a new base point.

According to a third aspect of the invention, there is provided an apparatus for navigating in a multidimensional space having three or more dimensions. The apparatus includes:

a device for displaying in a first display region a selected predefined portion of an electronic publication formed from predefined portions of text-based data encoded using a markup language, each predefined portion having at least one attribute being a coordinate of an axis of the multidimensional space, wherein logical connections among the predefined portions, and any logical connections between the predefined portions and predefined portions of any further electronic publication data in the multidimensional space, correspond to one or more axes of the multidimensional space;

a device for displaying a point on a selected axis of the multidimensional space dependent upon an attribute of the displayed predefined portion;

a device for displaying a second point on a second, viewing axis orthogonal to the selected axis, the second point being derived from the first axis at the first point dependent upon a logical connection between the displayed predefined portion and a predefined portion associated with the second point; and a device for displaying information regarding the second point of the second axis in a second display region, the first and second points being displayed in two display regions.

According to a fourth aspect of the invention, there is provided an apparatus for navigating in a multidimensional space having three or more dimensions, the multidimensional space containing an electronic publication formed from predefined portions of text-based data encoded using a markup language. The apparatus includes:

a device for providing a view comprising at least two anchor sets;

a device for displaying at least one base point and at least a first axis depending from said base point;

a device for displaying at least one of a further point and an axis derived from the base point;

a device for navigating a multidimensional space formed by the points and axes;

a device for returning to the base point when required; and a device for adjusting the view so a current view point becomes a new base point.

According to a fifth aspect of the invention, there is provided a computer program product having a computer readable medium having a computer program recorded therein for navigating in a multidimensional space having three or more dimensions. The computer program product includes:

a computer program code module for displaying in a first display region a selected predefined portion of an electronic publication formed from predefined portions of text-based data encoded using a markup language, each predefined portion having at least one attribute being a coordinate of an axis of the multidimensional space, wherein logical connections among the predefined portions, and any logical connections between the predefined portions and predefined portions of any further electronic publication data in the multidimensional space, correspond to one or more axes of the multidimensional space;

a computer program code module for displaying a point on a primary axis of the multidimensional space dependent upon an attribute of the displayed predefined portion;

a computer program module for displaying a second point on a second, viewing axis orthogonal to the first axis, the second point being derived from the first point dependent upon a logical connection between the displayed predefined portion and a predefined portion associated with the second point; and a computer program code module for displaying information regarding the second point of the second axis in a second display region, the first and second points being displayed in two display regions.

According to a sixth aspect of the invention, there is provided a computer program product having a computer readable medium having a computer program recorded therein for navigating in a multidimensional space having three or more dimensions, the multidimensional space containing an electronic publication formed from predefined portions of text-based data encoded using a markup language. The computer program product includes:

a computer program code module for providing a view comprising at least two anchor sets;

a computer program code module for displaying at least one base point and at least a first axis depending from said base point;

a computer program code module for displaying other points, axes or both derived from said base point;

a computer program code module for navigating a multi-dimensional space formed by said points and axes;

a computer program code module for returning to said base point when required; and a computer program code module for adjusting the view so a current view point becomes a new base point.

According to a seventh aspect of the invention, there is provided a method of publishing an electronic publication formed from predefined portions of text-based data encoded using a markup language. The method includes the steps of:

storing predefined portions in terminal nodes; and providing one or more higher level nodes for organising the terminal nodes to correspond with a hierarchical structure embodied in the electronic publication, wherein each higher level node consists of the identity of a parent node, a position indicator for the higher level node, and an identifier;

wherein one of the higher level nodes has a null parent identity, and the position indicator indicates a position of the higher level node relative to a sibling node.

According to an eighth aspect of the invention, there is provided an apparatus for publishing an electronic publication formed from predefined portions of text-based data encoded using a markup language. The apparatus includes:

a device for storing predefined portions in terminal nodes; and a device for providing one or more higher level nodes for organising the terminal nodes to correspond with a hierarchical structure embodied in the electronic publication, wherein each higher level node consists of the identity of a parent node, a position indicator for the higher level node, and an identifier;

wherein one of the higher level nodes has a null parent identity, and the position indicator indicates a position of the higher level node relative to a sibling node.

According to a ninth aspect of the invention, there is provided a computer program product having a computer readable medium having a computer program recorded therein for publishing an electronic publication formed from predefined portions of text-based data encoded using a markup language. The computer program product includes:

a computer program code module for storing predefined portions in terminal nodes; and a computer program code module for providing one or more higher level nodes for organising the terminal nodes to correspond with a hierarchical structure embodied in the electronic publication, wherein each higher level node consists of the identity of a parent node, a position indicator for said higher level node, and an identifier;

wherein one of the higher level nodes has a null parent identity, and the position indicator indicates a position of the higher level node relative to a sibling node.

According to a tenth aspect of the invention, there is provided a method of publishing an electronic publication formed from predefined portions of text-based data encoded using a markup language. The method includes the steps of:

storing predefined portions in terminal nodes; and providing one or more higher level nodes for organising the terminal nodes to correspond with a hierarchical structure embodied in the electronic publication, wherein each higher level node consists of the identity of a parent node, a position indicator for the higher level node, and an identifier, the predefined portion includes text associated with a commentary, and a scope including a start date, an end date and an update date, the update date being later than the start date and earlier than the end date;

further wherein one of the higher level nodes has a null parent identity, and the position indicator indicates a position of the higher level node relative to a sibling node.

Other aspects of the invention are also disclosed.

BRIEF DESCRIPTION OF THE DRAWINGS

A small number of embodiments of the invention are described with reference to the drawings, in which.

Figure 18:
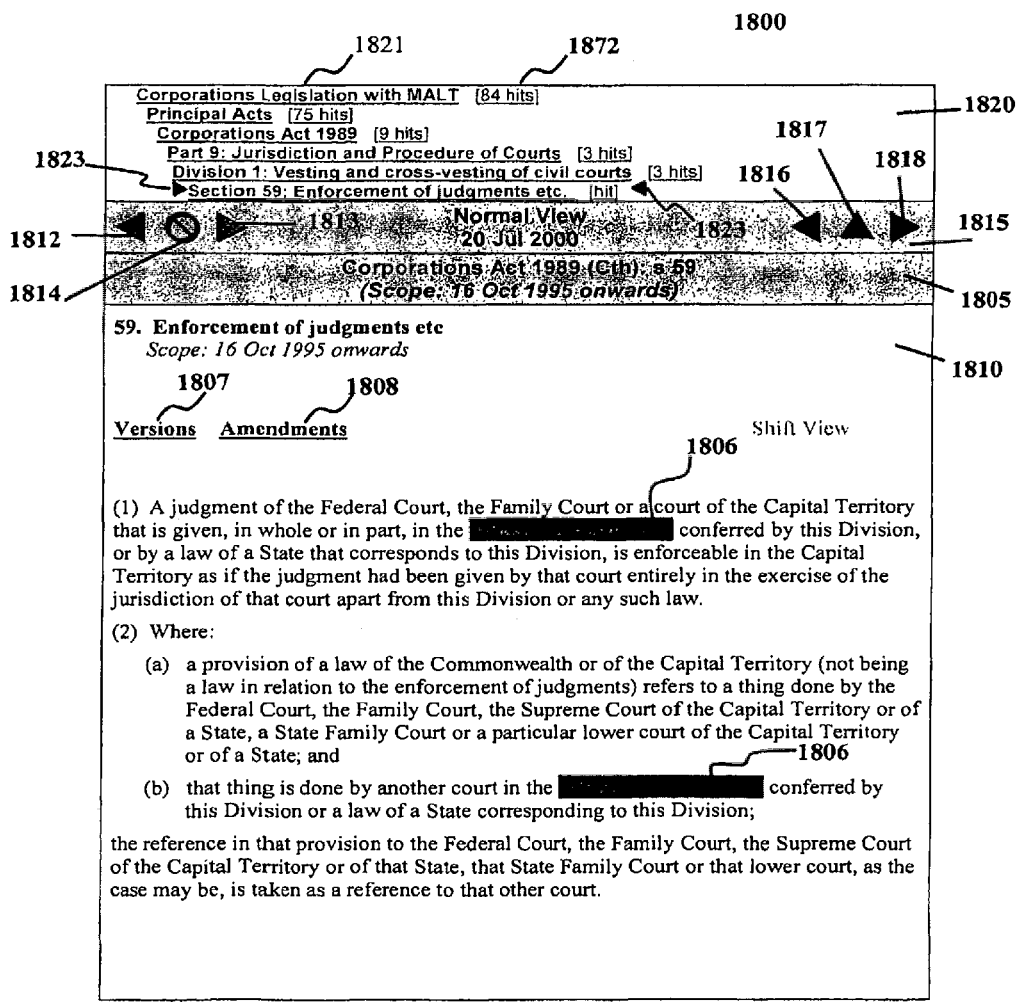
Figure 19:
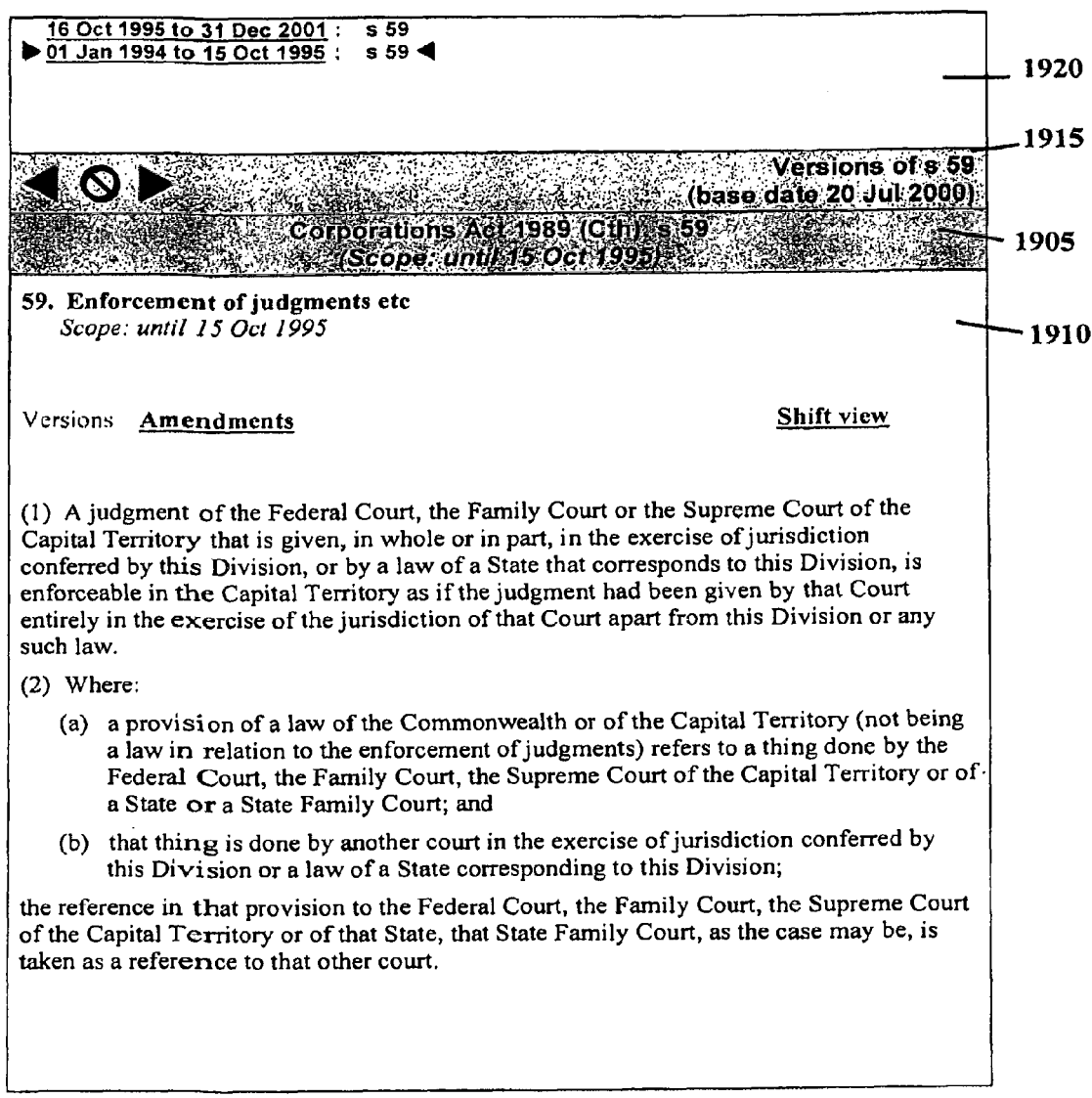
Figure 20:
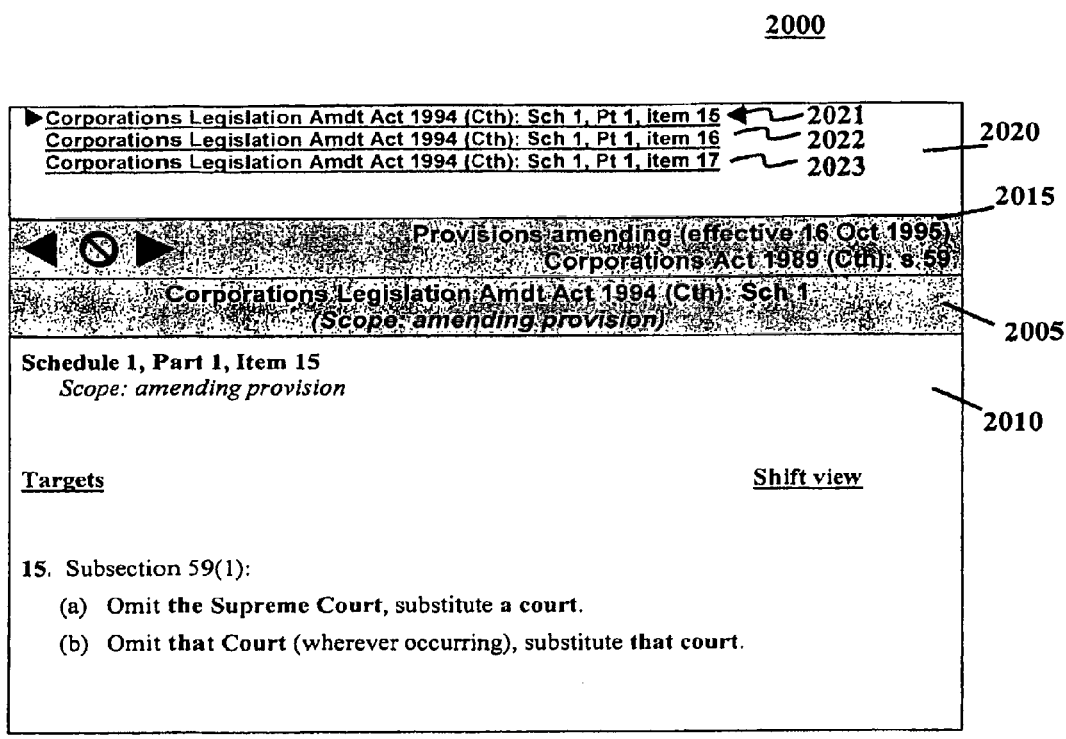
Figure 21:
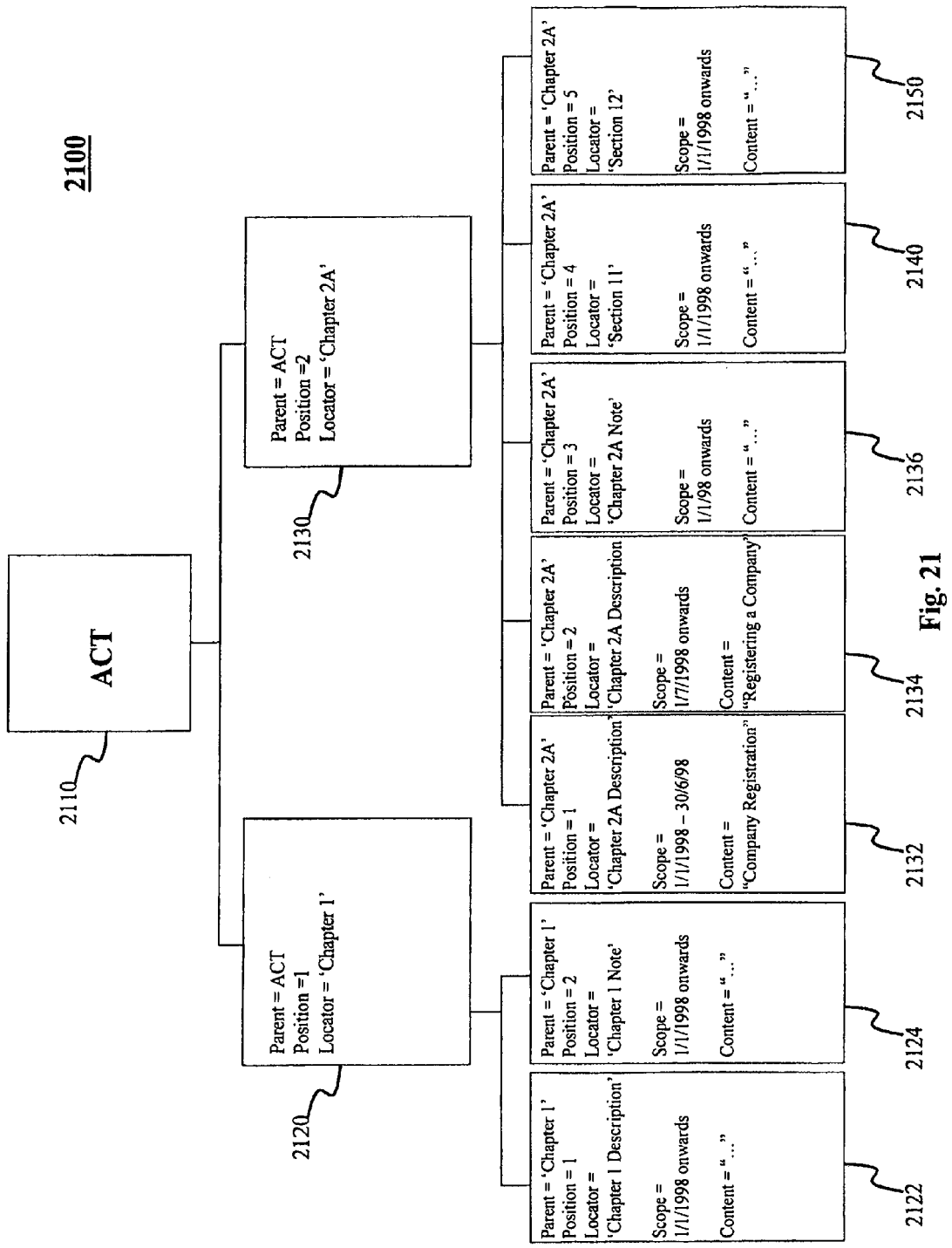
Figure 22A:
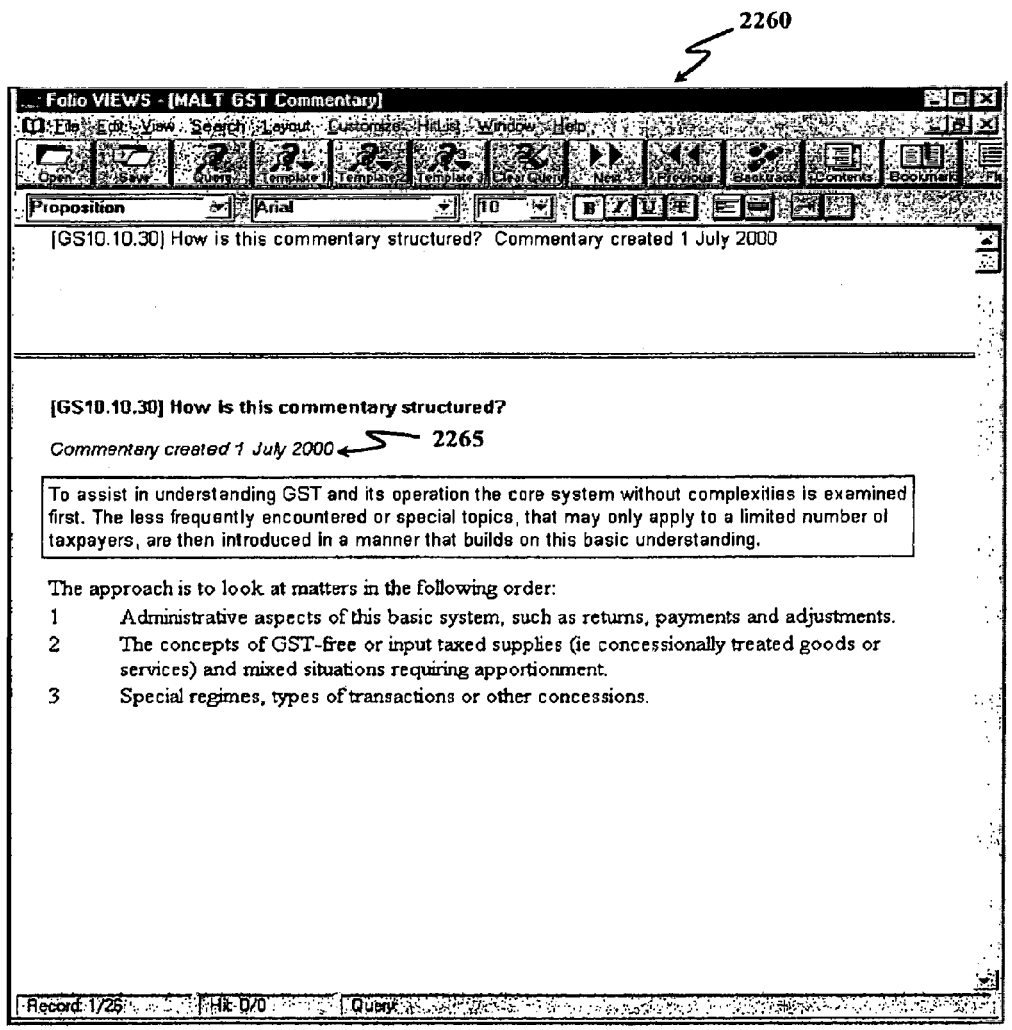
Figure 22B:
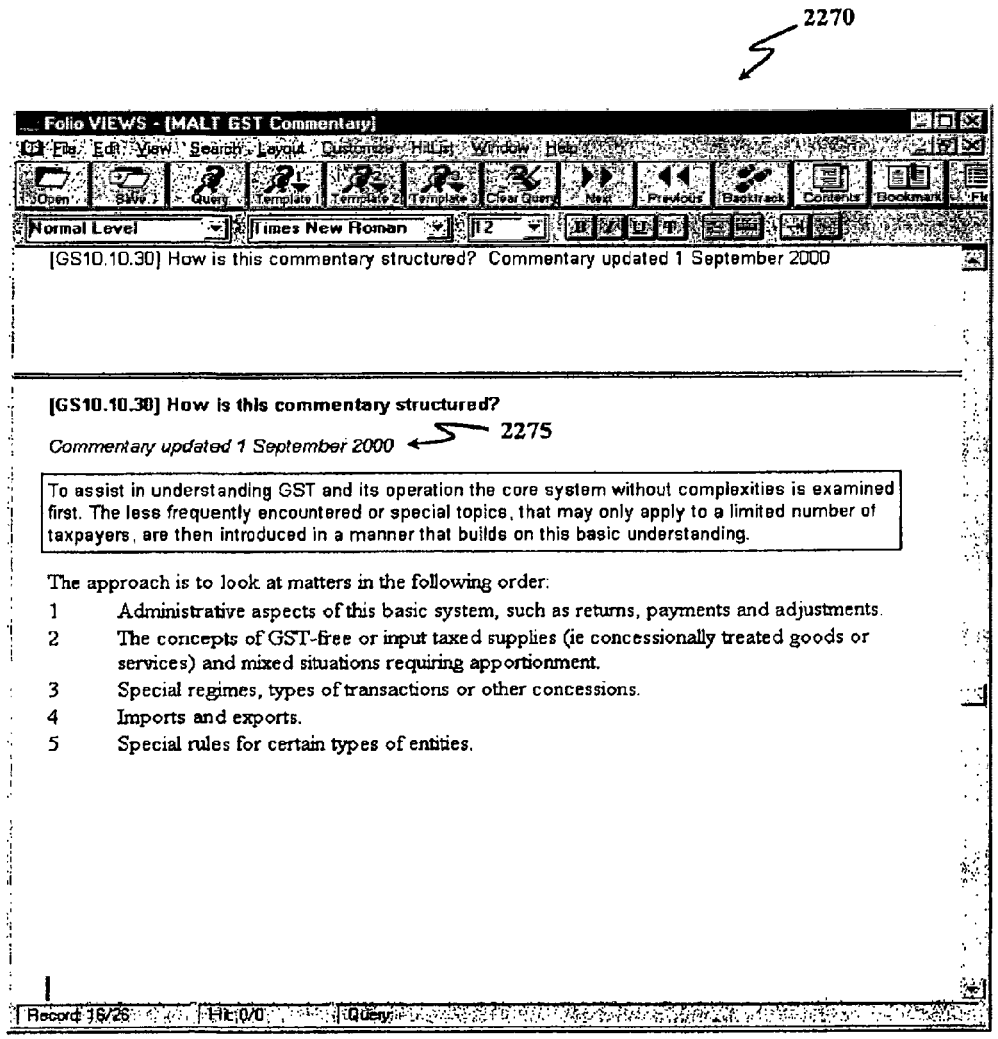
Figure 22C:
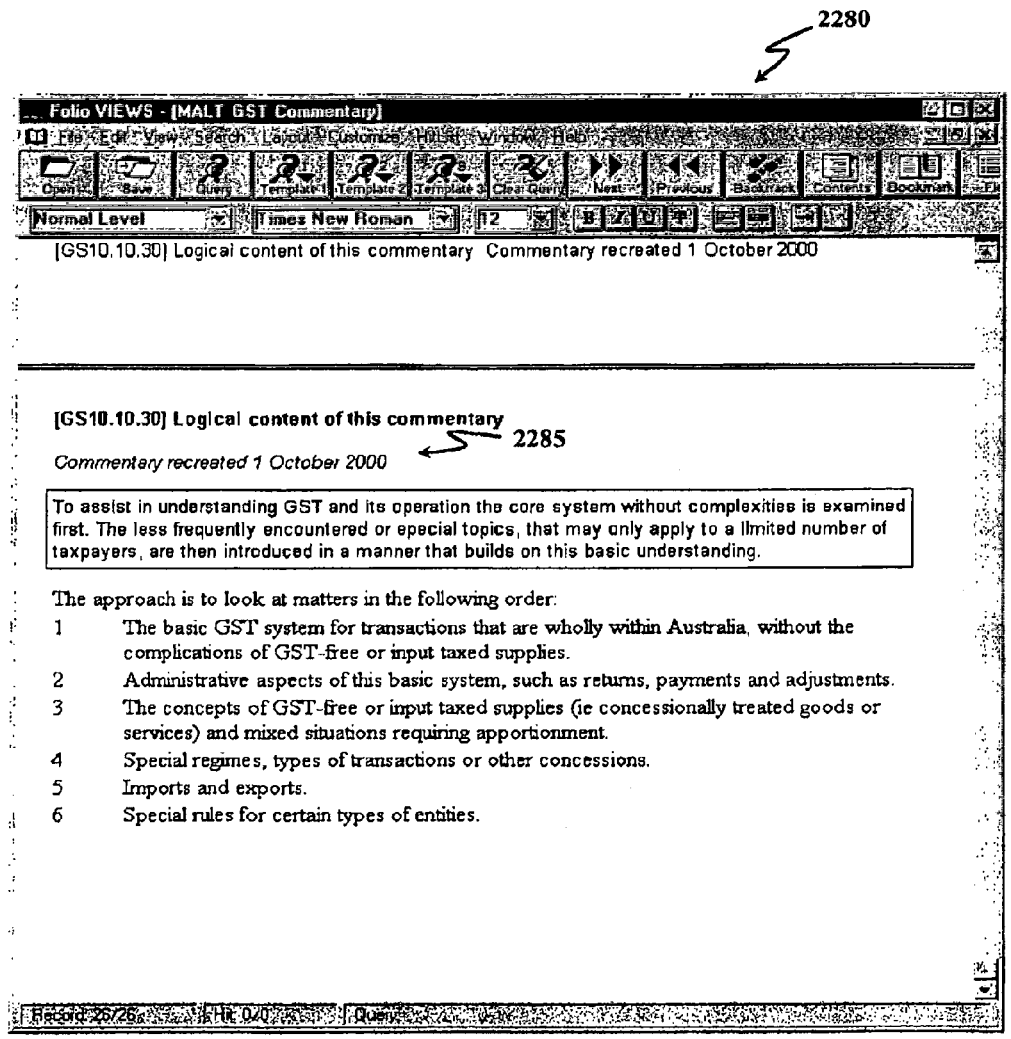
Figure 23:
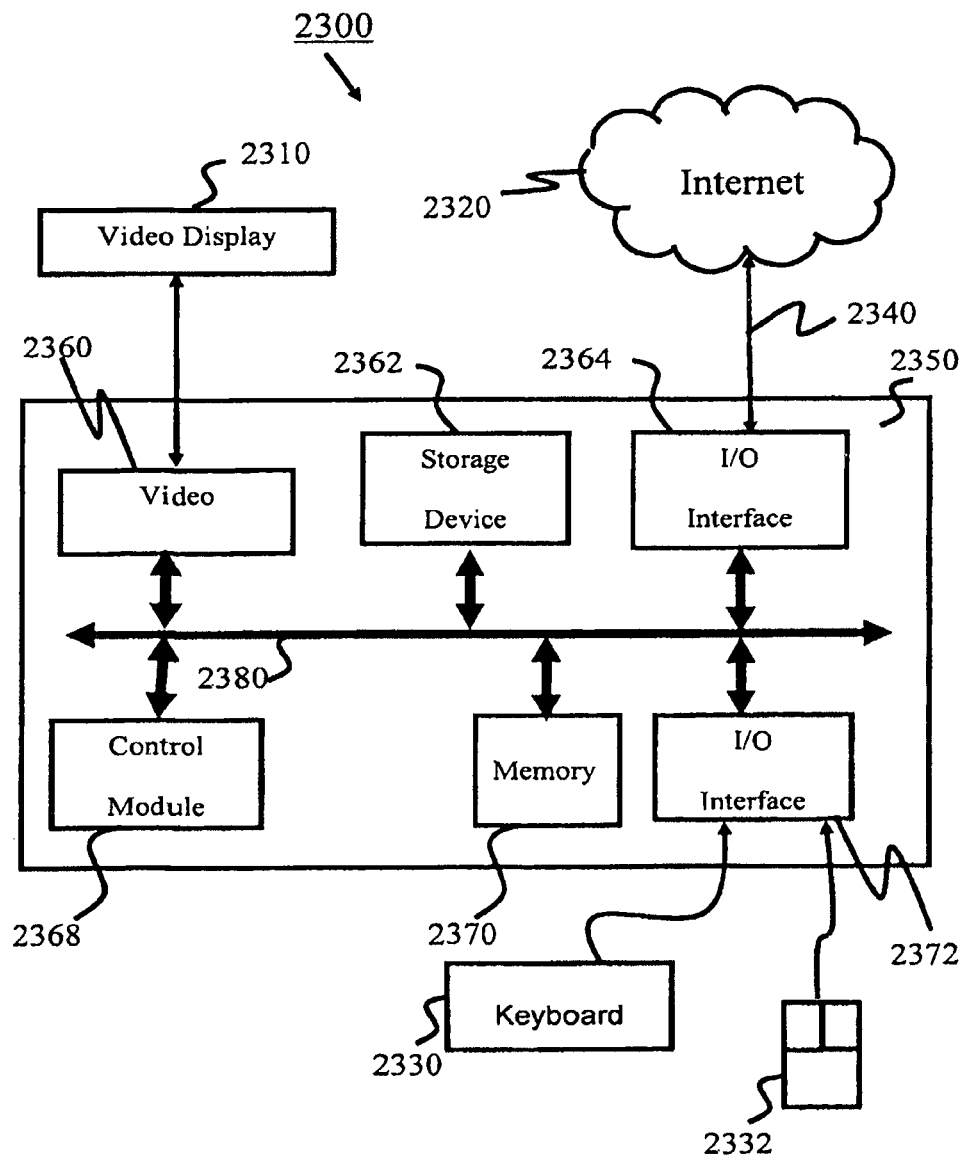

One or more embodiments of the present invention are described hereinafter with reference to the drawings, in which:

FIG. 18 is a screen shot of a Normal axis view of a MALT publication (with a search mode enabled) in accordance with an embodiment of the present invention;

FIG. 19 is a screen shot of a Versions axis view of a MALT publication in accordance with an embodiment of the present invention;

FIG. 20 is a screen shot of a Source axis view of a MALT publication in accordance with an embodiment of the present invention;

FIG. 21 is a block diagram representation of higher level scoping in accordance with an embodiment of the present invention;

FIGS. 22A, 22B and 22C are screen shots illustrating a commentary in accordance with a further embodiment of the invention; and FIG. 23 is a computer program product block diagram.

DETAILED DESCRIPTION

The present invention is directed towards a system of electronic publishing that can overcome the disadvantages of conventional information publishing, both in print and electronic form. The present invention reduces, if not eliminates, end user problems with conventional information publishing including:

(1) the connectivity between related pieces of information;

(2) analysis of the type and subject of information; and (3) finding information appropriate to the point in time with which they are concerned.

Overview of Embodiments

The embodiments of the invention provide an entirely new way of delivering, storing and publishing information. The embodiments allow publishers to add an arbitrary number of logical connections to a set of data, and even permit the publisher to display the precise evolution of that data set over time. This can be done without getting bogged down in the complexity of the logical connections and without limit as to storage space.

Frequently, people desire to have more "information" available. However, with the advent of the Internet and new technology, many people suffer from information overload. The embodiments of the invention provide an easy and effective way to navigate large complex volumes of information.

Conventionally, information may only contain very rudimentary (i.e., haphazard hyperlinks) or non existent logical connections. Thus, conventional techniques of investigating how a set of data has evolved and changed over time can only be done for small data sets and are very expensive.

However, with the embodiments of the invention, it is possible to list all logical connections within a data set no matter how complex those connections may be. The embodiments of the invention and the principles of those embodiments described hereinafter can be applied to many different types of information such as medical, scientific, pharmaceutical, etc. For ease of description, however, the embodiments are set forth in relation to legal information.

Conventionally, legislation is often purchased in two ways: (1) The individual Numbered Acts and Regulations that give each piece of legislation as it is passed; and (2) Consolidated legislation that provides the latest consolidated version.

In the embodiments of the invention, legislation is stored using every version of each Act or Regulation. The end user can search every version of any section, schedule, or provision. For example, the required version of a section is immediately available as is the opportunity to view every preceeding and subsequent version of the same section. Also, links are available to any relevant amending legislation commencing that change, as well as the one that repealed it. Relevant Application, Saving or Transitional Provisions can also be easily accessed.

In this manner, it is possible to come to a full understanding of the legislation just by looking at the data provided through the embodiments of the invention. In contrast, using conventional techniques, it would have been impossible or very hard, expensive and time consuming to do so.

Using conventional means, a person wishing to view a particular section of a particular Act (e.g., the Income Tax Assessment Act) as of a particular date (e.g., 30th June 1996), a significant amount of work would be required to do so. The end user would need to track all Amendments since the last reprint of the legislation, which may take a long time and involve referring to many volumes. This may even possibly involve using scissors and paste to actually cut and replace words. Even to figure out which Acts amended a particular section and to trace those commencement dates can be difficult, time consuming and trying. However, a piece of research that may have taken an experienced researcher days or even weeks can be accomplished in minutes using the embodiments of the invention.

The ability to move through information in time is outlined above. The embodiments of the invention also give additional flexibility and SCOPE to the end user. Further dimensions and interconnections may include: type, jurisdiction, subject, depth. Some examples are:

1. Doing research on the subject evidence at depth confession for types Acts and Case for time period 12 months.
2. Doing research on type cases within jurisdictions NSW and Queensland subject murder and depth statutes dealing with subject.

The ability to associate the relevance and interconnection contained within the information is highly advantageous to the end user.

A key aspect of the embodiments of the invention in successfully providing a multi-dimensional repository of information has been in deciding the "optimum storage unit". In the past publishers have chosen to either store new versions of the entire Act (too big) or new versions of each and every change, in a method similar to red lining (too complex). The first aspect of the invention was to analysis the data and choose to store every version of every section or provision level of legislation.

Structured Generalised Markup Language (SGML) is a recognised way to mark up data. SGML allows logical structure to be added to a document (unlike HTML and word processors which only allow the addition of visual content). SGML alone is not enough to deal with text-based data that contains a highly complex logical structure. The complexity increases exponentially until the complexity cannot be managed any more. Large legal publishers have stored their data in SGML, but those legal publishers that are successful in dealing with their SGML-based data have purposely kept their markup as simple as possible. When such publishers have tried to encode a complex structure on text-based data their costs of creating the data set and maintaining the data set simply went through the roof, and it became impossible to maintain the integrity of the data set.

In contrast, the embodiments of the invention allow SGML data to be encoded with a much more complex structure whilst remaining manageable. Alternatively, Extensible Markup Language (XML) may be used. For example, with SGML it is possible to encode all 71 versions of Section 6 of the Australian Federal Income Tax Assessment Act in a single file (that Act has about 6,000 sections) but this would be utterly unmanageable when applied to the 6,000 other sections of the Income Tax Assessment Act. It becomes even more unmanageable if anybody would try to use the above method on all the sections within all other Acts and Regulations of the Commonwealth. A significant problem with using SGML, even well executed SGML, is that it is possible to quickly get bogged down in unmanageable levels of complexity. The embodiments of the invention have overcome these problems.

Another key aspect of the invention is the use of database technologies in the management of the SGML encoded techniques. Database technology provides a large number of ready tools to deal with complex structured data. The embodiments combine these technologies (SGML, XML and database technologies) in an advantageous manner.

In the past, traditional publishers have been limited by the size and speed of available storage systems. Only a limited amount can be reproduced in paper and until recently hard disk costs prohibited the storing of multiple gigabytes of data, for both publishers and clients alike.

The embodiments of the invention have the ability to look at situations from a new and up-to-date view point and therefore come up with innovative conclusions that can be radically different to processes employed in the past.

Thus, the embodiments of the invention provide a new computer publishing system that changes the availability of electronic information from being merely "speeded up paper" to being electronic information taking advantage of new electronic media by providing users with enhanced functionality of data retrieval and manipulation. The information included in the electronic format is of a publishable standard, meets cost constraints and is able to be accessed under any combination of dimensions from the multi-dimensional space (Acts, cases, time, jurisdiction, subject). The publishing system facilitates continual updates to the data contained in the databases, without any adverse effects on the operating capabilities that make the publishing system unique. Due to the extra functionality, the publishing system is also designed in such a way that it can still be made available in as many different electronic media as possible, and all search functions are able to operate in a time-efficient manner.

The embodiments of the invention organize, process and present information in a way that is significantly different than conventional structures, processes and presentation. They provide an information storage and publishing system, and in particular, an information storage and publishing system that stores and manages large and comprehensive amounts of information (eg, legal information).

Publication data, being preferably legal information, is encoded using Standard Generalized Markup Language (SGML) or Extensible Markup Language (XML) which adds codes to the publication data and provides functionality to the data. The publication data is processed as a plurality of predefined portions, which in the case of legislation is preferably at the section, schedule level, or provision level. A hierarchy of divisions of the legislation may be implemented. For each of the predefined portions, the system stores a copy of the predefined portion and a modified predefined portion in the first database whenever it is changed. A second (relational) database is preferably provided that comprises plural attributes for managing the information of the first database, with each attribute being a point on an axis of a multidimensional space for organising the data for publication. Alternatively, a single repository of information may be practised as described with reference to the second embodiment.

The system enables the first database to be searched for one of the predefined portions of the publication data using attributes of the second database by following one or more pathways through the multidimensional space. The plurality of attributes are connected to by the plurality of links. Once the desired predefined portion is located, the predefined portions can be retrieved using the attributes to define a point in the multidimensional space.

Preferably, the system implements, inter alia, time-based legislation in which sections of legislation that have been amended are not discarded and replaced with the current provision only as of the publication date. Instead, each version of an amended section is retained in the first database. Thus, the systems according to the embodiments of the invention are particularly advantageous in that legal information is published so that a user can obtain such sections or provisions at a particular time point.

The embodiments advantageously divide information into "suitably" small pieces (or blocks) of text, each of which is a predefined portion of data, and add to each piece of text, either expressly or implicitly, a number of attributes (characteristics or descriptors). The suitability as to size of text pieces is determined by an analysis of the information and its naturally occurring structure based on knowledge of how the information is used and consumed by the end user.

This makes it possible to locate each piece or block of text at a particular point in a "multidimensional space" using as coordinates the attributes added to the piece or block of text. Multidimensional space refers to an area not having boundaries and that is capable of, or involves, more than three dimensions.

Figure 1:
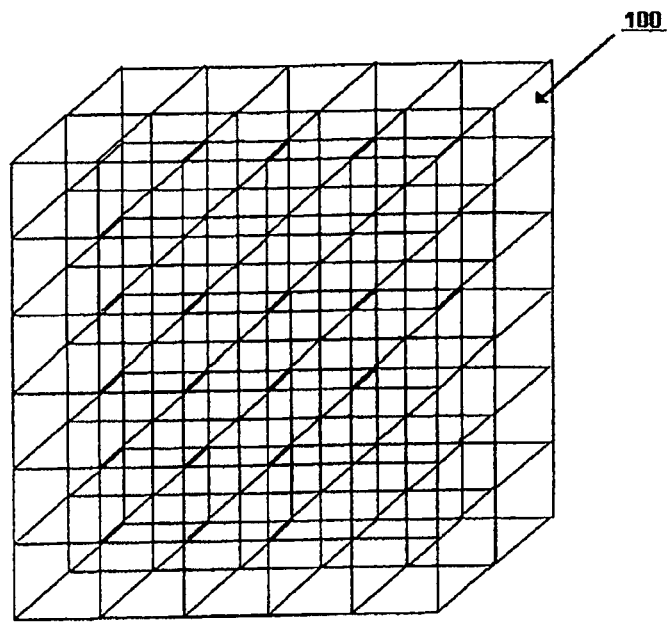
FIG. 1 illustrates a grid of a multidimensional space according to the first embodiment.

FIG. 1 illustrates a multi-dimensional space 100 as used in embodiments of the invention. The multidimensional space is represented by a layered grid. The diagram represents axes or pathways as vertical and horizontal lines; in reality (in the case of more than two dimensions), they are at all angles and inclines.

Figure 2:
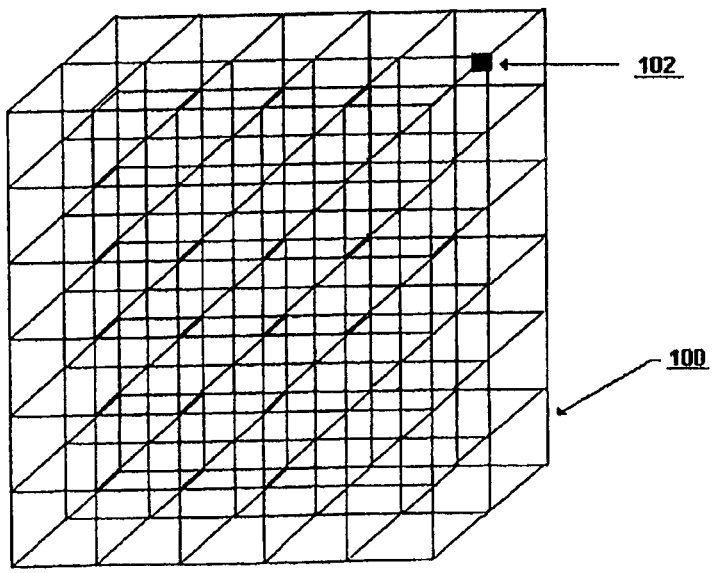
FIG. 2 illustrates the effect of the various axes.

Referring to FIG. 2, the ability to locate (assign) or map each node 102 (or key intersection point of the various axes or pathways) is a significant functional aspect of the embodiments of the invention. This mapping is explained further hereinafter. With such coordinates 102 known (located or mapped), it is possible to move easily between points in the multidimensional space 100.

Figure 3:
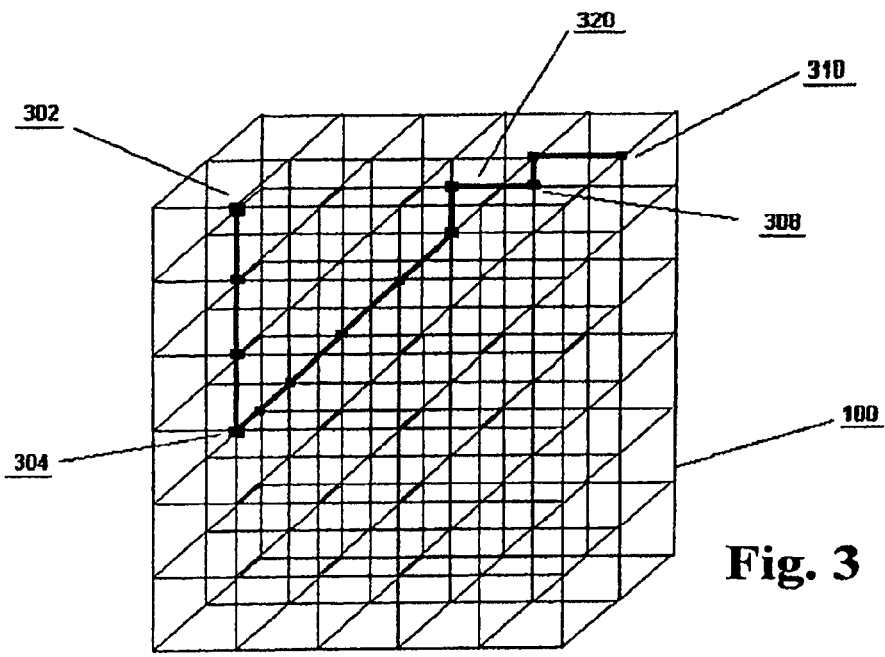
FIG. 3 illustrates the mapping of various axis intersection points, or nodes, that is used to organize, present, and find information (present and past) according to the first embodiment.

The effect of mapping nodes as shown in FIG. 3 is that a course 320 through the information represented in the three-dimensional space 100 can be easily plotted. The user begins the course 320 at node 302 and progresses vertically downward to the fourth node 304. Further, the plotted course 320 is flexible to the extent of the relationships a user chooses to follow or seek out.

First Embodiment

A first embodiment of the invention provides information management in the multidimensional space and allows movement along different axes or "pathways":

location of the information (its address);
type of information (its genesis);
jurisdiction (its class);
subject (its content description);
depth (extent of content); and
time (the point in time at which the information is viewed).

In the first embodiment, coding of information or data for publication is based on SGML or XML and one or more specifically developed Document Type Definitions (DTD), which preferably is specifically designed for legal information. Alternatively, in the case of XML, a Style Sheet Mechanism (SSM) may be used. This coding can then be related back to information retained in a specifically developed database that enables the code information to be managed and updated. For a detailed description of this aspect of the invention, reference is made to Appendix C. The DTDs according to the first embodiment are set forth in detail in Appendix B. A DTD is used to define the structure of publication data, preferably being legislation, down to a comprehensive level. This is done by using information coded in conjunction with any one of a number of off-the-shelf, free-text retrieval software packages (eg, Folio Views or Dynatext) to deliver the information to the end user.

A DTD describes the markup for the SGML publication data, or "repository", which may contain legislation, case law, journal articles and other types of material that are stored in computer files. The files contain publication data in text form and the markup, which is extra information about the text included with the text. An example of a markup is '<BD+>' which indicates that "the data from this point on is bold". A further example is '<SECTION ID="CWACT-19950104-SEC-1" LBL="1">'. This markup indicates that: the data from this point on is part of a section of legislation; the section has an identifier of CWACT-19950104-SEC-1; and the section has a label of "1".

There are a number of different ways to add markup to data. The first embodiment adds markup to data using SGML. Alternatively, XML may be used. Still further, in the case of XML being used, an SSM may be used. Even within SGML, there are many ways to add markup to text. Each particular way of adding markup within SGML is described by using a DTD. In the first embodiment, the data for publication is marked up using a number of different DTDs. In particular, the DTDs are used to mark up the logical structure of the legislation, case law or journal articles. Significant amounts of information about the data for publication is stored in the markup. For example, the markup '<SECTION ID="CWACT-19950104-SEC-1" LBL="1">' provides the following information: the data is a piece of Commonwealth of Australia legislation (indicated by 'CW' at the beginning of the string); the section is part of an Act ('ACT' after 'CW') and not a regulation; the act is Act No. 104 of 1995 ('19950104' in the middle of the string), the data is a Section ('SEC') within the Act; and it is Section 1 ('1' at the end).

The preparation of such DTDs necessitates that the author has a sound knowledge of the data that will be marked up using the DTD. It is especially important that the underlying structure of the data to be marked up using the DTD be understood. The process of becoming acquainted with the structure of the data to be marked up is referred to hereinafter as "content analysis".

In particular, the section-level or schedule-level portion of legislation is used in the first embodiment. That is, the section-level portion is preferably the predefined portion of the publication data, which is the smallest piece of information to be tracked. This is unlike conventional publishing systems. For example, with reference to Table 1, the first embodiment stores every version of Section 6. In this manner, complexity (tracking every word) is reduced by increasing storage. However, unlike example (I) of conventional publishing systems, the first embodiment does not lose any pertinent information:

a) every version of each Act or Regulation is stored;
b) the end user can search every version of any section or schedule at the same time;
c) it is easy to know which particular section or schedule has changed, to track how that particular section or schedule has changed, and to find the relevant section of the Amending Act or Regulation that affected the section or schedule;
d) if multiple changes have occurred on a particular section or schedule, every version of the section or schedule can be seen;
e) issues like commencement of the latest version of a particular section or schedule and so-called "Application, Saving or Transitional Provisions" can easily be recreated;
f) it is possible to come to a full understanding of the legislation just by looking at the data provided through the first embodiment.

A further advantage of tracking every version of each section or schedule is that it is possible to store some of the information, not in the markup, but in a database, as noted hereinbefore. This simplifies the updating process.

While SGML is a powerful way of storing information, it is not a retrieval medium. Therefore, the stored information needs to be converted into a format that the end user of the information can access. The first embodiment uses an electronic format for retrieval. For this electronic retrieval, a software application called 'high-end text retrieval software' is used. Examples of high-end, text-retrieval software applications include Folio Views and Dynatext. In the first embodiment, Folio Views is used.

Folio Views has its own proprietary markup language, which is not part of the SGML family. A complete guide to the Folio Views markup language is provided in the text Folio Views Infobase Production Kit Utilities Manual, Version 3.1, Provo, Utah: Folio Corporation (1 Jun. 1994). Storing the data for publication in SGML allows other retrieval software applications besides Folio Views to be used.

In the first embodiment, a process is implemented to convert the SGML marked-up data into the format used by the retrieval software application. The example given for Folio Views hereinafter is but one example of the process involved. The conversion program basically maps the SGML markup to Folio Views markup. For example, for the SGML markup '<SECTION ID="CWACT-19950104-SEC-1" LBL="1">', the conversion process marks all ID's substantively unchanged as Jump Destinations (JD's): '<JD:="CWACT-19950104-SEC-1">'.

A Keying Guide for Australian Legislation Documents with instructions for the conversion process to Folio Views added is provided in Appendix D.

Movement through legal information can be as follows (the flexibility and scope is largely up to the end user):

(1) doing research on the subject of fences and boundaries at the depth fences that are hedges looking for types Acts and Regulations in jurisdictions NSW and Victoria for the time period last 20 years;
(2) doing research on the subject evidence at depth confession for types Acts and cases for time period last 12 months; or
(3) doing research on type cases with jurisdictions NSW and Queensland, subject murder and depth statutes dealing with subject.

Figure 4:
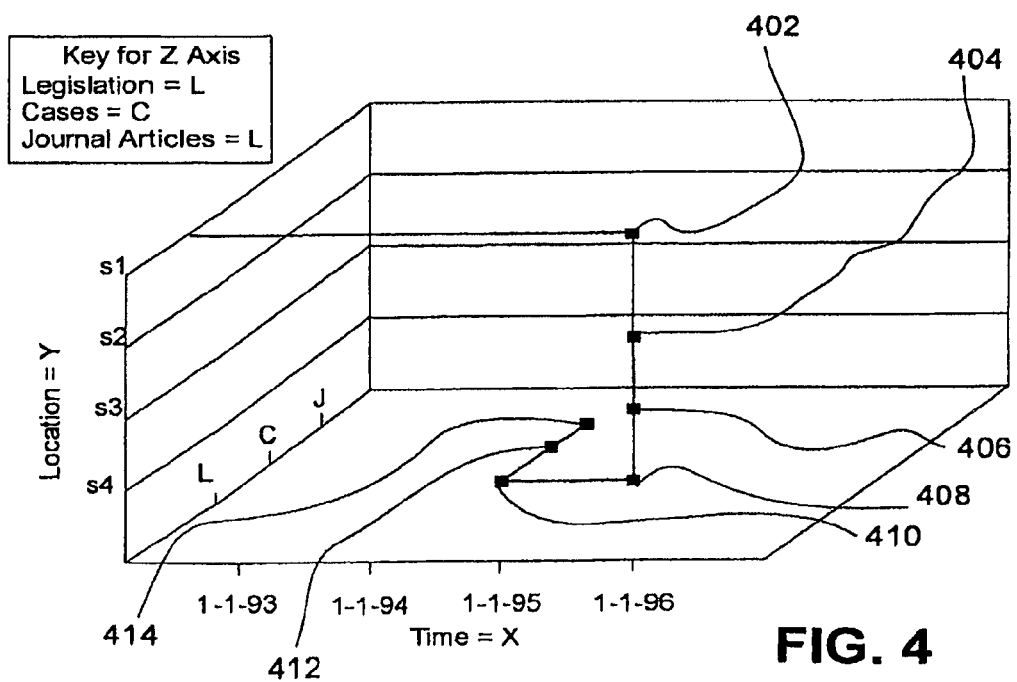
FIG. 4 illustrates the application of legal information to mapped nodes according to the first embodiment.

The application of legal information to mapped nodes is shown in FIG. 4. However, this is only one of numerous possible applications. Information from medical, technical and scientific areas are all open to the application of this invention. This diagram substitutes the technical terminology of FIG. 3 with legal terms to show the way information appears according to the first embodiment. Further, FIG. 4 provides an example of how legal information is navigated by an end user. The user may be seeking information on the following matters:

(1) Does NSW legislation on fences presently cover hedge rows between the boundary of a private property and a public road?
(2) If not, have such hedge rows ever come under NSW legislation?
(3) Are there any cases under current law or previous law?
(4) How have the cases been interpreted?

Some general assumptions are made about legal information for the purposes of this example. Broadly, legal information has two main primary sources: statute law (including subordinate legislation), and case law. There is also secondary information such as commentary which can be added to aid interpretation. Each of these sources is interconnected and relevant to the other in terms of both past and present information. This may also apply to future information in terms of bills or other forms of uncommenced legislation. It is the association of this relevance and interconnection that is advantageous to the end user.

In FIG. 4, the X-, Y-, and Z-axes indicate time (Time), the legislative provision (location), and type (eg, legislation=L, cases=C, and journal articles=J). To simplify the diagram, only three axes are illustrated, however, other axes may be included dependent upon the number of dimensions of the space. In the first embodiment, the multidimensional space also includes another three axes: jurisdiction=U, subject=V, and depth=W. Thus, the space according to the first embodiment has six dimensions. In the six-dimensional case, it is possible to move along each axis and at the points of intersection change direction, as well as find and/or follow new or additional information.

The end user begins at legislation (L) along the Z-axis, where the Fences 10 and Boundaries Act is located and then selects Section 1 of legislation (indicated by L allowing the Z-axis) at node 402, as of 1 Jan. 1996. The user then follows a path in the legislation through nodes 404, 406 and 408 for Sections 2, 3 and 4, respectively, as of that same date (ie, the Y-axis), to find a definition of the term "fences". Node 408 contains Section 4 at 1 Jan. 1996 which contains the current definition of "fences". This would provide information in response to above query (1).

The user then selects Section 4 of the legislation as of 1 Jan. 1995, which in this case is an earlier version of the section prior to amendment, by moving to node 410 (along the X-axis). This provides information about the prior law for above query (2). The user can then move to other information on Section 4 as of 1 Jan. 1995 by going to nodes 412 and 414 for case and journal article information, respectively, along the Z-axis. For example, a case on the earlier Section 4 might be identified at node 412 and articles on interpretation of Section 4 at node 414. The foregoing is only one possible route through the multidimensional space of information. Other more complicated and interrelated pathways involving axes U, V and W are possible. For example, the user can move to axis U (jurisdiction) and compare the definition in Section 4 of New South Wales with that in another jurisdiction (eg, Victoria).

Figure 6:
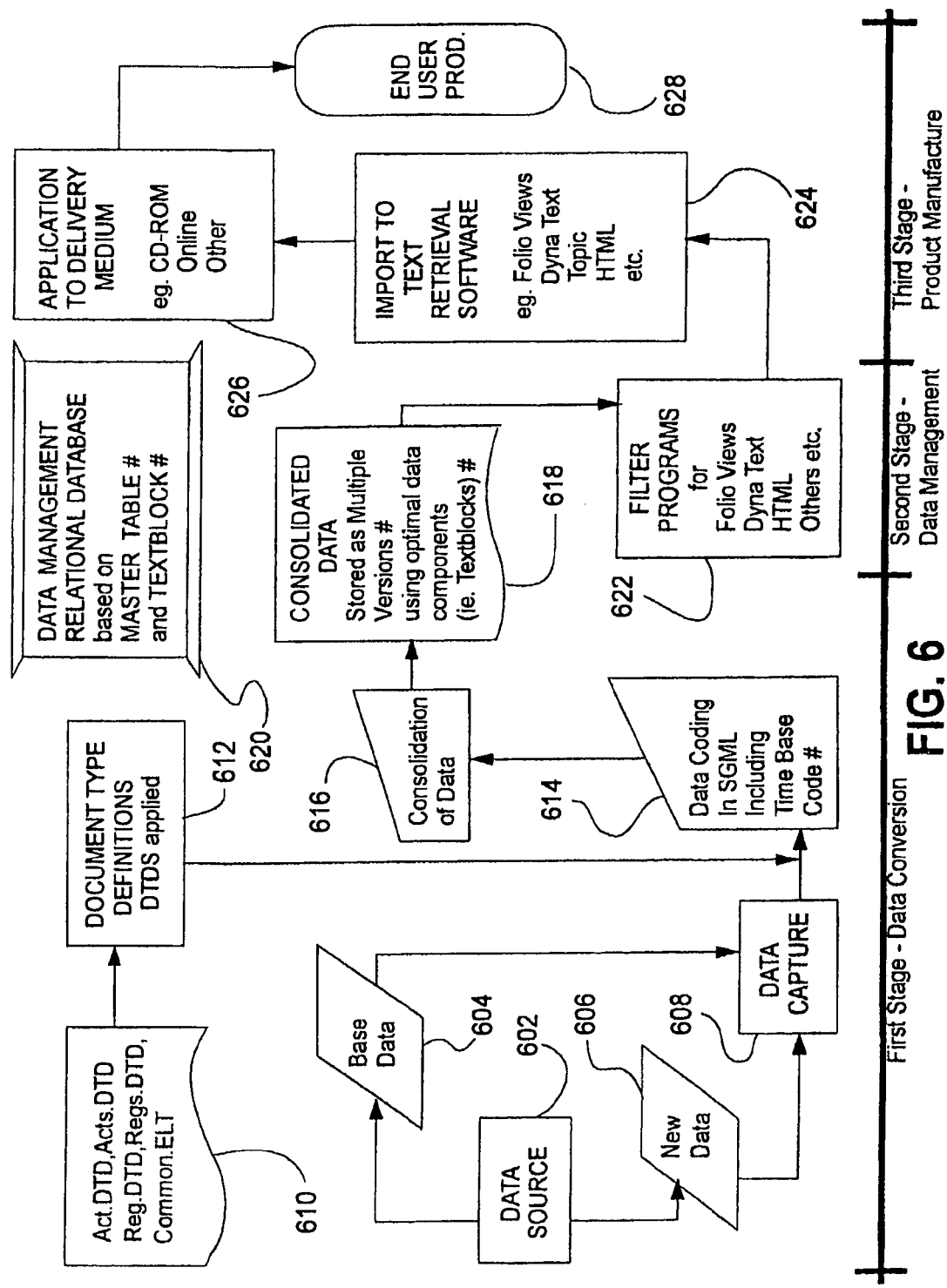
FIG. 6 is a flow diagram illustrating the method of electronic publishing according to the first embodiment.

FIG. 6 is a flow diagram illustrating the method of electronic publishing according to the first embodiment. A data source 602, preferably for legal information, is provided. In steps 604 and 606, base data and new data are input from the data source 602, respectively, and in step 608 the data is captured. The DTDs 610 are input to step 612. The DTDs 610 include Act.DTD, Acts.DTD, Reg.DTD, Regs.DTD, and Common.ELT, which are shown in detail in Appendix B. In step 612, the DTDs 610 are applied to the captured data from step 608. In step 614, the data is coded in SGML, including the Time Base Code. In step 616, the data is consolidated. As indicated in FIG. 6, steps/items 602 to 616 comprise the (first) data conversion stage.

A data management database 620 is provided to step 618. The database is based on a master table and a textblock table (see Appendix C for further detail). The output of step 616 is also provided to step 618. In step 618, the data is consolidated; the data is stored as multiple versions, if applicable, and uses the predefined portions of data (ie, textblocks). In step 622, a filter program(s) is applied to the consolidated data to convert the data from SGML to the relevant format for the retrieval software application, including Folio Views, DynaText, Topic, HTML, and the like. Steps/item 618 to 622 comprise the (second) data management stage.

The filtered data output by step 622 can then be provided to step 624. In step 624, the filter consolidated data is imported to the text retrieval software. In step 626, the data is provided to the delivery medium, which may include CD-ROM, DVD, magnetic tape, electronic online services, and other media. The output of this is the end user product 628. Steps/item 624 to 628 comprise the (third) product manufacture stage.

Figure 5:
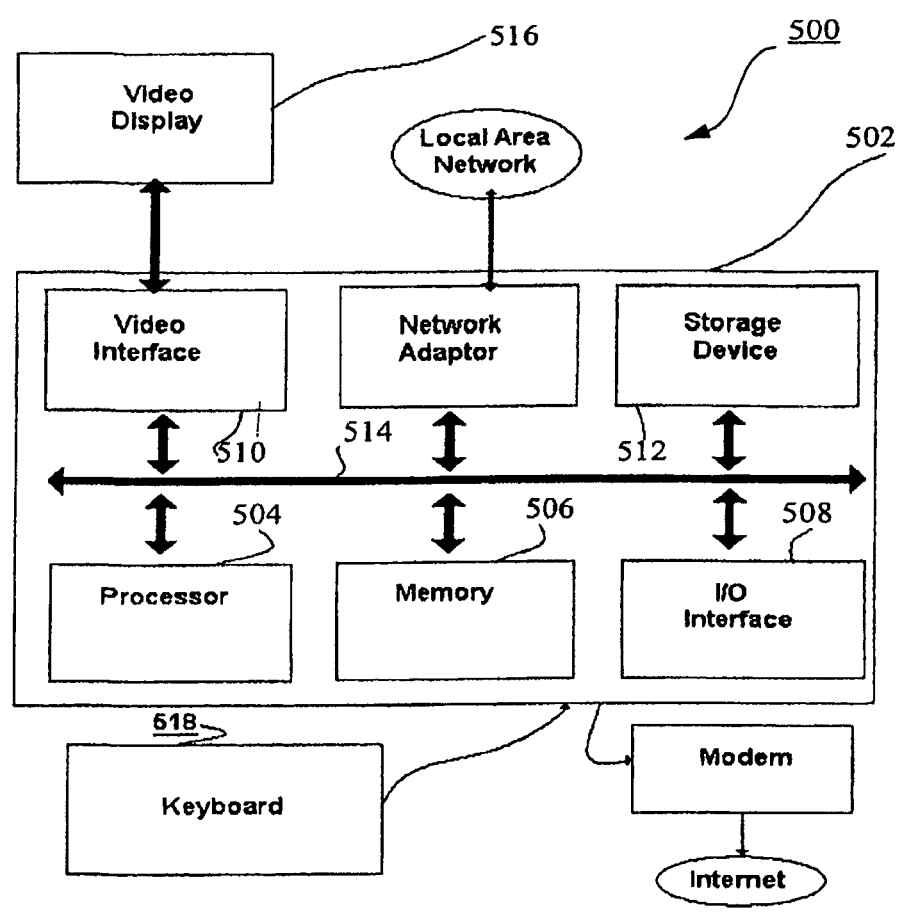
FIG. 5 is a block diagram illustrating a general purpose computer that can be used to implement the electronic publishing system according to the first embodiment.

The first embodiment is preferably practiced using a conventional general-purpose computer, such as the one shown in FIG. 5, wherein processes for providing and managing the information are carried out using software executing on the computer. In particular, the legislation database, the database and the DTD(s) may be stored after a filtering process on a CD-ROM used by the computer system, and the computer system is operated using Folio View. The computer system 500 includes a computer 502, a video display 516, and input devices 518. A number of output devices, including line printers, laser printers, plotters, and other reproduction devices, can be connected to the computer 502. Further, the computer system 500 can be connected to one or more other computers using an appropriate communication channel such as a modem communications path, a computer network, or the like.

The computer 502 consists of a central processing unit 504 (simply, processor hereinafter), an input/output interface 508, a video interface 510, a memory 506 which can include random access memory (RAM) and read-only memory (ROM), and one or more storage devices generally represented by a block 512 in FIG. 5. The storage device(s) 512 can consist of one or more of the following: a floppy disc, a hard disc drive, a magneto-optical disc drive, CD-ROM or any other of a number of non-volatile storage devices well known to those skilled in the art. Each of the components 504 to 512 is typically connected to one or more of the other devices via a bus 514 that in turn can consist of data, address, and control buses.

The video interface 510 is connected to the video display 516 and provides video signals from the computer 502 for display on the video display 516. User input to operate the computer 502 can be provided by one or more input devices. For example, a operator can use the keyboard 518 and/or a pointing device such as the mouse to provide input to time computer 502. Exemplary computers on which the embodiment can be practiced include Macintosh personal computers, Sun SparcStations, and IBM-PC/ATs and compatibles.

In an alternate embodiment of the invention, the computer system 500 can be connected in a networked environment by means of an appropriate communications channel. For example, a local area network could be accessed by means of an appropriate network adaptor (not shown) connected to the computer, or the Internet or an Intranet could be accessed by means of a modem connected to the I/O interface or an ISDN card connected to the computer 502 by the bus 514. In such a networked configuration, the electronic publishing system can be implemented partially on the user's computer 500 and a remote computer (not shown) coupled over the network. The legislation database, the database and the DTD(s) can be implemented on the remote computer and the computer system 500 can be operated using Folio View.

Figure 16:
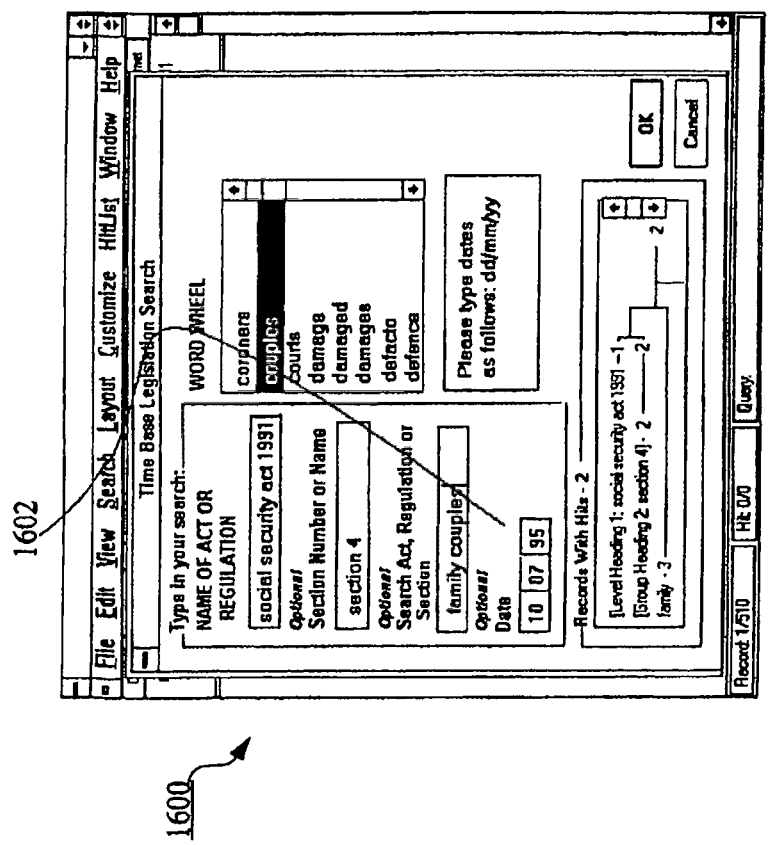
Figure 17:
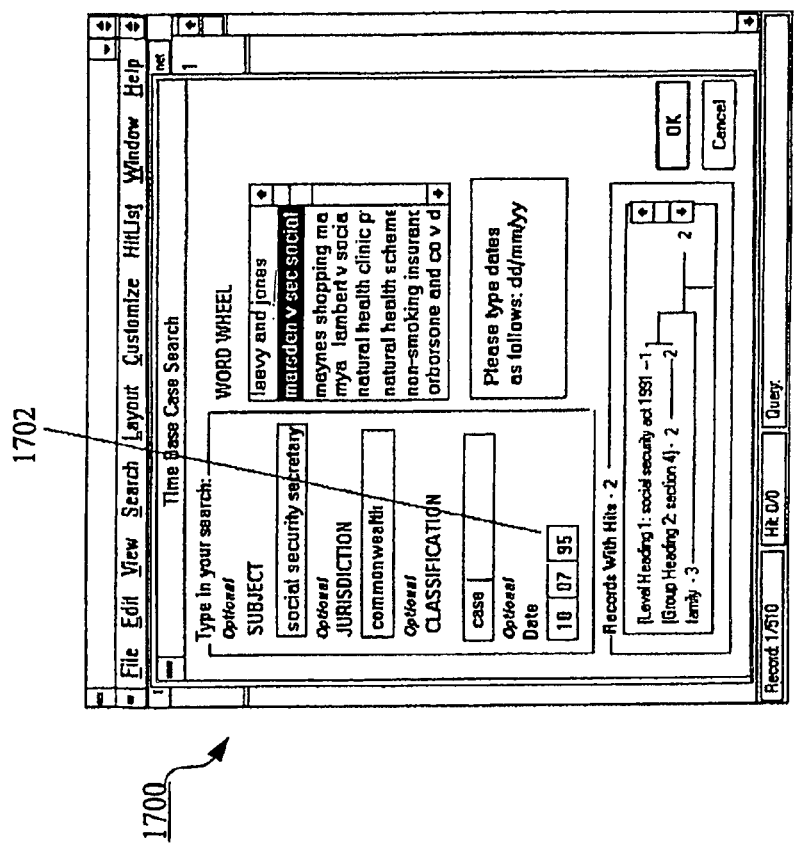

The operation of the first embodiment is described with reference to the screen shots shown in FIGS. 7 to 17. All screen shots are derived from the first embodiment which uses Folio Views as the retrieval software. Broadly, FIGS. 7 to 15 are screen shots illustrating navigation or movement around the information. FIGS. 16 and 17 are screen shots that show search capacities.

Figure 7:
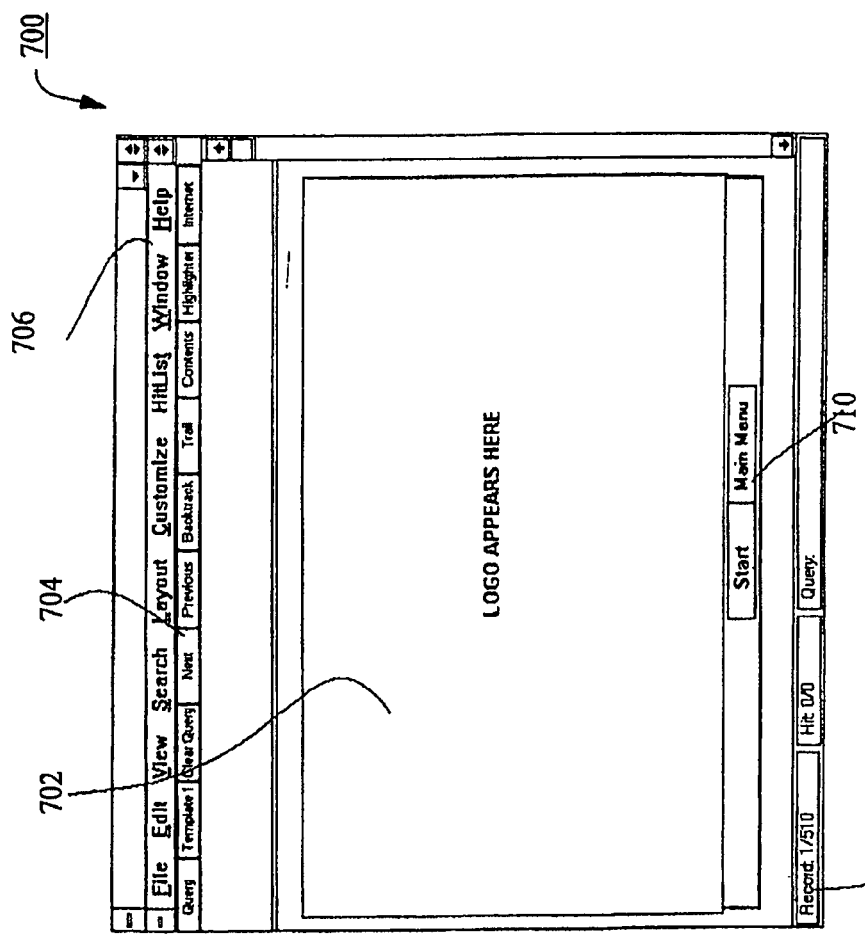
FIGS. 7 to 17 are screen shots illustrating operation of the first embodiment as a software application executing on a general purpose computer.

FIG. 7 shows the opening screen 700, which the end user sees when the program is started. The interface is a standard windows interface featuring drop menus that provide access to all functions. The functions include basic searching and customised search templates such as the ones shown in FIGS. 16 and 17 that allow users to exploit time-based and multidimensional searching.

The title screen 702 is presented when the process is commenced and is the first screen. A customisable toolbar 704 is provided for searching functions. Also, drop menus 706 are provided above the toolbar 704. In the lower portion of the screen 700 contains a status bar 708 showing information relevant to searching. The Start and Main menu buttons 710 in FIG. 7 are both navigational tools. The Start button takes a new user to information providing help on how to use the invention. The Main Menu button takes the end user to the menu shown in the second screen shot of FIG. 8.

Figure 8:
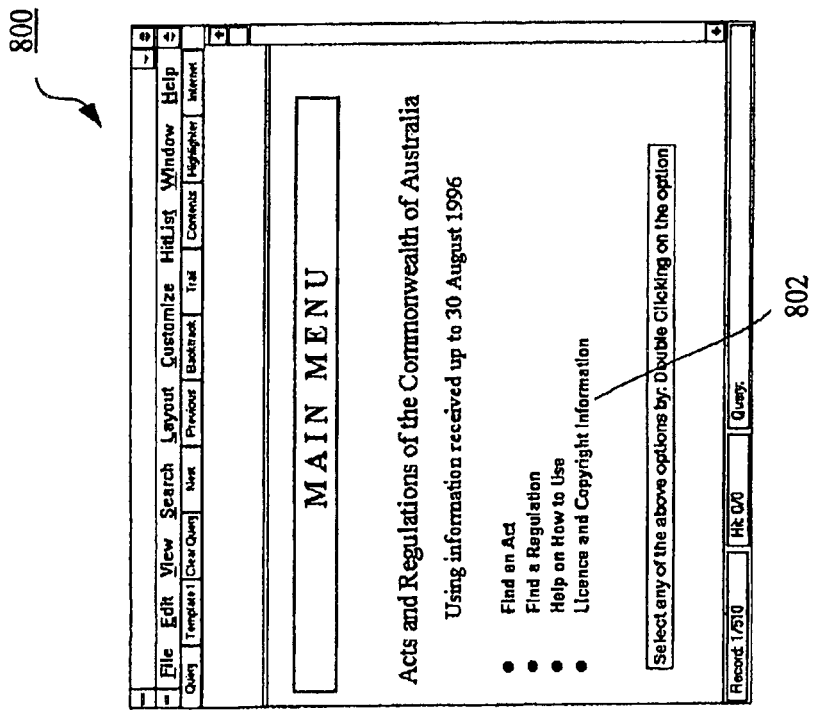

FIG. 8 shows a main selection menu 800. At this menu 800, the user can see the currency of the total information. The user is also able to make broad choices as to the type of information that the person might like to see. All items preceded by bullet points in the menu are jump links 802 which lead the user to further menus for the items selected. The jump links 802 also provide a uniform or consistent form of movement. Thus, if searching the Social Security Act, selecting the first jump link "Find an Act" takes the user to the next screen which would be the "Act Name Menu".

Figure 9:
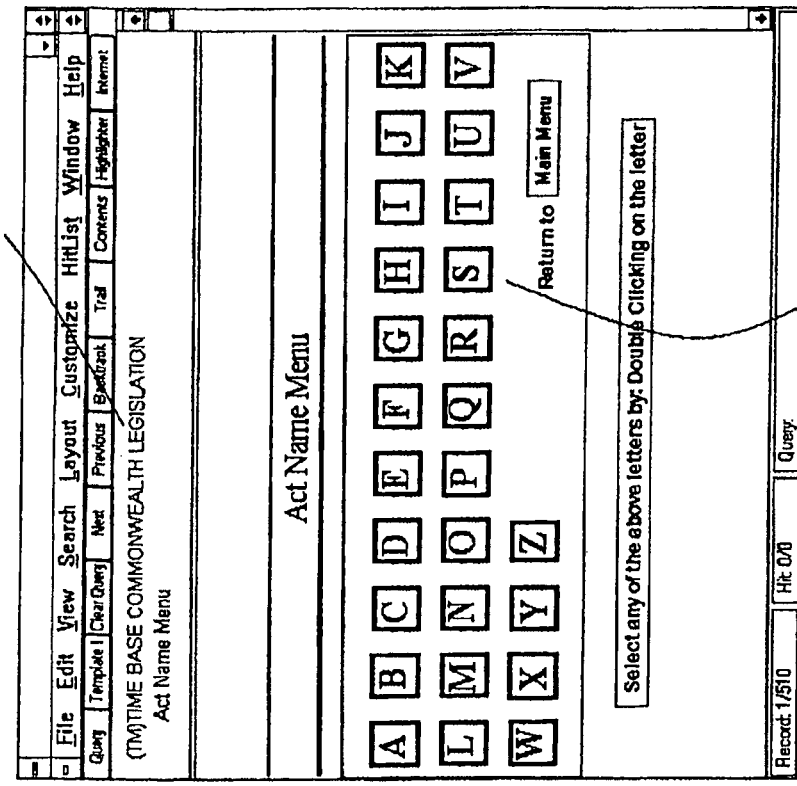

FIG. 9 shows the "Act Name Menu" screen 900. In this menu 900, all letter buttons are links 904 to Acts beginning with the letter selected. That is, the jump links 904 allow access to sub-menus for Acts with the corresponding selected letter. If "S" is clicked, this leads to the "Acts beginning with S" menu (see FIG. 10) where an entry linked to the most current version of the Social Security Act 1991 appears. A similar menu may be provided for Regulations. Further, locational information 902 is provided in the upper portion of the screen 900.

Figure 10:
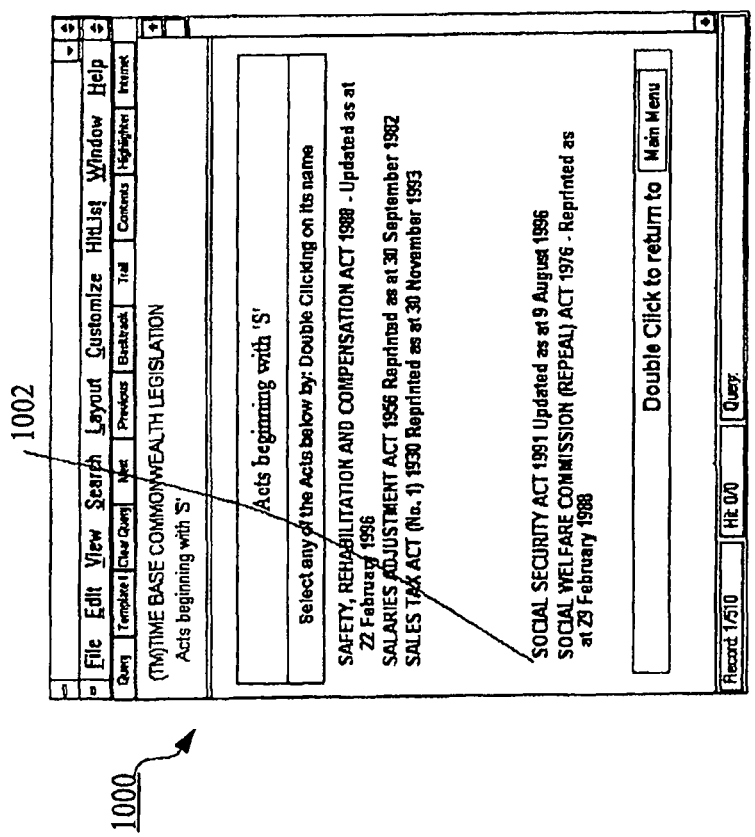

FIG. 10 illustrates acts beginning with "S", as selected in the screen 900 of FIG. 9. By selecting jump link 1002, the Social Security Act can be accessed. Likewise, other acts in this screen 1000 may be accessed using the respective jump link (e.g. Safety, Rehabilitation and Compensation Act.

Figure 11:
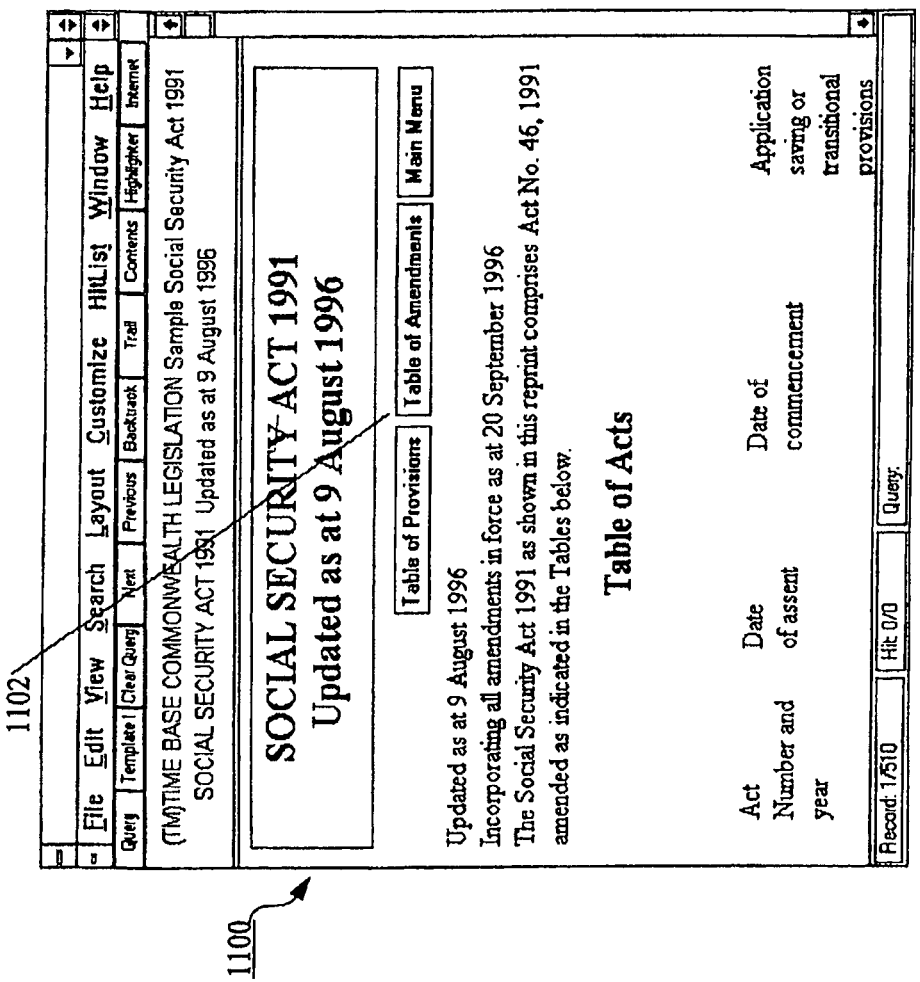
Figure 12:
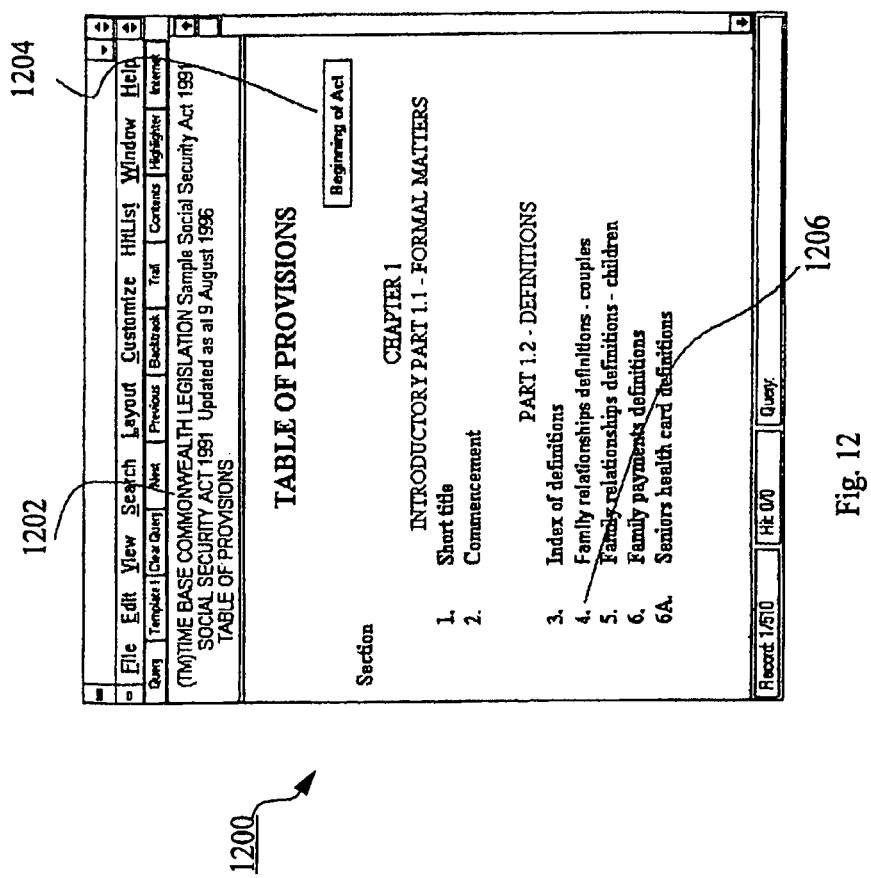

Assuming the appropriate jump link 1002 is selected in FIG. 10, FIG. 11 shows how the beginning of the Social Security Act appears in screen 1100, and the buttons that link the user to the provisions of the Act. This is the start of the most current version of the Social Security Act preferably. From this screen, provisions of the Act can be accessed. By accessing the Table of Provisions box, the Table of Provisions menu can be accessed. FIG. 12 shows the Table of Provisions screen 1200, and illustrates how a specific provision, say Section 4, can be accessed again using links 1206. Different sections of the Act (e.g. ss 3, 4 and 6A) may be accessed as well using corresponding jump links. Again, location information 1202 is provided in the upper portion of the screen. A return button 1204 is also provided that provides access back to the beginning of the Act.

Figure 13:
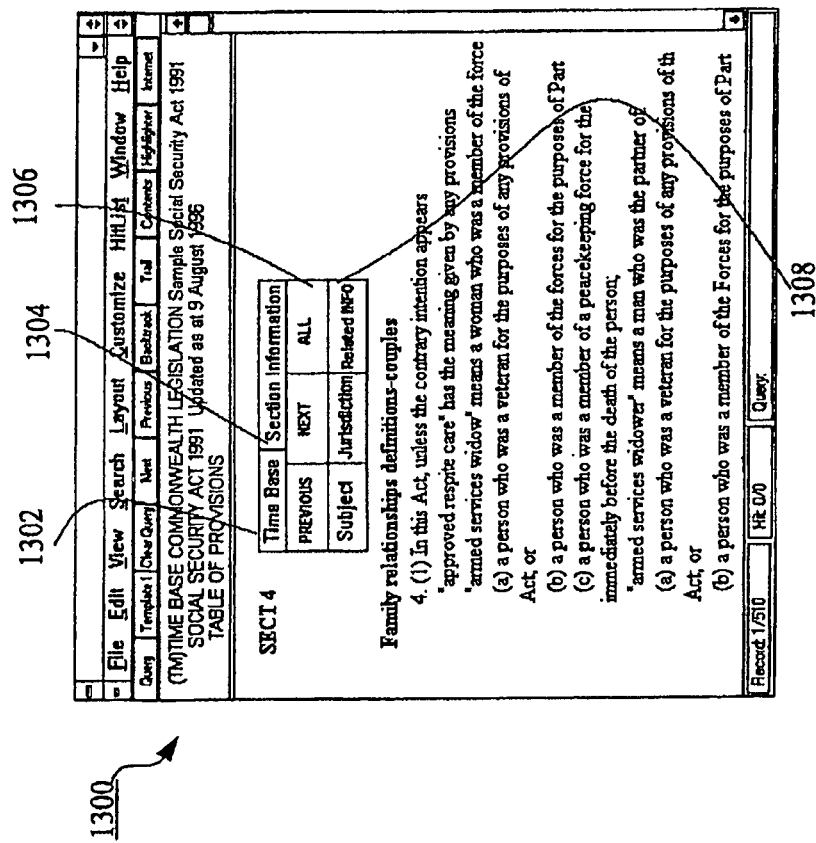

FIG. 13 shows screen 1300 containing the Time Base Toolbar 1302, which preferably provides eight buttons for accessing time based information. This Toolbar 1302 is not a feature of Folio Views, but is a designed addition added to Folio Views by the first embodiment. It is made possible by the way in which the publication data is coded. The Section Information button 1304 takes the user to an overview of information. The Previous, Next and All buttons 1306 allows the user to have access to the previous, next and all versions of the relevant section. The Subject, Jurisdiction and Related Info buttons 1308 allow the user to view and access sections dealing with a similar subject, or similar sections in other jurisdictions, or related information such as cases and articles on or about the section. This Toolbar 1302 allows a user to cycle through previous and subsequent versions of sections and as shown in screens in FIGS. 14 and 15 to refer to the text of sections amending the section. As well, the user can also call to the screen all versions of the section as one view (or display) using the "ALL" button.

Figure 14:
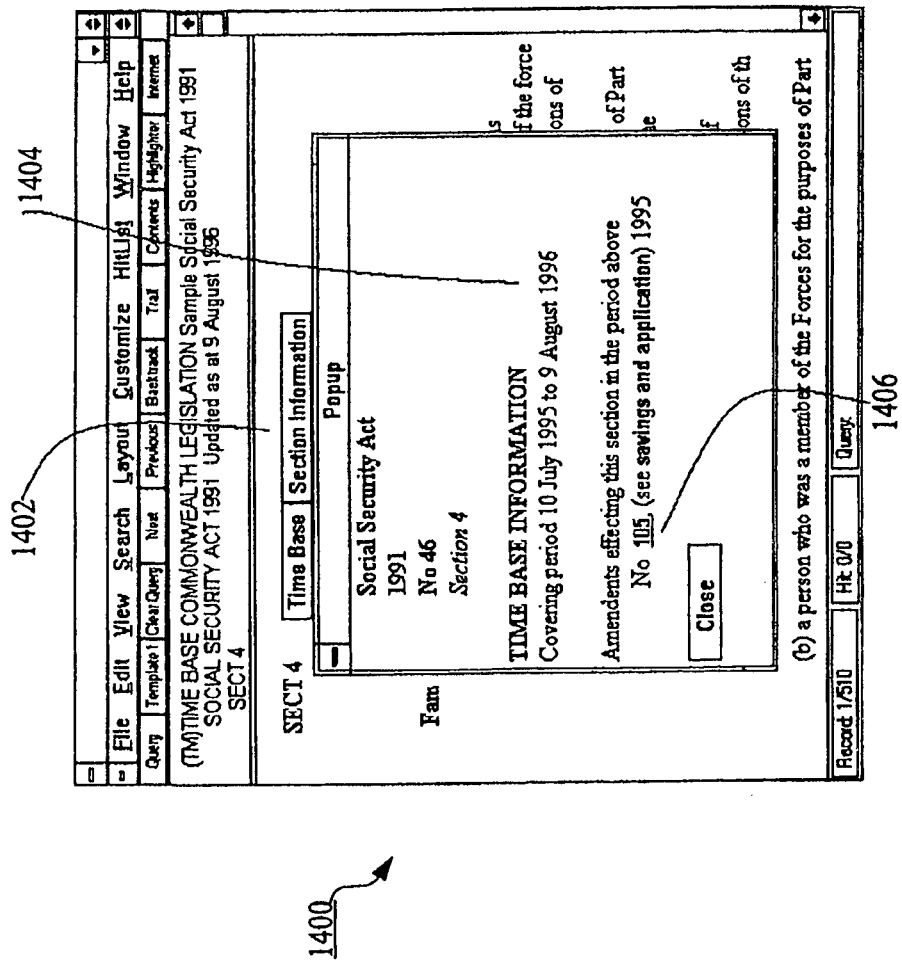

FIG. 14 illustrates a screen 1400 which appears when the user selects the Section information button 1402 (button 1304 in FIG. 13). The resulting popup screen illustrates the time period or date range 1404 covered by this version of section 4. It also indicates the Year and Number jump link 1406 to text of the amending act which created this version of section 4.

Figure 15:
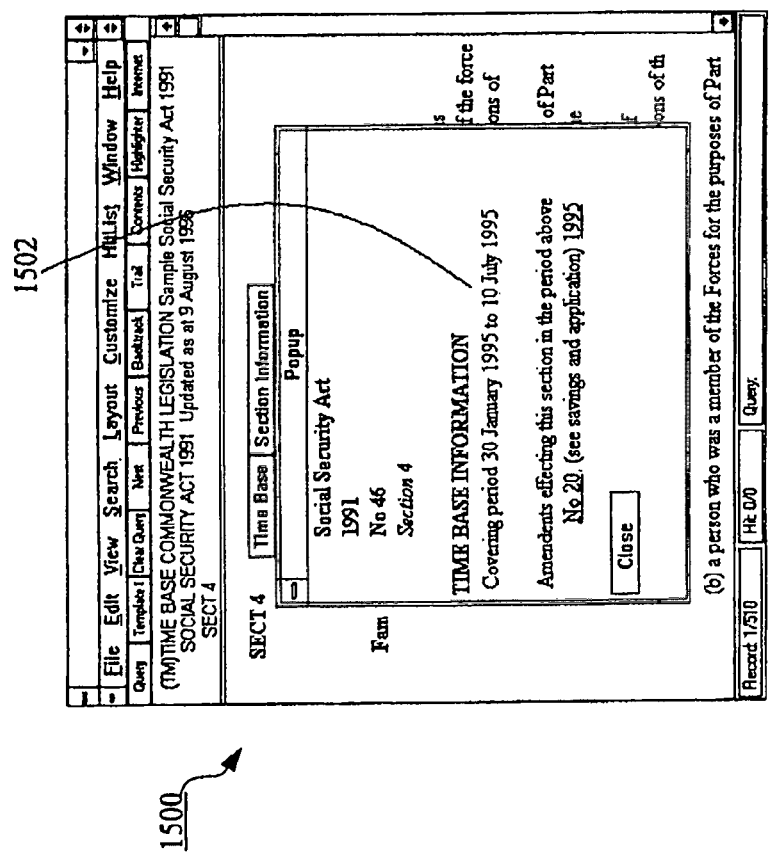

FIG. 15 illustrates a screen 1500 which appears when the user selects the previous button 1502 (not shown—it is located behind the popup screen), which corresponds to previous button 1306 of FIG. 13. This shows an earlier version of section 4 that the user can access by using the previous button 1502. The pop-up screen indicates that this version covers a different time span than that shown in FIG. 14.

The screen shots in FIGS. 7 to 15 display a step-through or navigation-based way of locating information. There is also the more direct approach of searching for terms using text retrieval. The screen shots in FIGS. 16 and 17 illustrate such searching provided by the first embodiment. Screen 1600 shown in FIG. 16 provides a customised search template 1602 that includes a time base option allowing a user to search for versions of a section, for example. Screen 1700 shown in FIG. 17 illustrates a customised search template 1702 for case law which includes a time base option connecting cases to legislation at a particular date, for example. Again, the ability to relate such to time and then to mix and match types of information from different sources (jurisdictions) is a feature provided by the coding technique used for the data and not the Folio Views software used to deliver the data to the end user.

Second Embodiment

The second embodiment stores all the information in a single repository which is marked up in SGML or XML. The information is divided in that repository into suitable pieces or blocks of text (as described in the first embodiment) and any relevant markup marks up a whole suitable piece or block of text by (a) choosing suitable pieces or blocks of text, and (b) demanding that relevant markup belongs to a whole suitable piece or block of text, the following becomes possible. A relational database consisting of records consisting of fields can be created with one and only one record per suitable piece or block of text where the actual text of each suitable piece or block of text is the content of one filed of the above record and where each item of the markup is assigned its own field in the above record.

For example, a version of Section 6 of the Income Tax Assessment Act (ITAA) 1936 may be stored as a record in the above relational database, The first field of that record contains the actual text of that version of Section 6. The next field identifies it as Section 6 of the ITAA, the next field gives the date this version came into being, the next field contains the section of the amending act that created this particular version, the next field contains the day this version became superseded, another field contains the subject(s) this version addresses, another field contains the case(s) that have addressed this version of section 6 and so on. Storing the data in this way allows multidimensional database techniques to be applied to the data.

An XML DTD for implementing the second embodiment is set forth in Appendix E. It will be apparent to one skilled in the art that the second embodiment may be readily implemented in view of the foregoing description of the first embodiment, which is not repeated here for the purpose of brevity, and in view of the accompanying DTD set out in Appendix E.

The foregoing only describes a small number of embodiments of the invention, and modifications and changes apparent to those skilled in the art can be made thereto without departing from the scope and spirit of the invention. For example, the embodiments of the invention have been described with reference to SGML. The embodiments may alternatively be practiced with the extensible markup language (XML) as well. Also, the embodiments may alternatively be practiced with a Style Sheet Mechanism (SSM) instead of, or in addition to, one or more DTDs.

A method, apparatus and computer program product for navigating in a multidimensional space containing an electronic publication formed from predefined portions of text-based data encoded using a markup language are disclosed. In the following description, numerous specific details are set forth. However, it will be apparent to those skilled in the art in view of this disclosure that changes may be made without departing from the scope and spirit of the invention. In other instances, well known features have not been described in detail so as not to obscure the invention. Whilst the invention may be preferably practised on flat files, it will be apparent to a person skilled in the art that the invention may also be practised on databases. A database may be constructed from sets of flat file records. A relational database is a collection of related tables, each table being a set of flat files having the same structure. The method includes the step of: displaying a selected one of the predefined portions in a first display region. The display region preferably takes the form of an area of real estate on a computer screen (henceforth referred to as the "content frame"). The method also includes the step of displaying a view into a primary axis of the multidimensional space in which the displayed preferred portion is clearly marked. This second area of the computer screen shall be referred to as the "reference frame". Each frame has an associated "anchor", which is a title bar clearly indicating the nature of the view currently displayed in the frame. The reference anchor also contains tools for navigating the displayed axis. The method also includes the step of displaying a point on a primary axis of the multidimensional space for the displayed predefined portion.

The method may be enhanced by displaying a second point on a second axis which relates to the first axis at the first point. The second axis represents time-based versions of the selected one of the predefined portions. Alternatively, the second axis represents amending legislation that was applied to the selected one of the predefined portions. In another example, the second axis represents case law that applied the selected one of the predefined portions. In further example, the second axis represents annotations to the selected one of the predefined portions. In a yet further example, the second axis represents entries of a subject index that are covered in the selected one of the predefined portions.

The embodiment of the present invention allows for a primary axis (the combined hierarchical/sequential or normal axis). A "base node" may be selected by navigating the primary axis. The method then allows for one of a number of potential axes (associated with the base node) to be selected and subsequently navigated. The selection is accomplished by means of activating "links" in the displayed base-node. The reference frame is redrawn to give a view of the members of the selected axis and one member of that axis is displayed. At any point it is possible to return to the primary axis and select a new base node. Alternatively, the currently displayed base node may be chosen as a new base node from which subsequent axes are derived. In this manner, any number of axes may be displayed and navigated without increasing the complexity of the screen view (i.e. only two frames are ever required). It is this quality which allows a complex dataset to be navigated by a non-specialist end user.

By way of example, a user may select a first node, corresponding to a provision, in the multidimensional space. The first node's locator is displayed in a first anchor to provide the user with a first point of reference. If the user is interested in different versions of the provision, the user may then move to second node on an orthogonal axis, being the Versions axis. The first anchor is updated and displays the locator of the second node. A second anchor displays the locator of the first node. The second anchor also displays the relationship between the first node and the second node. The user is provided with information which indicates the original provision that was being studied, the provision currently being studied and the current provision's relationship to the original provision. Thus, the first and second anchors and the information provided therein enable the user to navigate the multidimensional space.

Where reference is made in any one or more of the accompanying drawings to steps and/or features, which have the same reference numerals, those steps and/or features have for the purposes of this description the same function(s) or operation(s), unless the contrary intention appears.

The principles of the preferred method described herein have general applicability to electronic publishing. However, for ease of explanation, the steps of the preferred method are described with reference to navigating in a MALT publication. However, it is not intended that the present invention be limited to the described method. It will be appreciated by those skilled in the art that a publication could include a document or a database. The invention may apply to any hierarchical XML data where any of the nodes may change independently of other nodes in the hierarchy. Typical examples might include manuals and newspapers. For example, the invention may have application to the production and display of aircraft manuals. In this case, each node would be a set of maintenance instructions for a part or assembly. The axes might be part number; category (electrical, structural, etc.); location (Boeing 737, wing, wingtip assembly, eddy baffle, securing flange AX-703); airline (United, QANTAS); language (English, French). Since each commercial aircraft is in effect a one-off construct, the basic information needs to be reconfigured for each plane, each airline, etc.

Before proceeding with a description of the embodiments, a brief review of terminology is discussed hereinafter. A dataset refers to the complete set of data that is to be navigated. A dataset has a complete set of discrete objects called nodes. The dataset may be viewed as a sparse multidimensional matrix, as is produced using the MALT publishing method. In the example of this specification, the dataset preferably refers to a body of legislation designed for point in time searching.

A node preferably corresponds to a particular legislative provision at a particular date. A base node is a particular node from which one or more viewing axes may be derived.

A viewing axis is an ordered set of nodes derived from a single base node. The base node itself may or may not constitute part of the axis. For example, given a particular provision in time, three possible viewing axes are: the set of all provisions in force on the same date as the base node; the set of versions of the base provision in time; and the set of amending provisions most recently applied to the base provision. Further viewing axes may be practised, and may include case law that applied the provision, annotations to the provision and entries of a subject index that are covered in the provision.

A provision, for the purposes of this system, is a unit of legislation having a heading and/or content, but not including text belonging to any sub-provision that is a predefined portion of text. A provision may be an Act, a schedule, a chapter, a section or other legislative unit. A provision has a scope in time, such that when a provision is amended, a new provision is created. A provision corresponds to a set of nodes, each node corresponding to a range of dates in the scope of the provision.

Scope refers to a period of time during which a provision is in force. Thus, a given scope is usually expressed as start and end dates. A provision's scope is determined by the dates on which the provision commenced, was amended and/or was repealed.

A locator is an identifier that is used to locate a particular node. For example, a locator may be a date, or a position such as the name of an Act and a section number.

Multi-Axis Viewing Interface

Using the publication of legislation as an example, a provision is defined as being an amendable unit of legislation. At any given moment, the body of active legislation can be divided into provisions. Provisions also have a scope in time, so that when a provision is amended, the current provision goes out of scope and a new provision is created. The nodes of the dataset in this example are provisions with an associated date. Two locators are required to specify a particular node uniquely: a position (such as act and section number) and a date.

There are a number of viewing axes associated with each node. As indicated in the explanation of terminology above, a viewing axis is defined as an ordered set of nodes that can be derived from the current node. When XML data is converted to a series of flat files, viewing axes are derived from the current node as a result of an intersection between two flat files. Two flat files intersect if common entries are contained in the fields of the respective flat files. For example, a legislation flat file may contain a field "Identifiers of cases that apply this provision". The legislation flat file shares a common entry with a case law flat file. Alternatively, the legislation flat file may contain a field "subjects covered in the provision". In this example, the legislation flat file shares a common entry with a subject index flat file. Alternatively, an amending legislation flat file may have a field "Identifiers of provisions amended by this provision" and share a common entry with the legislation flat file.

In a preferred example, seven such viewing axes are:

Sequential ( . . . ; s 26; s 27; s 27A; . . . ),

Hierarchical ( . . . ; Corporations Act 1989; Part 2; Division 2.1; s 27),

Temporal (the set of versions of the current provision in time),

Source (the set of provisions which amend the current provision),

Case law (cases that apply the current provision),

Annotations (annotations to the current provision), and

Subject (Entries of a subject index that are covered in the current provision).

The above axes are orthogonal in the sense that none can be directly derived from another. Thus, the temporal axis cannot be derived from the sequential axis. Moreover, members of the temporal axis are not simply those provisions sharing the same locator as the current provision. As a result of renumbering, members of the same temporal axis may possibly have widely differing locations. While the example uses two locators and four viewing axes, the MALTweb interface is capable of handling as many locators and axes as required.

Having utilised MALT to construct a set of data encapsulating the above relationships, the problem is how to access this data in a meaningful way. To provide an untrained user with full multi-axis access to MALT type data whilst maintaining a consistent look and feel throughout, a view consisting of a two frame screen is provided.

FIG. 18 is a screenshot 1800 depicting a section of legislation in accordance with an embodiment of the invention. A content frame 1810 displays the content of the current node. In essence, this frame 1810 constitutes a known portion of display "real estate". In the example of FIG. 18, the node corresponds to Section 59 of the Commonwealth Corporations Act 1989 and the node has a scope of 16 Oct. 1995 onwards. The scope indicates the time during which the provision is in force. The content anchor 1805 of the content frame 1810 displays the locators for the current content provision in a user friendly form, such as:

Corporations Act 1989 (Cth): s 59

Scope: 16 Oct. 1995 Onwards

Situated above the content anchor 1805 is a reference frame 1820, which contains a set of links 1821 corresponding to the members of a viewing axis associated with the current base node. Reference markers 1823 indicate which of the links 1821 is currently selected. In the Normal view, the content node shown in the content frame is always the same as the base node for the reference frame. In the Version view, the content node and base node are initially the same, but deviate when a different version is selected. In the Source view, the base node is being amended and the content node is one of the amending provisions.

The reference frame 1820 has a corresponding reference anchor 1815, which describes the current viewing axis and provides buttons 1816, 1818 for navigating the sequential axis and button 1817 for accessing higher levels of the hierarchy. These levels can also be accessed via the links 1821 in the reference frame. In the example, the reference anchor 1815 indicates that the user is being shown a normal view of s59, as in force on 20 Jul. 2000. This view also shows the search mode, in which the text "exercise of jurisdiction" has been located. The buttons 1812, 1813 allow access to the next or previous occurrence of this text, whilst button 1814 cancels the search. The "hits" links 1822 in the reference frame allow rapid access to occurrences of the search text in other parts of the document. In this respect, the search mode acts very much like a separate viewing axis. The highlighting 1806 indicates the selected text. Finally, the links 1807, 1808 allow access to the other viewing axes (in this case, Versions and Amendments).

Where appropriate, the reference anchor 1815 may indicate the base node of the viewing axis. The base node is the node from which the viewing axis is derived. For example, the reference anchor 2015 of FIG. 20, which shows a Source axis view of the same provision depicted in FIG. 18, displays the following information:

Provisions Amending (Effective 16 Oct. 1995)

Corporations Act 1989 (Cth): s 59

This indicates that the Source axis being viewed by the user is derived from the base provision: Corporations Act, s59 [16 Oct. 1995 onwards]. The content anchor 2005 details the amending provision, which in this example is Corporations Legislation Amdt Act 1994 (Cth):Sch 1.

The relationship of the base node and the content node depends on the view. In the Normal axis view, consisting of the sequential and hierarchical axes, the base node and the content node are always the same. In the Versions axis view, the base node and the content node may or may not be the same.

A view is, therefore, defined as the display of a particular content node in relation to a specified axis. Each view may be uniquely identified from the following: the current content node, the current viewing axis, and the base node of the viewing axis. To further help the user in distinguishing the different viewing axes, the reference frame links may optionally vary in colour, content and indenting style among the views.

FIG. 19 shows a Version axis view 1900 of the provision depicted in FIG. 18. The content anchor 1905 indicates that the provision being displayed is, in fact, an earlier version of the provision displayed in FIG. 18. Thus, the information shown in the content frame 1910 has a different scope from the information shown in content frame 1810 of FIG. 18. Closer examination of the information of the content frame 1910 and the information of content frame 1910 indicates that amendments have in fact been made between the two versions of the provision.

The reference frame 1920 of FIG. 19 indicates that there are two versions of the provision, a first version with a scope of 1 Jan. 1994 to 15 Oct. 1995 and a second version with a scope of 16 Oct. 1995 to 31 Dec. 2001. Each version of the provision is a distinct node on the Version axis. The reference anchor 1915 indicates that the user is navigating along the Versions axis view of section 59.

FIG. 20 shows a Source axis view 2000 of the provision under consideration. The reference anchor 2015 of FIG. 20 indicates to the user that the material being displayed relates to provisions amending the Corporations Act 1989 (CTH); s 59. The reference frame 2020 indicates that there are three relevant nodes 2021, 2022, 2023 on the source axis. Each node corresponds to a provision which amends the current provision. The amending provisions are not necessarily sequential and may be non-consecutive and/or in different schedules and/or in different Acts. The content anchor 2005 indicates that the current information being shown is Schedule 1, Part 1, Item 15 of the Corporations Legislation Amendment Act 1994, corresponding to the first node 2021 shown in the reference frame 2020. The content of the amending act is displayed in the content frame 2010.

Thus, the multi-access viewing interface provides a user with content and reference components. Anchors uniquely identify the content node by position and date, and the viewing axis by base node and axis type. Furthermore, the reference frame is capable of displaying multiple viewing axes for a given base node, as illustrated in FIGS. 18-20.

Higher Level Scoping

The MALT concept encapsulates the ability to store the contents of a sparse multidimensional matrix in a set of flat file records. As previously defined, the scope of a provision is a time period during which the given provision is in force. A problem arises relating to scoping a record which encompasses a number of lower level records.

Consider as an example legislation marked up for point in time searching. The body of the legislation consists of provisions (or nodes), where each provision is an amendable unit of legislation. For the purposes of this example, each provision possesses the following four properties:

A single parent, or container provision in which the current provision resides. [The children of a provision are those provisions which have the current provision as the parent.]

A position within a provision's parent, and (optionally) an associated locator (eg. the fourth child provision of an Act may have the locator "Chapter 2A").

A scope in time (i.e. start and end dates).

The content of the provision.

The provisions are divided into three classes:

A single root node, which has no parent, but from which all other nodes ultimately descend;

A set of terminal nodes, which have no children; and

A set of higher level nodes which are neither the root node nor terminal.

The legislation can then be said to form a tree descending from the root node and containing the terminal nodes at the ends of the root node's branches.

The scope of a terminal node is the period of time between the terminal node's start date and end date, inclusive. The root node is deemed to be always in scope. The scope of a node which is neither a terminal node nor a root node is problematic.

For example, a chapter may encompass many sections, but the chapter's actual content, viewed in isolation as a record, is simply the chapter's title, including locator if present, and any notes or other attachments that apply to the chapter as a whole. All other content is contained indirectly via the chapter's descendant provisions, such as parts, sections and the like.

Difficulty arises in determining the scope of the chapter node. In one sense, the scope of the chapter node is the sum of the scopes of the chapter node's descendants. A question then arises if, for example, the chapter's title is altered. The same applies to the case in which the abovementioned notes or other attachments are altered.

One solution is to create a duplicate chapter with the altered title. While effective, this method has some major drawbacks. Firstly, it involves a great deal of unnecessary duplication of material. Since each child provision can have only one parent; new copies of every sub-level have to be made. The scope of both the original and duplicate sublevels then have to be split at the date of the chapter's title change. This in turn requires each sub-level to behave as though amended, even though the amendment only applies to the title of an ancestor level.

A better solution is to create a new terminal sub-level of the chapter which contains just the title and associated text. This sub-level can then be scoped independently of the main level, and other sub-levels are unaffected. The sub-levels retain the same parent as the chapter level itself was not affected by the amendment.

However, this still leaves open the question of what to do with the scope of the chapter level. Clearly a chapter, like any other provision, can be created or repealed. Thus, an amendment such as "repeal Chapter 2A" should end the scope of the chapter level as well as all of the chapter's descendants.

The editors, however, may wish to leave a stub entry to mark the place of the former chapter thus:

Chapter 2A repealed

The scope of the stub clearly lies outside the scope of the chapter. There are three possible solutions:

allow the [repealed] entry (which stands in place of a normal title) to live inside the chapter, even though the entry is out of the chapter's scope;

extend the scope of the chapter to encompass the scope of the stub; or create a new chapter level containing just the stub.

The first option creates significant inefficiencies in the design, since the scope of a sub-level cannot be assumed to lie within the scope of the sub-level's parent. The other two options give rise to potential conflicts between the stub and possible replacement chapters.

Having delegated the title and other general notes to their own sublevels, all content has effectively been removed from the chapter. However, a chapter level is still required, as removing higher levels makes all terminal nodes direct children of the root. This in turn severely impacts on the usefulness of the data when mapped to a hierarchical form, such as XML.

In addition, a higher level does contain one property, namely one or more locators ("Chapter 2A" in the example). While this property can theoretically be delegated to yet another sub-level, the practical implications are significant. In particular, the locator reflects the ordering of the chapter amongst its siblings. If, for example, an amendment renumbers chapter 2A to chapter 4, this gives rise to the issue of whether the chapter comes before or after chapter 3 in either a flat file or in XML. For this reason, the locator is the sole property preserved by a higher level node throughout the higher level node's scope. If the position is changed, then a new level (and sub-levels) is created.

This still leaves the problem of the scope of a higher level. For example, if Chapter 2A is repealed and a new, unrelated chapter 2A immediately takes the place of the repealed Chapter 2A, a problem is potentially presented as to two overlapping scopes for the same provision. The scope of the original node has to be terminated, otherwise there are two Chapter 2As in scope contemporaneously. The co-existence of two Chapter 2As poses a detrimental impact on the ability to navigate and search the legislation under consideration. In the situation in which the original Chapter 2A has a repeal stub, the original Chapter 2A's scope may overlap the new Chapter 2A, since the stub may continue indefinitely in time. Among many possibilities, a repeal stub may be provided while Chapter 2A does not exist.

Other problems include: repeal or substitution of a higher level node; renumbering/relocation of a higher level node; renaming (without renumbering/relocation) of a higher level node; elevation or demotion of a higher level node within the hierarchy, e.g. changing a part to a chapter or a division to a subdivision; and insertion/removal of an intermediate level heading node, requiring that nodes which follow and are/were, according to their type, inferior to that heading node become/cease to be children of that node.

In order to resolve these problems, the following design rule is applied: Higher level nodes may have neither scope nor content. In other words, a non-terminal node must be a container only. A non-terminal node's only properties are a parent indicator, a position within the parent, and (optionally) a locator. Any content notionally belonging to such a node, such as a chapter title, is assigned to a new (terminal) child node. A (terminal) child node may contain a label, which is preferably a title, but can be or include other data related to the parent node. The new child node preserves the scope of the title, so (for example) a single chapter may possess a number of (temporally disjoint) title nodes.

Higher level scoping has a number of surprising but useful consequences. In particular, a higher level provision is, in itself, not subject to amendment. Thus, an instruction such as "Repeal Chapter 2A" actually terminates the scope of all of Chapter 2A's constituent terminal nodes. The chapter node, having no scope of its own, is unaffected.

Additionally, the previously described problem pertaining to the overlapping scope of the 2A repeal stub disappears.

Embodiments of the invention utilise the following approaches. When Chapter 2A is repealed, the associated scope of all terminal nodes within Chapter 2A is terminated. In a first embodiment, a new Chapter 2A is enacted immediately after the original chapter is terminated. The new Chapter 2A has an associated scope commencing on the day after which the original Chapter 2A was repealed. In a second embodiment, a repeal stub is introduced. A repeal stub in the preferred embodiment is a title with an attribute marking this title as being of the type "repeal stub". The repeal stub has an associated scope with a start date corresponding to the date after which Chapter 2A was repealed. The repeal stub has the Chapter 2A node as a parent. If a new Chapter 2A is later enacted, the scope of the repeal stub is terminated and the scope of the terminal nodes of the new Chapter 2A will begin on the day after the end date of the repeal stub's scope.

Thus, a request "for Chapter 2A on date X" returns a description of Chapter 2A that was valid on that date. In the event that the request is for a date on which the chapter is repealed, the fact that the chapter is not in force, having been repealed on or before that date, will be returned.

A portion of Document Type Definition (DTD) code which is used to enable higher level scoping appears in Tables 2 to 8 below:

TABLE 2

```
<!--
##############################################################
    ENTITY:   hlev-id
    PURPOSE:  Concatenation of the elements that make the
Identification of a higher level element. Only to be used for levels in
which the <desc> can be MALTed - for levels in which the whole level
should be MALTed (ie, section, reg, schedule) and for their sub-levels,
use %lev-id;.
##############################################################
-->
<!ENTITY % hlev-id
    "(target*, label?, (desc, %amendments;)*)"
>
```

TABLE 3

```
<!ELEMENT act
    (%hlev-id;,
        (%hnote; | %raw;)*,
        (longtitle, %amendments;)+,
        preamble*,
        (chapter* | part* | section*),
        (schedule* | include+)*,
        hist* )
>
<!ATTLIST act
    juris
        (cth|nsw|vic|qld|sa|wa|tas|act|nt|imp)
        #REQUIRED
    year
        CDATA
        #REQUIRED
    number
        CDATA
        #REQUIRED
>
```

TABLE 4

```
<!ELEMENT regulations
    (%hlev-id;,
        (%hnote; | %raw;)*,
        (chapter* | part* | reg*),
        (schedule* | include+)*
```

TABLE 4-continued

```
         )
>
<!ATTLIST regulations
       juris
             (cth|nsw|vic|qld|sa|wa|tas|act|nt|imp)
             #REQUIRED
       year
             CDATA
             #REQUIRED
       number
             CDATA
             #REQUIRED
>
<!ELEMENT chapter
       (%hlev-id;,
        (%hnote;)*,
        (((%secreg;)*, part*) | article+))
>
<!ATTLIST chapter
       id
             CDATA
             #IMPLIED
       next-id
             CDATA
             #IMPLIED
>
```

TABLE 5

```
<!ELEMENT part
       (%hlev-id;,
        hist*,
        (((%secreg;)*, division*) |
         (article+ | item+ | clause+) |
         (guide+) |
         (unconverted+)))
>
<!ATTLIST part
       id
             CDATA
             #IMPLIED
       next-id
             CDATA
             #IMPLIED
>
```

TABLE 6

```
<!ELEMENT division
       (%hlev-id;,
        (p | %hnote;)*,
        (((%secreg;)*, subdivn*) |
         (clause*, item*)))
>
<!ATTLIST division
       id
             CDATA
             #IMPLIED
       next-id
             CDATA
             #IMPLIED
>
```

TABLE 7

```
<!ELEMENT subdivn
       (%hlev-id;,
        (%hnote;)*,
        ((%secreg;)+ | clause+))
>
<!ATTLIST subdivn
       id
             CDATA
```

TABLE 7-continued

```
             #IMPLIED
       next-id
             CDATA
             #IMPLIED
>
```

TABLE 8

```
<!--
###############################################################
       ELEMENT:   desc
       PURPOSE:   Defines the "description" of a level.
ATTRIBUTES:
       %date-atts;  - defines the start and end dates for this version
                      of the description.
###############################################################
-->
<!ELEMENT desc
       (#PCDATA | %refs; | %effect; | quote)*
>
<!ATTLIST desc
       %date-atts;
>
```

The DTD has been altered such that scoping is transferred from the higher level nodes to terminal nodes.

Consider an example consisting of an Act with two chapters, the second chapter containing two sections, as shown by the system 2100 of FIG. 21. A root node 2110 represents the Act. The root node 2110 has no parent, and all other nodes descend from the root node 2110. The first chapter of the Act is represented by a higher level node 2120. As a higher level node, node 2120 has neither scope nor content. Node 2120 has the following properties: a parent, being the Act node 2110; a position within the parent node 2110, being 1; and an optional locator, being "Chapter 1". Node 2120 has two descendant nodes 2122, 2124. Node 2122 has the following properties: a parent, being the node 2120 identified by its locator "Chapter 1"; a position within the parent node 2120, being 1; an optional locator, being "Chapter 1 Description"; scope, being 1 Jan. 1998 onwards; and content relating to the title or textual description of the first chapter of the Act under consideration. Node 2124 has the following properties: a parent, being the node 2120 identified by its locator "Chapter 1"; a position within the parent node 2120, being 2; an optional locator, being "Chapter 1 Note"; scope, being 1 Jan. 1998 onwards; and content providing general notes or comments pertaining to the first chapter of the Act under consideration.

A second higher level node 2130 represents the second chapter of the Act. Node 2130 has two sections. Node 2130 has the following properties: parent, being the Act node 2110; a position within the parent node 2110, being 2; and an optional locator, being "Chapter 2A". Node 2130 has five child nodes: 2132, 2134, 2136, 2140 and 2150, each of which is a terminal node in this example. Node 2132 has the properties: parent, being Chapter 2A; a position within the parent, being 1; an optional locator, being "Chapter 2A description"; scope, being 1 Jan. 1998-30 Jun. 1998; and content, being "Company Registration". Node 2134 has the properties: parent, being Chapter 2A; a position within the parent, being 2; an optional locator, being "Chapter 2A description"; scope, being 1 Jul. 1998 onwards; and content, being "Registering a Company". Node 2136 has the properties: parent, being Chapter 2A; a position within the parent, being 3; an optional locator, being "Chapter 2A note"; scope; and content. Node 2140 has the properties: parent, being Chapter 2A; a position within the parent, being 4; an optional locator, being "Section 11"; scope; and content. Node 2150 has the properties: parent, being Chapter 2A; a position within the parent, being 5; an optional locator, being "Section 12"; scope; and content.

The different scopes of nodes 2132 and 2134 allow nodes 2132, 2134 to co-exist, without overlapping. Nodes 2132, 2134 may share the same locator, but the combination of locator and scope uniquely identifies the nodes. Nodes 2132, 2134 reflect the amendment of the title of Chapter 2A from "Company Registration" to "Registering a Company". The scopes of nodes 2132, 2134 indicate that the amendment came into effect on 1 Jul. 1998.

In accordance with a further embodiment, higher level scoping is extended to facilitate commentaries, subject indices and similar material. When considering legislation, any amendment results in the production of a modified portion. However, when considering commentaries, two types of amendment to the commentary are possible. In the first scenario, corresponding to the legislation example, the scope of the current predefined portion of commentary is terminated and a new predefined portion is provided. The new predefined portion has a scope commencing on the day after the expiration of the current predefined portion. In the second possible scenario, the current predefined portion of the commentary is amended without a second predefined portion being created.

The scope of commentary portions is extended to include three dates: a start date, an update date and an end date. Referring to FIG. 22A, a screen shot 2260 shows a commentary. The commentary was created on 1 Jul. 2000, as seen from the amendment bar 2265. The commentary has the following scope properties: start date of 1 Jul. 2000, no update date and no end date. FIG. 22B shows a screen shot 2270 of the commentary of FIG. 22A at a later date. The amendment bar 2275 indicates that the commentary was last updated on 1 Sep. 2000. Thus, the scope of the commentary now has a start date of 1 Jul. 2000, an update date of 1 Sep. 2000 and no end date. FIG. 22C shows a further screen shot 2280 of the commentary of FIGS. 22A and 22B at a yet later date. The amendment bar 2284 indicates that at least one further amendment has been applied to the commentary since the update of 1 Sep. 2000 indicated at 2275 in FIG. 22B. The amendment bar 2285 of FIG. 22C shows that the last update date of the commentary is 1 Oct. 2000. Therefore, the scope properties of the commentary now read: First portion: start date of 1 Jul. 2000, end date of 30 Sep. 2000; Second portion: start date of 1 Oct. 2000, and no end date.

In a further embodiment, XML data may be divided into predefined portions and stored as a collection of flat files. In an example, the flat files take the form of a relational database. There is a one to one correspondence between the XML data and the relational database. The hierarchy of the XML data is expressed via the implementation of higher level scoping. A single record is provided with an identifier and other terminal nodes are provided in which to store the remainder of the information.

The process for navigating in a multidimensional space containing an electronic publication formed from predefined portions of text-based data encoded using a markup language can be implemented using a computer program product in conjunction with a computer system 2300 as shown in FIG. 23. In particular, the process for navigating in a multidimensional space containing an electronic publication formed from predefined portions of text-based data encoded using a markup language can be implemented as software, or computer readable program code, executing on the computer system 2300.

Similarly, the process for publishing an electronic publication formed from predefined portions of text-based data encoded using a markup language may also be implemented using a computer program product in conjunction with the computer system 2300 shown in FIG. 23.

The computer system 2300 includes a computer 2350, a video display 2310 and input devices 2330, 2332. In addition, the computer system 2300 can have any of a number of other output devices including line printers, laser printers, plotters, and other reproduction devices connected to the computer 2350. The computer system 2300 can be connected to one or more other computers via a communication input/output (I/O) interface 2364 using an appropriate communication channel 2340 such as a modem communications path, an electronic network, or the like. The network may include a local area network (LAN), a wide area network (WAN), an Intranet, and/or the Internet 2320.

The computer 2350 includes the control module 2368, a memory 2370 that may include random access memory (RAM) and read-only memory (ROM), input/output (I/O) interfaces 2364, 2372, a video interface 2360, and one or more storage devices generally represented by the storage device 2362. The control module 2368 is implemented using a central processing unit (CPU) that executes or runs a computer readable program code that performs a particular function or related set of functions.

The video interface 2360 is connected to the video display 2310 and provides video signals from the computer 2350 for display on the video display 2310. User input to operate the computer 2350 can be provided by one or more of the input devices 2330, 2332 via the I/O interface 2372. For example, a user of the computer 2350 can use a keyboard as I/O interface 2330 and/or a pointing device such as a mouse as I/O interface 2332. The keyboard and the mouse provide input to the computer 2350. The storage device 2362 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 2350 is typically connected to other devices via a bus 2380 that in turn can consist of data, address, and control buses.

The method steps for navigating in a multidimensional space containing an electronic publication formed from predefined portions of text-based data encoded using a markup language are effected by instructions in the software that are carried out by the computer system 2300. Again, the software may be implemented as one or more modules for implementing the method steps.

In particular, the software may be stored in a computer readable medium, including the storage device 2362 or that is downloaded from a remote location via the interface 2364 and communications channel 2340 from the Internet 2320 or another network location or site. The computer system 2300 includes the computer readable medium having such software or program code recorded such that instructions of the software or the program code can be carried out. The use of the computer system 2300 preferably effects advantageous apparatuses for navigating a multidimensional space containing an electronic publication formed from predefined portions of text based data encoded using a markup language and for publishing an electronic publication formed from predefined portions of text based data encoded using a markup language in accordance with the embodiments of the invention.

The computer system 2300 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 2368. Intermediate storage of the program code and any data including entities, tickets, and the like may be accomplished using the memory 2370, possibly in concert with the storage device 2362.

In some instances, the program may be supplied to the user encoded on a CD-ROM or a floppy disk (both generally depicted by the storage device 2362), or alternatively could be read by the user from the network via a modem device connected to the computer 2350. Still further, the computer system 2300 can load the software from other computer readable media. This may include magnetic tape, a ROM or integrated circuit, a magneto-optical disk, a radio or infra-red transmission channel between the computer and another device, a computer readable card such as a PC card, and the Internet 2320 and Intranets including email transmissions and information recorded on Internet sites and the like. The foregoing are merely examples of relevant computer readable media. Other computer readable media may be practised without departing from the scope and spirit of the invention.

The process for navigating in a multidimensional space containing an electronic publication formed from predefined portions of text-based data encoded using a markup language can be realised in a centralised fashion in one computer system 2300, or in a distributed fashion where different elements are spread across several interconnected computer systems.

The process for publishing an electronic publication formed from predefined portions of text-based data encoded using a markup language may also be implemented using a computer program product in conjunction with the computer system 2300 of FIG. 23 in a manner similar to that which has just been described.

Computer program modules or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

In the foregoing manner, a method, an apparatus, and a computer program product for navigating in a multidimensional space containing an electronic publication formed from predefined portions of text-based data encoded using a markup language are disclosed. Further, a method, an apparatus, and a computer program product for publishing an electronic publication formed from predefined portions of text-based data encoded using a markup language are disclosed. While only a small number of embodiments are described, it will be apparent to those skilled in the art in view of this disclosure that numerous changes and/or modifications can be made without departing from the scope and spirit of the invention.

APPENDIX A

Example Research
SOCIAL SECURITY ACT 1991 No 46
Updated as at 9 Aug. 1996

A 1. Amendments to Section at 9/8/96

S.4        am. Nos. 74, 116 and 194, 1991; No. 81, 1992;
            No. 36, 1993; Nos. 55, 63 and 184, 1994; Nos.
            104 and 105, 1995

A 2. Amendments to Section at 10/7/95

S.4        am. Nos. 74, 116 and 194, 1991; No. 81,
            1992; No, 36, 1993; Nos. 55, 63 and 184,
            1994

B. Commencement Information for Act No 105 of 1995 contained in Reprint

Social Security(Non-Budget Measures) Legislation Amendment Act 1995

| Number | Year | Date of Assent | Commencement |
|---|---|---|---|
| 105 | 1995 | 29 Sep. 1995 | Subdiv. A of Div. 2 of Part 2 (s. 4): 1 Jul. 1993 |
| | | | Ss. 8 and 9: 1 Jul. 1995 |
| | | | S. 10: 1 Apr. 1993 |
| | | | Div. 5 of Part 2 (ss. 12 and 13): 20 Sep. 1994 (ze) |
| | | | Ss. 17(c), (d) and 18: 1 Jan. 1996 |
| | | | Div. 15 of Part 2 (s. 37): 29 Nov. 1993 |
| | | | Div. 18 of Part 2 (ss. 41-48): 20 Mar. 1995 |
| | | | S. 49 (a): 12 Mar. 1992 |
| | | | S. 49 (b): 1 Jul. 1992 |
| | | | S. 49(c): 28 Jan. 1993 |
| | | | S. 49(d): 1 Mar. 1993 |
| | | | S. 49(e): 24 Dec. 1993 |
| | | | S. 49(f): 1 Jan. 1994 |
| | | | Remainder: Royal Assent |

C 1. Text of Section at 9/8/96
bold text indicates amendments made by NO 105 of 1995.
SECT 4
Family relationships definitions-couples
4. (1) (1) In this Act, unless the contrary intention appears:
    "approved respite care" has the meaning given by subsection (9);
    "armed services widow" means a woman who was the partner of:
      (a) a person who was a veteran for the purposes of any provisions of the Veterans'
Entitlements Act; or
      (b) a person who was a member of the forces for the purposes of Part IV of that Act: or
      (c) a person who was a member of a peacekeeping force for the purposes of Part IV of that
Act; immediately before the death of the person;

APPENDIX A-continued

"armed services widower" means a man who was the partner of:
(a) a person who was a veteran for the purposes of any provisions of the Veterans' Entitlements Act; or
(b) a person who was a member of the Forces for the purposes of Part IV of that Act; or
(c) a person who was a member of a peacekeeping force for the purposes of Part IV of that Act; immediately before the death of the person;
"illness separated couple" has the meaning given by subsection (7);
"member of a couple" has the meaning given by subsections (2), (3), (3A) [reference to new section added] and (6);
"partner", in relation to a person who is a member of a couple, means the other member of the couple;
"partnered" has the meaning given by subsection (11);
"partnered (partner getting benefit)" has the meaning given by subsection (11);
"partnered (partner getting neither pension nor benefit)" has the meaning given by subsection (11);
"partnered (partner getting pension)" has the meaning given by subsection (11);
"partnered (partner getting pension or benefit)" has the meaning given by subsection (11);
"partnered (partner in gaol)" has the meaning given by subsection (11);
"respite care couple" has the meaning given by subsection (8).
Member of a couple-general
4 (2) Subject to subsection (3), a person is a member of a couple for the purposes of this Act if:
(a) the person is legally married to another person and is not, in the Secretary's opinion (formed as mentioned in subsection (3)), living separately and apart from the other person on a permanent or indefinite [Words added] basis; or
(b) all of the following conditions are met:
(i) the person has a relationship [Words is living replaced] with a person of the opposite sex (in this paragraph called the "partner");
(ii) the person is not legally married to the partner;
(iii) the relationship between the person and the partner is, in the Secretary's opinion (formed as mentioned in subsections (3) and (3A)[Words added]), a marriage-like relationship;
(iv) both the person and the partner are over the age of consent applicable in the State or Territory in which they live;
(v) the person and the partner are not within a prohibited relationship for the purposes of section 23B of the Marriage Act 1961.
Note: a prohibited relationship for the purposes of section 23B of the Marriage Act 1961 is a relationship between a person and:
. an ancestor of the person; or
. a descendant of the person; or
. a brother or sister of the person (whether of the whole blood or the part-blood).
Member of a couple-criteria for forming opinion about relationship
4 (3) In forming an opinion about the relationship between 2 people for the purposes of paragraph (2) (a) or subparagraph (2) (b) (iii), the Secretary is to have regard to all the circumstances of the relationship including, in particular, the following matters:
(a) the financial aspects of the relationship, including:
(i) any joint ownership of real estate or other major assets and any joint liabilities: and
(ii) any significant pooling of financial resources especially in relation to major financial commitments; and
(iii) any legal obligations owed by one person in respect of the other person; and
(iv) the basis of any sharing of day-to-day household expenses;
(b) the nature of the household, including:
(i) any joint responsibility for providing care or support of children: and
(ii) the living arrangements of the people; and
(iii) the basis on which responsibility for housework is distributed;
(c) the social aspects of the relationship, including:
(i) whether the people hold themselves out as married to each other; and
(ii) the assessment of friends and regular associates of the people about the nature of their relationship; and
(iii) the basis on which the people make plans for, or engage in, joint social activities;
(d) any sexual relationship between the people;
(e) the nature of the people's commitment to each other, including:
(i) the length of the relationship; and
(ii) the nature of any companionship and emotional support that the people provide to each other; and
(iii) whether the people consider that the relationship is likely to continue indefinitely; and
(iv) whether the people see their relationship as a marriage-like relationship.
4 (3A) The Secretary must not form the opinion that the relationship between a person and his or her partner is a marriage-like relationship if the person is living separately and apart from the partner on a permanent or indefinite basis. [Subsection added]
C 2. Text of Section at 10/7/95 prior
SECT 4
Family relationships definitions - couples
4. SECT 4
Family relationships definitions-couples
4. (1) In this Act, unless the contrary intention appears:
"approved respite care" has the meaning given by subsection (9);
"armed services widow" means a woman who was the partner of:
(a) a person who was a veteran for the purposes of any provisions of the Veterans' Entitlements Act; or APPENDIX A-continued (b) a person who was a member of the forces for the purposes of Part IV of that Act; or (c) a person who was a member of a peacekeeping force for the purposes of Part IV of that Act; immediately before the death of the person;

"armed services widower" means a man who was the partner of:

(a) a person who was a veteran for the purposes of any provisions of the Veterans' Entitlements Act; or (b) a person who was a member of the Forces for the purposes of Part IV of that Act; or (c) a person who was a member of a Peacekeeping Force for the purposes of Part IV of that Act; immediately before the death of the person;

"illness separated couple" has the meaning given by subsection (7);

"member of a couple" has the meaning given by subsections (2), (3), and (6);

"partner", in relation to a person who is a member of a couple, means the other member of the couple; "partnered" has the meaning given by subsection (11);

"partnered (partner getting benefit)" has the meaning given by subsection (11);

"partnered (partner getting neither pension nor benefit)" has the meaning given by subsection (11);

"partnered (partner getting pension)" has the meaning given by subsection (11);

"partnered (partner getting pension or benefit)" has the meaning given by subsection (11):

"partnered (partner in gaol)" has the meaning given by subsection (11);

"respite care couple" has the meaning given by subsection (8).

Member of a couple-general 4 (2) Subject to subsection (3), a person is a member of a couple for the purposes of this Act if:

(a) the person is legally married to another person and is not, in the Secretary's opinion (formed as mentioned in subsection (3)), living separately and apart from the other person on a permanent basis; or (b) all of the following conditions are met:

(i) the person with a person of the opposite sex (in this paragraph called the "partner");

(ii) the person is not legally married to the partner;

(iii) the relationship between the person and the partner is, in the Secretary's opinion (formed as mentioned in subsections (3)), a marriage-like relationship;

(iv) both the person and the partner are over the age of consent applicable in the State or Territory in which they live;

(v) the person and the partner are not within a prohibited relationship for the purposes of section 23B of the Marriage Act 1961.

Note: a prohibited relationship for the purposes of section 23B of the Marriage Act 1961 is a relationship between a person and:

. an ancestor of the person; or

. a descendant of the person; or

. a brother or sister of the person (whether of the whole blood or the part-blood).

Member of a couple-criteria for forming opinion about relationship 4 (3) In forming an opinion about the relationship between 2 people for the purposes of paragraph (2) (a) or subparagraph (2) (b) (iii), the Secretary is to have regard to all the circumstances of the relationship including, in particular, the following matters:

(a) the financial aspects of the relationship, including:

(i) any joint ownership of real estate or other major assets and any joint liabilities; and (ii) any significant pooling of financial resources especially in relation to major financial commitments; and (iii) any legal obligations owed by one person in respect of the other person; and (iv) the basis of any sharing of day-to-day household expenses;

(b) the nature of the household, including:

(i) any joint responsibility for providing care or support of children; and (ii) the living arrangements of the people; and (iii) the basis on which responsibility for housework is distributed;

(c) the social aspects of the relationship, including:

(i) whether the people hold themselves out as married to each other; and (ii) the assessment of friends and regular associates of the people about the nature of their relationship; and (iii) the basis on which the people make plans for, or engage in, joint social activities;

(d) any sexual relationship between the people;

(e) the nature of the people's commitment to each other, including:

(i) the length of the relationship; and (ii) the nature of any companionship and emotional support that the people provide to each other; and (iii) whether the people consider that the relationship is likely to continue indefinitely: and (iv) whether the people see their relationship as a marriage-like relationship.

D. Amending Act 1995 No 105 amending Section 14

SOCIAL SECURITY (NON-BUDGET MEASURES) LEGISLATION AMENDMENT ACT 1995 No. 105 of 1995- SECT 14

Family relationships definitions-couples

SECT

14. Section 4 of the Principal Act is amended:

(a) by inserting in the definition of "member of a couple" in subsection (1), "(3A)" after "(3)";

(b) by inserting in paragraph (2)(a) "or indefinite" after "permanent";

(c) by omitting from subparagraph (2)(b)(i) "is living" and substituting "has a relationship";

APPENDIX A-continued (d) by omitting from subparagraph (2)(b)(iii) "subsection (3)" and substituting "subsections (3) and (3A)";

(e) by inserting after subsection (3):

"(3A) The Secretary must not form the opinion that the relationship between a person and his or her partner is a marriage-like relationship if the person is living separately and apart from the partner on a permanent or indefinite basis.".

APPENDIX B

CODING - Document Type definitions (dtds)

ACT.DTD

```
<!--**********************************************************************
    Document Type Definition for a set of acts
    Typical invocation:
        <!DOCTYPE acts PUBLIC "-//SGMLSE//DTD 1.0 Acts//EN">
    Copyright Aunty Abha's Electronic Publishing Pty. Ltd. 1996, 1997
**********************************************************************-->
<!ENTITY % CONSOL "IGNORE">
<!-- ****** Include common element and entity definitions *******-->
<!ENTITY % common
    PUBLIC "-//SGMLSE//ELEMENTS 2.0 Common Elements//EN">
%common;
<!-- ******End common element and entity definitions ********-->
<!ELEMENT acts -- (title, header?, act+)
>
<!ENTITY % act PUBLIC "-//SGMLSE//DTD 1.0 Act//EN">
%act;
```

ACTS.DTD

```
<!--**********************************************************************
    Document Type Definition for a set of acts
    Typical invocation:
        <!DOCTYPE acts PUBLIC "-//SGMLSE//DTD.1.0 Acts//EN">
    Copyright Aunty Abha's Electronic Publishing Pty. Ltd. 1996, 1997
**********************************************************************-->
<!ENTITY % CONSOL "IGNORE">
<!****** Include common element and entity definitions *****-->
<!ENTITY % common
    PUBLIC "-//SGMLSE//ELEMENTS 2.0 Common Elements//EN">
%common;
<!-- ****** End common element and entity definitions *******-->
<!ELEMENT acts -- (title, header?, act+)
>
<!ENTITY % act PUBLIC "-//SGMLSE//DTD 1.0 Act//EN">
%act;
```

REG.DTD

```
<!--**********************************************************************
    Document Type Definition for a set of regulations
    Typical invocation:
        <!DOCTYPE regact PUBLIC "-//SGMLSE//DTD 1.0 Regulation Act//EN">
    Copyright Aunty Abha's Electronic Publishing Pty. Ltd. 1996, 1997
REVISION History
***************
190197 TH Since RULE, REG and SECTION are all equivalent, removed REG from this DTD
        Added long-title
**********************************************************************-->,
<!ELEMENT reg - - (title, notes?, provisions?, (preamble|long-title)?,
((order+| (section|schedule)+ |chapter+|part+),schedule*))>
<!ATTLIST reg Id ID #REQUIRED
        date CDATA #IMPLIED -- used in numacts ---
            %status;
            %subject;
>
```

REGS. DTD

```
<!--******************************************************
    Document Type Definition for a set of regulations
    Typical invocation:
        <!DOCTYPE regs PUBLIC "-//SGMLSE//DTD 1.0 Regulations//EN">
    Copyright Aunty Abha's Electronic Publishing Pty. Ltd. 1996, 1997
REVISION History
***********
**********************************************************************-->
<!ENTITY % CONSOL "IGNORE">
<!ELEMENT regs -- (title, header?, reg+)>
<!-- ****** Include common element and entity definitions *******-->
```

APPENDIX B-continued

```
<!ENTITY % common
    PUBLIC "-//SGMLSE//ELEMENTS 2.0 Common Elements//EN">
%common;
<!-- ****** End common element and entity definitions ********-->
<!ENTITY % reg PUBLIC "-//SGMLSE//DTD 1.0 Regulation//EN">
%reg;
COMMON. ELT
<!**************************************************************
    Common element, attribute and entity definitions.
    Typical invocation:
    <!ENTITY % common PUBLIC
        "-//SGMLSE//ELEMENTS 3.0 Common Elements//EN">
    %common;
    VERSION 319 Jan 1997
    Copyright Aunty Abha's Electronic Publishing Pty. Ltd. 1996, 1997
REVISION History
*************
141096              TH         Added p* to definition of schedule
151096              TH         Added %reqid; %reqlbl; attributes to RULE,
            ORDER, DIVISION, SUB-DIVISION
            Added P+ and SUB+ to rule definition
251096              TH         Added ststus entity for amendment information
291096              TH         Changed definition for ORDER
141196              TH         Added <ALTERED>element
261196              TH         Too many changes to mention - Designated Version 2
150197              TH         Too many changes to mention -
Designated Version 3
190197              TH         Changed contents of SECTION and SCHEDULE to (title, (%unstruct-
cont;))
            TH     Since RULE, REG and SECTION are all equivalent, renamed all to SECTION
and added attribute TYPE to designate which type of section they are
            TH     Added entity SUBJECT to allow each element to belong to 1 or more subjects
            TH     Added entity CONSOL which is invoked in the consolidation DTD using marked
sections
***************************************************************-->
<!--
++++++++++++++++++++++++++++++++++++++++++++++++++
+++++-->
<!-- ISO Character Entity Set Declarations and References -->
<!--
++++++++++++++++++++++++++++++++++++++++++++++++++++
+++++-->
    <!ENTITY % ISOnum PUBLIC "ISO 8879:1986//ENTITIES Numeric and
            Special Graphic//EN"
    <!ENTITY % ISOpub PUBLIC "ISO 8879:1986//ENTITIES
            Publishing//EN"
    <!ENTITY % ISOtech PUBLIC "ISO 8879:1986//ENTITIES
            General Technical//EN"
    <!ENTITY % ISOlat1 PUBLIC "ISO 8879:1986//ENTITIES
            Added Latin 1//EN"
    <!ENTITY % ISOgrk3 PUBLIC "ISO 8879:1986//ENTITIES
            Greek Symbols//EN"
    %ISOnum;
    %ISopub;
    %ISOtech;
    %ISOlat1 ;
    % ISOgrk3;
<!-- ******************* End Character entities ******************-->
<!-- ******************* Parameter Entities ******************* -->
<!ENTITY % consol "">
<![ %CONSOL [
<!ENTITY % consol "cal            NAMES           #IMPLIED
                -- Creating amending act ID (IDs) -
                eai        NAMES         #IMPLIED
                -- Ending amending act ID (IDs) -
                "
>
]]>
<!ENTITY % status
        "insert-date      NUMBER        #IMPLIED -- insert date -
        insert-leg       IDREF                #IMPLIED -- link to the inserting legislation -
        repeal-date      NUMBER        #IMPLIED -- repeal date -
        repeal-leg       IDREF                #IMPLIED -- link to the repealing legislation -
        amend-date       NUMBER        #IMPLIED -- amended date -
        amend-leg        IDREF                #IMPLIED -- link to the amending legislation -
        "
>
<!ENTITY % reqid "id              ID      #REQUIRED"
    -- required id --
>
```

APPENDIX B-continued

```
<!ENTITY % reqlbl "lbl         CDATA        #REQUIRED"
    -- required label --
>
<!ENTITY % emph "bold | ital"
    -- emphasised text --
>
<!ENTITY % refs "xref | rngref | tempref | noteref"
    -- references --
>
<!ENTITY % inline "quote | ileqn | %emph; | %refs; | super | subscr"
    -- inline text elements -
>
<!ENTITY % text "#PCDATA | %inline;"
    -- inline text elements plus character data --
>
<!ENTITY % ref-cont "#PCDATA"
-- content of references --
>
<!ENTITY % plevel "p | dpeqn | tblblk | list | blockquote | form"
    -- paragraph level (block) elements --
>
<!ENTITY % tblcon "p | dpeqn | list"
    -- content of table cells --
>
<!ENTITY % para-cont "(%plevel;)+"
    -- content of long-title or section level elements -
>
<!ENTITY % unstruct-cont          "((%plevel;) | article| chapter| part|notes)*">
<!ENTITY % subject                "subject     NAMES    #IMPLIED"
    -- optional subject -
>
<!-- ************** End Parameter Entities ************************* -->
<!-- ************** Include Maths and Table elements *********** -->
<!ENTITY % atimath PUBLIC "-//SGMLSE//ELEMENTS Math Equation
Structures//EN">
%atimath;
<!ENTITY % atitbl PUBLIC "-//SGMLSE//ELEMENTS Table Structures//EN">
%atitbl;
<!-- **********"*"****** End Maths and Table elements ******** -->
    <!-- Main elements -->
<!ELEMENT part - - (title, (%plevel;)*, (chapter+|division+|section+)*, notes?)
>
<!ATTLIST part %reqid;
    %reqlbl;
        %status;
        % subject;
        > %consol;
>
<!ELEMENT order - - (title, (division|section|part|schedule)+)
    -- in numregs --
>
<!ATTLIST order %reqid;
    %reqlbl;
        %status;
        %subject;
        %consol;
>
<!ELEMENT division - - (title, (sub-division+|section+))
    -- in numregs --
>
<!ATTLIST division %reqid;
    %reqlbl;
        %status;
        %subject;
        %consol;
>
<!ELEMENT sub-division -- (title, section+)
    -- in numregs --
>
<!ATTLIST sub-division %reqid;
    %reqlbl;
        %status;
        %subject;
        %consol;
>
<!ELEMENT chapter -- (title, (%plevel;)*, (part+|section+|article+)?)
    -- part+ and section+ for numacts -
>
<!ATTLIST chapter %reqid;
    %reqlbl;
```

APPENDIX B-continued

```
      %status;
      %subject;
      %consol;
>
<!ELEMENT article - - (title, (%plevel)*, notes?)
>
<!ATTLIST article %reqid;
   %reqlbl;
      %status;
      %subject;
>
<!ELEMENT section - -- (title, (%unstruct-cont;))>
<!ATTLIST section
%reqid;
   %reqlbl;
      %status;
      astprov NAMES #IMPLIED
        type (section|rulelreg) section
        %subject;
        %consol;
>
<!ELEMENT schedule - - (title?, (%unstruct-cont;))
    -- Schedule of an Act -
>
<!ATTLIST schedule %reqid;
   %reqlbl;
      %status;
      %subject;
      %consol;
>
<!-- ************************************* -->
<!ELEMENT provisions - - (title, tblblk+)
   -- provisions -
>
<!ATTLIST provisions
      %subject;
>
<!ELEMENT form - - (title, formreg, front, back?)>
<!ATTLIST form %reqid
   %reqlbl;
      %status;
      parastyle CDATA #IMPLIED
      %subject;
>
<!ELEMENT formreg - - (#PCDATA)
-- Regulation -
>
<!ATTLIST formreg
      %subject;
>
<!ELEMENT front - - (asis)
-- front of form -
>
<!ATTLIST front
      %subject;
>
<!ELEMENT back - - (asis)
-- back of form -
>
<!ATTLIST back
      %subject;
>
<!ELEMENT asis - - (#PCDATA)
--text as is -
>
<!ATTLIST asis
      %subject;
>
<!-- ************* Header elements ********************-->
<!ELEMENT header - - (scope?, updated?)>
<!ATTLIST header
      %subject;
>
<!ELEMENT scope - - (%text;)+>
<!ATTLIST scope
      %subject;
>
<!ELEMENT updated - - (%text;)+>
<!ATTLIST updated
      %subject;
```

APPENDIX B-continued

```
>
<!ELEMENT notes - o (note+)>
<!ATTLIST notes
   %subject;
>
<!ELEMENT note - - (%plevel;)+
>
<!ATTLIST note       id     ID     #REQUIRED
   %subject;
>
<!-- ***************** End Header elements ""************-->
<!-- ****************** structural elements ****************-->
<!ELEMENT title - - (%text;)+
   -- Generic title -
>
<!-- ****************** End structural elements ************** -->
<!-- ****************** plevel elements *********************** -->
<!ELEMENT blockquote - - (%unstruct-cont;)+
>
<!ATTLIST blockquote parastyle CDATA #IMPLIED
   %subject;
>
<!ELEMENT p - - (%text;)+
   -- paragraph - a line of text terminated by a carriage return in the hardcopy -
>
<!ATTLIST p parastyle CDATA #IMPLIED
   %subject;
>
<!ELEMENT list - - (li)+
>
<!ATTLIST list parastyle CDATA #IMPLIED
   %subject;
>
<!ELEMENT li -- (p | blockquote | tblblk | list)+
   -- item in a list --
>
<!ATTLIST li lbl CDATA #REQUIRED
   %status;
   %subject;
>
<!ELEMENT tblblk - - (title?, (table|#PCDATA))
   -- table block --
>
<!ATTLIST tblblk parastyle CDATA #IMPLIED
   %subject;
>
<!ELEMENT dpeqn - - (fd)
   -- display equation --
>
<!ATTLIST dpeqn parastyle CDATA #IMPLIED>
<!-- ***************** End plevel elements ***************** -->
<!-- ****************** in line elements ********************** -->
<!ELEMENT xref - - (%ref-cont;)+
   -- cross reference to a single target point -
>
<!ATTL1ST xref       ref     IDREF       #REQUIRED
>
<!ELEMENT noteref - 0 EMPTY
   -- cross reference to a note -
>
<!ATTLIST noteref ref       IDREF       #REQUIRED
>
<!ELEMENT rngref - - (%ref-cont;)+
   -- cross reference to a sequential range of target points -
>
<!ATTLIST rngref       startref     NAME       #REQUIRED
             endref           NAME       #REQUIRED
>
<!ELEMENT tempref - - (%ref-cont;)+
   -- cross reference to a single target point where the idstring is unknown -
>
<!ELEMENT ileqn - - (f)
   -- inline equation -
>
<!ELEMENT super - - (%text;)+ -(super,subscr)
   -- superscript -
>
<!ELEMENT subscr - - (%text;)+ -(super,subscr)
   --subscript -
>
```

APPENDIX B-continued

```
<!ELEMENT quote - - (%text;)+
>
<!ELEMENT bold - - (%text;)+ -(bold)
   -- text set in bold which is not a title or a label -
>
<!ELEMENT ital - - (%text;)+ -(ital)
   -- text set in italic which is not a title or a label -
>
<!ELEMENT altered - 0 EMPTY>
<!ATTLIST altered by CDATA #REQUIRED>
<!-- ***************** End inline elements ****************** -->
<!ELEMENT long-title - - (%para-cont;)>
<!ELEMENT preamble - - (%para-cont;)>
                                                CONSOL.DTD <!-- ********************************************************
Document Type Definition for the consolidation
Typical invocation:
<!DOCTYPE consol PUBLIC "-//SGMLSE//DTD 1.0
Colsolidation//EN">
Copyright Aunty Abha's Electronic Publishing Pty. Ltd. 1996, 1997
REVISION History
************
******************************************************** -->
<!ENTITY % CONSOL "INCLUDE">
<!-- ****** End common element and entity definitions *********** -->
<!ELEMENT consol                  - - (actlreg)+
>
<!-- ****** Include common element and entity definitions *********-->
<!ENTITY % common
    PUBLIC "-//SGMLSE//ELEMENTS 2.0 Common Elements//EN"> %common;
<!ENTITY % reg PUBLIC "-//SGMLSE//DTD 1.0 Regulation//EN"> %reg;
<!ENTITY % act PUBLIC "-//SGMLSE//DTD 1.0 Act//EN">
%act;
```

APPENDIX C

Relational Database Specifications

TABLE OF CONTENTS

Database Tables Entry Procedure
[A] GENERAL
[A 1] Introduction
[A 2] General Purpose and Structure of the Database\
[A 3] General Note about Dates Required for Fields in Database Tables
[B] MASTER TABLE
[B 01] ID FIELD
[B 02] Date of Assent/Date of Notification Field
[B 03] Short Title Field
[B 04] Date of Commencement Field
[B 04.1] Other forms of commencement or notification
[B 05] Date of Expiry Field
[B 06] Type Field
[B 07] Reprint No Field
[B 08] Reprint Date Field
[C] TEXTBLOCK TABLE
[C 01] When the should it be used
[C 02] ID Field
[C 03] Textblock ID1
[C 04] Textblock ID2
[C 05] Date of Commencement Field
[C 06] Date of Expiry Field
COMMONWEALTH PROJECT

CHAPTER XX - Database Tables Entry Procedure
[A] GENERAL
[A 01] Introduction
This Chapter is divided into three topics;
[A] This General topic,
[B] The Master Table of the Data Base; and
[C] The Textblock Table of the Data Base.
All text like this in 10 pt Arial font size is "explanatory text and notes" on the data base.
All text in Courier 9 pt font size with a rule on the left hand side is the text used for examples, the text is taken from the Commonwealth data where possible to make it look like the real thing, however, some examples have been created for the purposes of explanation and do not exist in the data itself.
References in capitals to ACT(S) or REGULATION(S) are references to the whole Acts or Regulations. The word regulation when written with a lower case "r" will refer to a numbered

APPENDIX C-continued regulation (eg: regulation 2). Note: this does not apply to the text of examples which have been left as they appear in the data.
The word Section written with a capital "S" will refer to the numbered section of an ACT (eg: Section 2). Note: this does not apply to the text of examples which have been left as they appear in the data.
The word Part written with a capital "P" will refer to the means of dividing an ACT known as a Part (eg: Part 2 or Part II). Note: this does not apply to the text of examples which have been left as they appear in the data.
Note: the reference to Sections in Commonwealth ACTS and regulations in Commonwealth REGULATIONS is by way of the lowest piece of text first, eg: 8(8)(a) would be written "paragraph 8(8)(a)" not "Section 8(8)(a)".
Note: Fields are out of database structure order in the examples because they appear at different places in the legislation to the structure used in the database tables.

[A 02] General Purpose and Structure of the Database
Purpose
To provide a means of managing, monitoring and checking the content of the Commonwealth Legislation Consolidation.
To allow the time based (versioning) capacity of the DTD and SGML coding being under taken to be realised.
The database is to consist of two tables.
These Tables will be known as MASTER and TEXTBLOCK.
The specific purpose of each Table will be as follows:-
MASTER will focus on fields that collect data about an ACT or REGULATION as a whole.
TEXTBLOCK will focus on specific sub-elements of the whole of an ACT or REGULATION.

[A 03] General Note. about Dates Required for Fields in Database Tables
Dates in the Database will be used primarily to identify two things:
the beginning of a whole or part of an ACT or REGULATION, or
the end of the whole or part of an ACT or REGULATION
Entries for dates will all be in the dd/mm/yy formula.
There are 3 ways dates will be appear in the legislation:
specific - are stated in the legislation itself (for example, Date of Assent)
to be advised - are to be published or advised elsewhere (for example, proclaimed in Gazette)
conditional - are based on something else happening (for example, the commencement of another ACT or REGULATION, the creation of or termination of an organisation, the happening of an event)

[B] MASTER TABLE
[B 01] ID FIELD
This is the most important field in the database as it ties all the remaining fields and their information together.
For the example used here, that is, the Social Security Act this will be Act-19910046. This is arrived at by combining,
(i) the type of legislation, in this case an ACT - see (a) below, then
(ii) the year of enactment/creation, in this case 1991 - see (b) below, and finally,
(iii) the ACT'S Number- see (c) below.
All three parts of the ID are important. Inputting the right type, that is, Act for ACTS and Reg for REGULATION etc., and the right year and number is critical as only the correct combination of all three will give the required accuracy.
In the ID field the year and number are separated by a hyphen. Also four digits must be used for the year number, thus 0046 and not 46 is used for the ACT'S number in this example.
An important point to note is that it is possible for an ACT or REGULATION to be known as say the Federal Law Act 1996 but to be Act No 2 of 1997, so that its ID then will be Act-19970002
$$#
$$T
SOCIAL SECURITY (a) ACT 1991
- Updated as at 10 Jul. 1995
$$T
*1* The Social Security Act 1991 as shown in this reprint comprises Act No. (c)46, (b)1991 amended as indicated in the Tables below.<

[B 02] Date of Assent/Date of Notification Field
This will appear in different places according to the style and type of information.
For ACTS use the Table of Acts at the column Date of Assent. The entry for Act No 46, 1991 being the entry for the principal ACT, that is the Social Security Act, is the place to look and the second column shows the date of assent as 23 Apr. 1991(see (d) below).
Table of Acts<

| Act Number and year | Date of assent | Date of commencement | Application< saving or< transitional< provisions< |
|---|---|---|---|
| Social Security Act 1991< | | | |
| 46, 1991 | (d)23 Apr. 1991 | 1 Jul. 1991< | |

For REGULATIONS use the Table of Statutory Rules at the column Date of Notification.
The entry for REGULATION No 36, 1990 being the entry for the principal REGULATIONS, that is the Cash Transactions Reports Regulations, is the place to look and the second column shows the date of notification as 27 Feb. 1990 (see (e) below).
*1* The Cash Transaction Reports Regulations (in force under the Cash Transaction Reports Act 1988) as shown in this reprint comprise Statutory Rules 1990 No. 36 amended as indicated in the Tables below.

Table of Statutory Rules

| Year and Number | Date of notification | Date of commencement | Application, saving or |
|---|---|---|---|

APPENDIX C-continued

| | in Gazette | | transitional provisions |
|---|---|---|---|
| 1990 No. 36 (e)27 Feb. 1990 | | 27 Feb. 1990 | |

[B 03] Short Title Field
This usually appears in Section 1 of an ACT or regulation 1 of a REGULATION. This is the best place to take the name from as it is the legislated/official way that the ACT, REGULATION etc., is to be referred to etc. See (f) below.
The name should be entered in full (no abbreviations).
You should include the year even though it is part of the ID and also the words ACT or REGULATION. This will firstly, provide a cross check as normally these should match. It will also indicate those ACTS or REGULATIONS where the Short Title Year is different to the Year and Number in the ID field.
$$A
$$T
SOCIAL SECURITY ACT 1991 - SECT 1<
Short title
$$T
$$NSECT
1. This Act may be cited as the (f) Social Security Act 1991. *1* $$S

[B 04] Date of Commencement Field
This information usually appears in Section 2 for an ACT and regulation 2 for a REGULATION. This is the best place to take the date of commencement from as here it is part of the legislation/the law and therefore always correct (even if its wrong). If taken from the Table of Acts or Table of Regulations an error would not be correct even if not made by us because technically; Tables, Title Pages and even side/margin notes are not considered part of legislation.
See (g) below for an example.
$$T
SOCIAL SECURITY ACT 1991 - SECT 2<
Commencement
$$T
$$NSECT
2. This Act commences on (g) 1 Jul. 1991.
$$A
$$T

[B 04.1] Other forms of commencement or notification
The example given at (g) above is a simple form of commencement in that one date is stated in Section 2.
There are other forms of commencement as follows:-
24. ACTS or REGULATIONS where no date of commencement is specified enacted on or before 31 Dec. 1937 (that is, there is no Section 2 and no other section dealing with commencement) commence on the day on which the ACT was assented to for ACTS (for example, the Acts Interpretation Act 1901 assented to on Dec. 7, 1901). These Acts require no entry in the MASTER TABLE as the Date of Commencement and Date of Assent are the same.
25. ACTS or REGULATIONS where no date of commencement is specified enacted on or after Jan. 1, 1938 (that is, there is no Section 2 and no other section dealing with commencement) then the Act by default commences on 28th day after the Date of Assent. These Acts do require an entry in the MASTER TABLE as the Date of Commencement and Date of Assent are not the same.
26. ACTS or REGULATIONS where various Parts, Sections, regulations etc., commence on different dates or on dates to be proclaimed or notified in Gazette.
27. ACTS or REGULATIONS where various Parts, Sections, regulations etc., commence the commencement of another ACT, REGULATION or Part or Section of another ACT or REGULATION etc.
Note: With respect to the calculation of time (as for example, in the case of commencement 28 days after assent) Section 36 of the Acts Interpretation Act affects how this is done. Section 36 provides:
28. Where in an ACT any period of time, dating from a given day, act, or event, is prescribed or allowed for any purpose, the time shall, unless the contrary intention appears, be reckoned exclusive of such day or of the day of such act or event.
29. Where the last day of any period prescribed or allowed by an ACT for the doing of anything falls on a Saturday, on a Sunday or on a day which is a public holiday or a bank holiday in the place in which the thing is to be or may be done, the thing may be done on the first day following which is not a Saturday, a Sunday or a public holiday or bank holiday in that place.
The above will be handled in Australia with respect of those ACTS or REGULATIONS to which this applies.

[B 05] Date of Expiry Field
This is the opposite of commencement; that is, it indicates when the whole of an ACT or REGULATION or some Part, Section or regulation in an ACT or REGULATION ceases to have effect.
Note: because the expiry is provided for in the ACT or REGULATION itself, this is different to a repeal. The effect is however, the same.
Sections or Regulations relevant to this field are headed "Sunset clause" or "Sunset provision" see (h) below.
Note: the use of the words "unless sooner repealed" in the examples below. This means entries will need to be checked or reviewed to ensure that ACT or REGULATION has not been sooner repealed.
The date or timing of expiry is indicated/expressed in a few different ways:by a specific date, see (i) below.
by a period of years, see(j) below.

APPENDIX C-continued

30. Examples of expiry of the whole ACT by a specific date.
AUSTRALIAN MEAT AND LIVE-STOCK (QUOTAS) ACT 1990 - Updated as at 18 Jul. 1995
. . . . . . . . . . . . . . . . . . . . .
SECT 9
Sunset clause (h)
9. This Act, unless sooner repealed, shall cease to be in force at the (i)end of 30 Jun. 1998.
Note: the example above uses the words "cease to be in force" and the one below the words
"ceases to have effect". The result is still the same for our purpose.
MEAT AND LIVE -STOCK INDUSTRY ACT 1995 No. 67 of 1995 -
Assented to 30 Jun. 1995
. . . . . . . . . . . . . . . . . . . . .
SECT 227
Sunset clause
227. This Act, unless sooner repealed, ceases to have effect at the end of 30 Jun. 1998.
31. Example of expiry of Part, Division, Subdivision or Section of ACT after a specified period
of years.
NATIVE TITLE ACT 1993
Updated as at 30 Jun. 1995
. . . . . . . . . . . . . . . . . . . . .
SECT 207
Sunset provision
207. This Part ceases to be in force at the Wend of 5 years after the Parliamentary Joint Committee is first
appointed.
32. Examples of expiry of a portion of a REGULATION
FEDERAL COURT RULES
Updated as at 22 Mar. 1996
. . . . . . . . . . . . . . . . . . . . .
ORDER 75 NATIVE TITLE RULES
NATIVE TITLE ACT 1993
. . . . . . . . . . . . . . . . . . . . .
ORDER 75
RULE 21
Sunset provision
21. Order 75 ceases to be in force on 1 Mar. 1997.
MIGRATION (1993) REGULATIONS - Updated as at 25 Jul. 1994
. . . . . . . . . . . . . . . . . . . . .
REG 2A
10A
Sunset provision
2A.10A. No application may be made under this Division on or after 1 Jul. 1993.
[B 06] Type Field
This Field provides more specific information about the type of legislation. It is different to the ID
Field described above which gives the legislation a unique ID. This Field uses three single
character codes to describe the legislation.
These are as follows:
P = Principal ACTS or REGULATIONS.
It indicates that this is the main or Principal ACT or REGULATION.
OR In other words the ACT or REGULATION which gets amended.
Principal ACTS or REGULATIONS can be either in existence (enacted in previous years) or newly
enacted (created in the current year).
There is nothing specifically unique or different in a principal ACT or REGULATION that makes it
easy to identify. By elimination it is however, possible to say what is not a Principal ACT or
REGULATION. This is done by looking at the ACT or REGULATION'S title information.
Amending Acts or Regulations (which are dealt with next) usually contain the word's "Amending",
"Amendment", "Repeal" or "Statute Law Revision" in their Short Title. Another indicator in the
case of ACTS is that the Long Title will also contain the word's "Amending", "Amendment",
"Repeal" or "Statute Law Revision" (REGULATIONS however, do not have a Long Title).
The example marked(K) and(J) below shows the Long and Short Titles for a Principal Act known
as the Trade Practices Act. (Compare these examples with the ones marked (L) and 20 (M)
below).
LONG TITLE(K)
An Act relating to certain Trade Practices
PART I-PRELIMINARY
SECT 1
Short title(J)
1. This Act may be cited as the Trade Practices Act 1974.*1*
SEE NOTES TO FIRST ARTICLE OF THIS CHAPTER .
Note: A principal ACT or REGULATION can contain amendments to other ACTS or
REGULATIONS. It therefore, still needs to be considered for its effect on other ACTS.
A = Amending ACTS or REGULATIONS.
It indicates that this is a <u>changing</u> or Amending ACT or REGULATION.
OR In other words the ACT or REGULATION which does the amending.
Amending ACTS or REGULATIONS will not generally exist in their own right in the consolidated
information for which we are creating the data base. The changes they effect will nearly always
become part of the Principal ACT or REGULATION.
There are some rare exceptions to the above point however, which will need to be identified (the
way to do this most effectively will be to identify them in Australia and provide a list or table of what
these ACTS and REGULATIONS are).

APPENDIX C-continued

As already stated the best ways to identify an Amending ACT or REGULATION are:
Amending ACTS or REGULATIONS will nearly always contain the word's "Amending",
"Amendment", "Repeal" or "Statute Law Revision" in their Short Title.
For Acts (but not Regulations) there is also a Long Title at the very beginning of the Act (usually
before Section 1) which will also contain the word's "Amending" "Amendment", "Repeal" or
"Statute Law Revision".
The example marked (L) and (M) below shows the Long and Short Titles for the Amending ACT
known as the Trade Practices (Secondary Boycotts) Amendment Act 1979.
LONG TITLE(L)
An Act to amend the Trade Practices Act 1974 with respect Secondary Boycotts and other industrial
practices.
PART I-PRELIMINARY
SECT 1
Short title(M)
1. This Act may be cited as the Trade Practices (Secondary Boycotts) Amendment Act 1979.*1*
SEE NOTES TO FIRST ARTICLE OF THIS CHAPTER .
Note: An Amending ACT or REGULATION can be amended itself by a further amending ACT or
REGULATION.
MoreExamplesofAmendingACTSandREGULATIONS
Following are some more examples of Amending ACTS and REGULATIONS and what to look for.
Statute Law Revision Acts
Below are two examples of these. Usually, this is clean up legislation which makes many changes
and often effects a larger number of ACTS. They can be specific as in the case of the Decimal
Currency example or they can be general as in the case of the 1973 example.
They can both change (amend Parts, Divisions and Sections of ACTS and REGULATIONS) and/or
delete (repeal) whole ACTS and REGULATION or Parts, Divisions and Sections.
Statute Law Revision (Decimal Currency) Act 1966
Statute Law Revision Act 1973
There are other form of Amending ACT similar to the Statute Law Revision Acts as follows:
A.C.T. Self-Government (Consequential Provisions) Regulations 1989 No. 3
Defence Legislation Amendment Act 1984
Fringe Benefits Tax (Miscellaneous Provisions) Act 1986
Statute Law (Miscellaneous Provisions) Act (No. 1) 1986
Taxation Laws Amendment Act (No. 3) 1986
The above can usually be spotted by the use of words such as "Consequential Provisions" "Laws
Amendment", "Legislation Amendment", "Miscellaneous Provisions" in their Short Titles.
Repeal Acts
Below are two examples of these. One where the term Legislation is used in the title indicating
that more many ACTS are being repealed. Again this is often clean up legislation which repeals
many ACTS whose purpose or reason for being has lapsed. Alternatively, as the second example
indicates Repeal ACTS can be specific, effecting the repeal of only one ACT.
Egg Export Legislation Repeal Act 1984
National Welfare Fund Repeal Act
N = Not known
Indicates that the type of the ACT or REGULATION is not known or cannot be determined. These
records will the be handled in Australia.
[B 07] Reprint No Field
The information required for this field does not appear in the Commonwealth Data as presently
supplied to/held by us. It will need initially to be obtained in the form of a list of existing reprints
and their numbers and be added to both the Commonwealth data and the data base as a once
only job. It will then need to be maintained on a monthly basis using the two AGPS Pamphlet
Publications known as ACTS TABLES for Acts and STATUTORY RULES TABLES for
Regulations, the last page in each contains this information for the current year. Note: where the
Pamphlets are not available or the reprint number is not known or unavailable then the number
999 should be used to indicate this.
Each of the two tables from the Pamphlets contains the name of the Reprinted ACT or
REGULATION in alphabetical order (but see Statutory Rules example below) followed by the date
of reprint, then followed by the words "Reprint No." and a number. It is this last number that needs
to be entered.
ACTS TABLE entry example
National Health Act 1935 (20 Sep. 1996) Reprint No. 5
STATUTORY RULES TABLE entry example
Note: Statutory Rules are listed by their parent Act (the Act under which the are made appearing in
Italic as shown in the example below).
Banks (Shareholdings) Act 1972
Banks (Shareholdings) Regulations (2 Aug. 1995) Reprint No 2
[B 08] Reprint Date Field
Like the Reprint Number discussed in [B 07] above the information required for this field does not
appear in the Commonwealth Data as presently supplied to/held by us. It too will need initially to
be obtained in the form of a list of existing reprints and be added to both the Commonwealth data
and the data base as a once only job. It will then need to be maintained on a monthly basis using
the two AGPS Pamphlet Publications known as ACTS TABLES for ACTS and STATUTORY
RULES TABLES for Regulations, the last page in each contains this information for the current
year.
Each of the two tables contains the name of the Reprinted ACT or REGULATION in alphabetical
order (but see Statutory Rules example below) followed by the date of reprint, then followed by the
words "Reprint No." and a number.

APPENDIX C-continued

For this field it is the Date preceding the Reprint Number that needs to be entered. For examples see the examples at [B07] above.
Note: Again where the Pamphlets are not available or the reprint date is not known or unavailable then the date 00/00/00 should be used to indicate this.

[C] TEXTBLOCK TABLE

[C 01] When the should it be used?
TEXTBLOCK entries will not normally be required for ACTS or REGULATIONS which are either Principal or Reprinted ACTS or REGULATIONS. But note that in the case of Principal ACTS there are exceptions, namely; where the Principal ACT or REGULATION also amends or repeals other ACTS or REGULATIONS.

[C 02] ID FIELD
This field simply repeats the information obtained in [B 01] above. Its purpose is to link this Table with the MASTER TABLE by way of the same ID. For the example, in [B 01] for the Social Security Act the ID was Act-19910046. This ID would be repeated in this field.

[C 03]Textblock ID1
This field is for the ID of the specific Part, Section or regulation in an Amending ACT or REGULATION that causes a change (amendment) to happen.
Textblock ID2 (see [C 04] below) on the other hand records the ID of the specific Part, Section or regulation in an Amending Act or Regulation that is changed (amended).

EXAMPLE 1
Following is an example of an amendment to the Social Security Act which shows how the information required for this field is obtained.
Please note there are several ways in which Amending ACTS and REGULATIONS are presented. However, the information required for this ID field is present in all cases. This first example shows the things to look for and the next example show some of the variations possible.
(N) The first thing required is an indication as to type. The example is an Amending Act.
(O) The second thing required is the relevant year. In the example this is 1995.
(P) The third thing required is the Act or Reg Number. In this example this is 104.
(Q) The fourth thing required is the specific Part, Section or regulation doing the amending. In this example this is SCH1 (ie: Schedule 1).
The ID entry for this example would then be as follows:
   ACT-19950104-SCH-1
SOCIAL SECURITY LEGISLATION (N)AMENDMENT ACT (No. 1) (O)1995 No.(P)104 of 1995
. . . . . . . . . . . . . . . . . . . . . . . . .
                    (Q)SCHEDULE 1 Section 4<
            AMENDMENT OF THE SOCIAL SECURITY ACT 1991 RELATING TO<
                        THE DEFINITION OF INCOME<
1. After Paragraph 8 (8) (zf) :<
Insert:<
"(zfa) a payment of financial supplement made to the person<
under the Student Financial Supplement Scheme;".<

EXAMPLE 2
This example shows a different style of amendment to Example 1.
The ID entry for this example would be as follows: ACT-19950105-SEC-4
It would be made up of the following:
(R) Indication of Amending Act. (This would be Reg if we were dealing with a Regulation).
(S) Year of Act is 1995.
(T) Act or Reg Number is 105.
(U) Specific Part, Section or regulation doing the amending is SEC4. Note: there is no reference to a Schedule (SCH) because Section 4 is doing the amending.
SOCIAL SECURITY (NON-BUDGET MEASURES) LEGISLATION (R)AMENDMENT ACT (S)1995 No. (T)105 of 1995
$$NSECT
(U)4. Section 198 of the Principal Act is amended by inserting after subsection (1A) :
$$P
   "(1B) Subject to subsection (1C), if:<
   (a) a person; (the 'carer') is personally providing constant care for a severely handicapped person; and<
   (b) the handicapped person is temporarily absent from Australia for a period of not more than 3 months; and<
   (c) the carer accompanies the handicapped person on his or her absence from Australia;<
the carer does not cease to be qualified for a carer pension merely because of that absence from Australia.
$$P
   "(1C) If, during a calendar year, the carer has accompanied the handicapped person outside Australia on more than one occasion, the caser ceases to be qualified for carer pension under subsection (1B) in that calendar year after he or she has, during that calendar year, qualified for carer pension under that subsection for periods that together add up to 3 months.".
$$A

[C 04] Textblock 102
This field is for the ID of the specific Part, Section or regulation in an Amending ACT or REGULATION that is changed (amended).
Textblock ID1 (see [C 03] above) on the other hand records the ID of the specific Part, Section or regulation in an Amending ACT or REGULATION that causes a change (amendment) to happen.

EXAMPLE 1
Following is an example of an amendment to the Social Security Act which shows how the information required for this field is obtained.
Please note, as with Textblock IDI, there are several ways in which Amending ACTS and REGULATIONS are presented. However, the information required for this ID field is present in all cases. This first example shows the things to look for and the next example shows some of the variations possible.

APPENDIX C-continued

(V) Again the first thing is an indication as to type. The example is an Amending Act.
(W) The second thing required is the relevant year. In the example this is 1991.
(X) The third thing required is the Act or Reg Number. In this example this is 46.
(Y) The fourth thing required is the specific Part, Section or Regulation that is being amended.
In this example this is SECS.
The ID entry for this example would then be as follows:
ACT-19910046-SEC-8
SOCIAL SECURITY LEGISLATION AMENDMENT ACT (No. 1) 1995 No. 104 of 1995 -
. . . . . . . . . . . . . . . . . . . . . . . .
SCHEDULE 1                                                                                    Section 4<
AMENDMENT OF THE SOCIAL SECURITY (V)ACT (W)1991
(X) [If not available/reproduced in the Amendment text can be obtained from the main ID field in
MASTER TABLE]
RELATING TO<
THE DEFINITION OF INCOME<
1. After Paragraph (Y)8 (8) (zf) :
Insert:<
"(zfa) a payment of financial supplement made to the person
under the Student Financial Supplement Scheme;".<
EXAMPLE 2
This example shows a different style of amendment to Example 1.
The ID entry for this example would be as follows: ACT-19950105-SEC-198
It would be made up of the following:
(Z) Indication of Amending ACT. (This would be Reg if we were dealing with a REGULATION).
(AA) Year of ACT is 1991.
(BB) The third thing required is the ACT or REGULATION Number. In this example this is 46.
(CC) Specific Part, Section or regulation being amended is SEC 198.
SOCIAL SECURITY (NON-BUDGET MEASURES) LEGISLATION AMENDMENT ACT 1995 No. 105
of 1995
(Z) (AA) (BB) [if not available/reproduced in the Amendment text can be obtained from the main ID
field in MASTER TABLE]
$$NSECT
4. Section (CC)198 of the Principal Act is amended by inserting after subsection (IA) :
$$P
<
"(1B) Subject to subsection (1C), if:<
    (a) a person (the 'carer') is personally providing constant care for a severely handicapped person;
and
<
    (b) the handicapped person is temporarily absent from Australia for a period of not more than 3
months; and
<
    (c) the carer accompanies the handicapped person on his or her absence from Australia;<
the carer does not cease to be qualified for a carer pension merely because of that absence from Australia.
$$P
<
    "(1C) If, during a calendar year, the carer has accompanied the handicapped person outside Australia
on more than one occasion, the carer ceases to be qualified for carer pension under subsection (1B) in that
calendar year after he or she has, during that calendar year, qualified for carer pension under that subsection
for periods that together add up to 3 months.".
$$A
[C 05] Date of Commencement Field
This field is for the date an amendment or repeal of a specific Part, Section or regulation
commenced. See also [B 04] for information on commencement.
EXAMPLE
Below is an example of a commencement provision from an amending ACT. Note how various
sections of the amending ACT are allocated a date of commencement. Using the Section identified
in TEXTBLOCK ID1 the date of commencement can be identified and entered in this field.
Thus if the TEXTBLOCK IDI field were ACT-19950105-SEC-8 then the date information required
for this field would be 1 Jul. 1995. See (DD) below.
SOCIAL SECURITY (NON-BUDGET MEASURES) LEGISLATION AMENDMENT ACT 1995 No. 105
of 1995 - SECT 2<
Commencement<
$$T
$$NSECT
    2. (1) Subject to this section, this Act commences on the day on which it receives the Royal Assent.
$$P
<
    (2) Subdivision A of Division 2 of Part 2 is taken to have commenced on 1 Jul. 1993.
$$P
<
    (3) Section 8 and 9 are taken to have commenced on (DD)1 Jul. 1995.
$$P
<
    (4) Section 10 is taken to have commenced on 1 Apr. 1993.
$$P
[C 06] Date of Expiry Field
This field provides for amendments that are enacted for a period of time, for example; during a
special event such as the Olympics.

APPENDIX C-continued

Note: Expiry provisions are rare and should only be added if clearly specified in the data as in the example below.
EXAMPLE
See(EE) below.
OLYMPIC SECURITY (NON-BUDGET MEASURES) LEGISLATION AMENDMENT ACT 1997 No. 109 of 1995
$$NSECT
    4. Section 298 of the Principal Act is amended for the period commencing at midnight on 1 Jul. 1997 and ending on midnight (EE)25 Jul. 1997 by inserting after subsection (2A) :
$$P
<
  "(2B) Subject to subsection (2C) , if:<
  (a) a person (the 'carer') is personality providing constant care for a severely handicapped person; and<
  (b) the handicapped person is temporarily absent from Australia for a period of not more than 3 months; and <
  (c) the carer accompanies the handicapped person on his or her absence from Australia;<
the carer does not cease to be qualified for a carer pension merely because of that absence from Australia.
$$P
<
  "(2C) If, during a calendar year, the carer has accompanied the handicapped person outside Australia on more than one occasion, the carer ceases to be qualified for carer pension under subsection (1B) in that calendar year after he or she has, during that calendar year, qualified for carer pension under that subsection for periods that together add up to 3 months. ".
$$A

APPENDIX D

Keying Guide for Australian
Legislation Documents

General
Validation
All files produced must be parsed against the relevant DTD and each table should be viewed using a suitable Table renderer to make sure that they have been coded correctly.
DTD modifications
No local modifications must be made to the supplied DTD's. If there are any situations in which it is thought that a change to a DTD is required then the requested change and the reasons for it must be submitted to SGMLSE. If a change is deemed necessary, then the DTD will be changed in the UK and resupplied. This is necessary to maintain consistency in the DTD's being used at both ends in the process.
Files
The SGML files that will be supplied have already been partially processed but will be invalid according to the DTD (especially the tables).
Each file should omit the document type declaration and begin directly with the root element.
Carriage return characters
Carriage return characters must not appear in any element which has #PCDATA within its content model. If it is wished to use carriage return characters to shorten line lengths, then they must be placed in position's where they will be ignored by an SGML parser e.g. in places where #PCDATA is not allowed, or within start and end tags in places where separator characters are allowed.
Case
Element and attribute names are case-insensitive. They may be entered in either uppercase, lowercase or a mixture.
Attribute values are usually case-insensitive. The only time that they are case-sensitive is when they have a declared type of CDATA, in which case the string values should be entered directly as they appear in the text.
Markup minimisation
No non-empty elements have omissible start or end tags, but the empty end tag </>can be used to end the currently open element. A carriage return character can not occur within an empty end tag.
DTD structure
There are four DTDs and a common element declaration that are used to define the structure of the legislation.
REGS.DTD
This DTD has the public identifier "-//SGMLSE//DTD 1.0 Regulations//EN"and contains the declaration for the regulations. It has two parameter entity references which include "-//SGMLSE//DTD 1.0 Act//EN" and "-//SGMLSE//DTD 1.0 Regulation//EN".
The file regs.sgm produced by the Perl script regs.p/conforms to regs.dtd and calls in all acts as parameter entities.
ACTS.DTD
This DTD has the public identifier "-//SGMLSE//DTD 1.0 Acts//EN"and contains the declaration for the acts. It has a parameter entity references which includes "-//SGMLSE//DTD 1.0 Act//EN".
The file acts.sgm produced by the Perl script acts.pl conforms to acts.dtd and calls in all acts as parameter entities.
ACT.DTD
This DTD has the public identifier "-//SGMLSE//DTD 1.0 Act//EN"and contains the declaration of an act.

APPENDIX D-continued

Keying Guide for Australian Legislation Documents

REG.DTD
This DTD has the public identifier "-//SGMLSE//DTD 1.0 Regulation//EN"and contains the declaration of a regulation.
COMMON.ELT
This list of elements has the public identifier "-//SGMLSE//ELEMENTS 1.0 Common Elements//EN"and includes element and entity definitions common to all document types.
Character entities
The character entities allowed have been selected from the ISO public sets isogrk1, isogrk3, isolat1, isonum, isopub and isotech.
These characters are translated one-to-one to the equivalent character in the Times New Roman True Type font.
The <quote> or <blockquote> elements should be used instead to surround any quoted text.
Use Quotes (") at the beginning and at the end of these elements.
Labels and identifiers
The major structural elements - act, reg, part, schedule, section, sub, s-sub, ss-sub,
. . .
all have a required label attribute (lbl). Unique identifiers should be generated for these elements.
The label for these elements is the preceding number or letter WITHOUT any punctuation or parentheses. For example:
1979 No. 141 The charge to income tax - REG 1
Income Tax
1. Fred . . .
1. (1) This is . . .
<section type="reg"lbl="1"ID="CWACT-19790141-SEC-1">
<title>Income Tax</>
<list>
<li lbl="1"><p>Fred . . .</>
<list>
<li lbl="1"><p>This is . . .</>
</list>
</li>
</list>
</section>
Convert list and li items back to the original look in Folio Views, ie to
1. Fred . . .
1. (1) This is . . .
Cross references
All cross references point directly to a target by providing the id of the target as the value of an attribute of the xref element. For details of the format of cross reference identifier strings, see the description of the xref element below.
All ID's are marked unchanged as Jump Destinations (JD's).
<SECTION ID="CWACT-19950104-SEC-1" LBL="1">
becomes:
<JD:"="CWACT-19950104-SEC-1">
REGS DTD ELEMENT REGS
This is the root element of the Regulations. Its definition is :
< ! ELEMENT regs - - (title, header?, reg+) >
That is, it contains a required title element, followed by an optional header element followed by 1 or more act element.
Not translated
ACTS DTD ELEMENT ACTS
This is the root element of the Acts. Its definition is
< ! (ELEMENT acts - - (title, header?, act+) >
That is, it contains a required title element, followed by an optional header element followed by 1 or more act element.
Not translated
REG DTD ELEMENTS REG
This is the root element of the dtd for a Regulation. Its definition is:
< ! ELEMENT reg - - (title, notes?, provisions?, (preamble | long-title)?,
( (order+ | (section | schedule)+ | chapter+ | part+) , schedule*) ) >
< ! ATTLIST reg id ID #REQUIRED
    lbl          CDATA       #REQUIRED
    insert-date    NUMBER      #IMPLIED
    insert-leg     IDREF       #IMPLIED
    repeal-date    NUMBER      #IMPLIED
    repeal-leg     IDREF       #IMPLIED
    amend-date     NUMBER      #IMPLIED
    amend-leg      IDREF       #IMPLIED
<
The insert-date attribute should be used to insert the date YYYYMMDD that the REG was inserted.
The insert-leg should be used to insert the ID of the legislation that inserted the REG.

APPENDIX D-continued

Keying Guide for Australian
Legislation Documents

The repeal-date attribute should be used to insert the date YYYYMMDD that the REG was
repealed. The repeal-leg should be used to insert the ID of the legislation that repealed the REG.
The amend-date attribute should be used to insert the date YYYYMMDD that the REG was
amended. The amend-leg should be used to insert the ID of the legislation that amended the
REG.
The title gets marked up as Level "Heading Level 1". The period between the insert-date and the
repeal-date or amend-date (that is the period during which the above element was in force) gets
marked up as follows:
The Folio Views markup used is Groups. See the manual for explanations. We will use three
kinds of groups: Inforce-yyyy, Inforce-yyyy-mm and Inforce-yyyy-mm-dd (yyyy can be any year,
mm can be any month from 1-12 and dd can be any day from 1-31). If the element was valid
throughout a year yyyy, the element becomes a member of the Inforce-yyyy group. If the element
was valid only for some months within a year, it becomes a member of the relevant Inforce-yyyy-
mm groups. If the element was only valid for some days within a month, the element becomes a
member of the relevant Inforce-yyyy-mm-dd groups. Example:
If the element was valid from 1/7/94 to 7/4/96, then the element belongs to the following groups:
Inforce-94-07, Inforce- 94-08, Inforce-94-09, Inforce-94-10, Inforce-94-11, Inforce-94-12, Inforce-
95, Inforce-96-01, Inforce-96-02, Inforce-96-03, Inforce-96-04-01, Inforce-96-04-02, Inforce-96-04-
03, Inforce-96-04-04, Inforce-96-04-05, Inforce-96-04-06 and Inforce-96-04-07.
Note that the element is not part of the Inforce-94 group because the element wasn't in force
throughout of 1994. Nor is the element part of the Inforce-96-04 group because the element
wasn't in force throughout April 1996.
If the enduser wants to search for all elements that are valid as of a particular date then the
enduser can enter that date in a Query Template in the form DD/MM/YYYY. The Query Template
then searches the Folio Views infobase for all elements that belong to the groups Inforce-yyyy,
Inforce-yyyy-mm and Inforce-yyyy-mm-dd.
ACT DTD ELEMENTS ACT
This is the root element of the dtd for an Act. Its definition is :
< ! ELEMENT act - - (title, notes?, provisions?, (preamble | long-title)?, (section+ | chapter+ |part+ |
sub+)*, schedule*)>
<!ATTLIST act id ID #REQUIRED
    date CDATA #IMPLIED
    insert-date    NUMBER    #IMPLIED
    insert-leg    IDREF    #IMPLIED
    repeal-date    NUMBER    #IMPLIED
    repeal-leg    IDREF    #IMPLIED
    amend-date    NUMBER    #IMPLIED
    amend-leg    IDREF    #IMPLIED
<
That is, it contains a required title element, followed by optional notes, provisions, and preamble and
either one or more reg, order, rule, section, chapter or part elements. It has a required id attribute
and implied date attribute
The insert-date attribute should be used to insert the date YYYYMMDD that the ACT was inserted.
The insert-leg should be used to insert the ID of the legislation that inserted the ACT.
The repeal-date attribute should be used to insert the date YYYYMMDD that the ACT was repealed.
The repeal-leg should be used to insert the ID of the legislation that repealed the ACT.
The amend-date attribute should be used to insert the date YYYYMMDD that the ACT was amended.
The amend-leg should be used to insert the ID of the legislation that amended the ACT.
Examples
1979 No. 141 The charge to income tax
<act 1b1="141" ID="CWACT-19790141-TXT-0">
<title>1979 No. 141 The charge to income tax</>
1979 No. 141 The charge to income tax*1*
<act 1b1="141" ID="CWACT-19790141-TXT-0">
<title>1979 No. 141 The charge to income tax<noteref
ref= "CWACT- 19790141-note-1"></>
The noteref gets marked up as a popup link. The text of the note becomes the text within the popup link.
Treated the same as Reg DTD Elements. See there for details.
COMMON ELEMENTS PART
< ! ELEMENT part - - (title, (%plevel;)*,
(chapter+ | division+ | section+)*, notes?)
< ! ATTLIST part id ID #REQUIRED
    1b1    CDATA    #IMPLIED
    insert-date    NUMBER    #IMPLIED
    insert-leg    IDREF    #IMPLIED
    repeal-date    NUMBER    #IMPLIED
    repeal-leg    IDREF    #IMPLIED
    amend-date    NUMBER    #IMPLIED
    amend-leg    IDREF    #IMPLIED
>
The insert-date attribute should be used to insert the date YYYYMMDD that the PART was
inserted. The insert-leg should be used to insert the ID of the legislation that inserted the PART.
The repeal-date attribute should be used to insert the date YYYYMMDD that the PART was APPENDIX D-continued Keying Guide for Australian
Legislation Documents repealed. The repeal-leg should be used to insert the ID of the legislation that repealed the PART.
The amend-date attribute should be used to insert the date YYYYMMDD that the PART was
amended. The amend-leg should be used to insert the ID of the legislation that amended the
PART.
Example
<PART lbl="l" ID="CWACT-19790141-PT-1">
<title></title>
<p>
The title gets' marked up as Level "Heading Level 2". Dates get treated the same way as in Regs
DTD) Elements. See there for details.
ORDER
<(ELEMENT order - - (title,
(division | section | part | schedule) +) >
<!ATTLIST order id ID #REQUIRED
    lbl CDATA #/IMPLIED

| | | |
|---|---|---|
| insert-date | NUMBER | #IMPLIED |
| insert-leg | IDREF | #IMPLIED |
| repeal-date | NUMBER | #IMPLIED |
| repeal-leg | IDREF | #IMPLIED |
| amend-date | NUMBER | #IMPLIED |
| amend-leg | IDREF | #IMPLIED |

>
The insert-date attribute should be used to insert the date YYYYMMDD that the ORDER was
inserted. The insert-leg should be used to insert the ID of the legislation that inserted the ORDER.
The repeal-date attribute should be used to insert the date YYYYMMDD that the ORDER was
repealed. The repeal-leg should be used to insert the ID of the legislation that repealed the
ORDER.
The amend-date attribute should be used to insert the date YYYYMMDD that the ORDER was
amended. The amend-leg-should be used to insert the ID of the legislation that amended the
ORDER.
Example
1979 No. 140 FEDERAL COURT RULES - ORDER 3<
        ORDER 3<
        TIME<
$$T
$$A
$$T
1979 No. 140 FEDERAL COURT RULES - RULE 1<
<ORDER lbl="3" ID="CWACT-19790140-ORD-3">
<title>TIME</title>
<section type="rule"lbl="1"ID="CWACT-19790140-ORD-3.1">
The title gets marked up as Level "Heading Level 2". Dates get treated the same way as in Regs
DTD Elements. See there for details.
DIVISION
<(ELEMENT division - - (title, (sub-division+ | section+))
>
<(ATTLIST division id ID #/REQUIRED
    lbl CDATA #IMPLIED

| | | |
|---|---|---|
| insert-date | NUMBER | #IMPLIED |
| insert-leg | IDREF | #IMPLIED |
| repeal-date | NUMBER | #IMPLIED |
| repeal-leg | IDREF | #IMPLIED |
| amend-date | NUMBER | #IMPLIED |
| amend-leg | IDREF | #IMPLIED |

>
The insert-date attribute should be used to insert the date YYYYMMDD that the DIVISION was
inserted. The insert-leg should be used to insert the ID of the legislation that inserted the
DIVISION.
The repeal-date attribute should be used to insert the date YYYYMMDD that the DIVISION was
repealed. The repeal-leg should be used to insert the ID of the legislation that repealed the
DIVISION.
The amend-date attribute should be used to insert the date YYYYMMDD that the DIVISION was
amended. The amend-leg should be used to insert the ID of the legislation that amended the
DIVISION.
Example
1979 No. 140 FEDERAL COURT RULES - DIVISION 1<
    Division 1-General<
$$T
$$A
$$T
1979 No. 140 FEDERAL COURT RULES - RULE 1<
Cases for service of originating process<
<DIVISION lbl="l"ID="CWACT-I 9790140-D1V-i>
<title>General</title>
<RULE lbl="1" ID="CWACT-I 9790140-DIV-1.1">
<title>Cases for service of originating process </title>
The title gets marked up as Level "Heading Level 3". Dates get treated the same way as in Regs APPENDIX D-continued Keying Guide for Australian Legislation Documents DTD Elements. See there for details.
SUB-DIVISION
```
<!ELEMENT    sub-division - - (title, section+) >
<!ATTLIST    sub-division id ID #REQUIRED
      lbl CDATA #IMPLIED
      insert-date    NUMBER      #IMPLIED
      insert-leg     IDREF       #IMPLIED
      repeal date    NUMBER      #IMPLIED
      repeal-leg     IDREF       #IMPLIED
      amend-date     NUMBER      #IMPLIED
      amend-leg      IDREF       #IMPLIED
>
```
The insert-date attribute should be used to insert the date YYYYMMDD that the SUB-DIVISION was inserted. The insert-leg should be used to insert the ID of the legislation that inserted the SUB-DIVISION.
The repeal-date attribute should be used to insert the date YYYYMMDD that the SUB-DIVISION was repealed. The repeal-leg should be used to insert the ID of the legislation that repealed the SUB-DIVISION.
The amend-date attribute should be used to insert the date YYYYMMDD that the SUB-DIVISION was amended. The amend-leg should be used to insert the ID of the legislation that amended the SUB-DIVISION.
The title gets marked up with a Paragraph Style (see Folio Views Infobase Production Kit Manual for details) 'Subdivision'. Dates get treated the same way as in Regs DTD Elements. See there for details.
PROVISIONS
```
<!ELEMENT       provisions    - -    (title, tblblk) >
Example
$$NTABLE
                 TABLE OF PROVISIONS<
$$P
Order<
$$P
   1.   Preliminary<
$$P
   2.   Sittings and Vacation<
<PROVISIONS>
<TITLE>TABLE OF PROVISIONS>
<TBLBLK>
. .
</TBLBLK>
</PROVISIONS>
```
Provisions get ignored. The Table of Provisions gets generated by the conversion program from the following Elements: Part, Chapter, Order, Division, Subdivision and Section. The generated Table of Provisions is stored just before the first Part, Chapter, Order, Division, Subdivision and Section.
CHAPTER
```
<!ELEMENT   chapter    - -   (title, %plevel;)*,
(part+ | section+ | article+)?)>
<!ATTLIST chapter       id ID          #REQUIRED
                        lbl CDATA      #/IMPLIED
      insert-date    NUMBER      #IMPLIED
      insert-leg     IDREF       #IMPLIED
      repeal-date    NUMBER      #IMPLIED
      repeal-leg     IDREF       #IMPLIED
      amend-date     NUMBER      #IMPLIED
      amend-leg      IDREF       #IMPLIED
>
```
The insert-date attribute should be used to insert the date YYYYMMDD that the CHAPTER was inserted. The insert-leg should be used to insert the ID of the legislation that inserted the CHAPTER
The repeal-date attribute should be used to insert the date YYYYMMDD that the CHAPTER was repealed. The repeal-leg should be used to insert the ID of the legislation that repealed the CHAPTER.
The amend-date attribute should be used to insert the date YYYYMMDD that the CHAPTER was amended. The amend-leg should be used to insert the ID of the legislation that amended the CHAPTER.
The title gets marked up as Level "Heading Level 2". Dates get treated the same way as in Regs DTD Elements. See there for details.
SECTION
This is a sub element of a Regulation. Its definition is:
```
<!ELEMENT   section       - -     (title, (%unstruct-cont;))>
<!ATTLIST section         id      ID #REQUIRED
      lbl CDATA      #/IMPLIED
      insert-date    NUMBER      #IMPLIED
      insert-leg     IDREF       #IMPLIED
      repeal-date    NUMBER      #IMPLIED
      repeal-leg     IDREF       #IMPLIED
      amend-date R   NUMBE       #IMPLIED
```

APPENDIX D-continued

Keying Guide for Australian Legislation Documents

```
        amend-leg       IDREF           #IMPLIED
>
```
That is, it contains a required title element, followed by unstructured content. It has a required lbl attribute and a required id attribute.

The insert-date attribute should be used to insert the date YYYYMMDD that the SECTION was inserted. The insert-leg should be used to insert the ID of the legislation that inserted the SECTION.

The repeal-date attribute should be used to insert the date YYYYMMDD that the SECTION was repealed. The repeal-leg should be used to insert the ID of the legislation that repealed the SECTION.

The amend-date attribute should be used to insert the date YYYYMMDD that the SECTION was amended. The amend-leg should be used to insert the ID of the legislation that amended the SECTION.

Examples

1979 No. 141 The charge to income tax - SECT. 1

Income Tax

1979 No. 141 The charge to income tax - REG 2

Tax

3. Income tax shall be charged. ..

```
<section lbl="" "1" "id="" "CWACT-1979141-SEC-1" "">
<title>Income tax</title>
<section type =" "reg" "lbl =" "2" "id =CWACT1979141-SEC-
1.2" "><title>Tax</title>
<p>Income tax shall be charged.. .</>
```

The title gets marked up as Level "Heading Level 4". Dates gets treated the same way as in Regs DTD Elements. See there for details.

SCHEDULE

This is a sub element of a Regulation. Its definition is:

```
<!(ELEMENT schedule - -        (title?,    (%-unstruct-cont;))>
<!ATTLIST schedule id ID              #/REQUIRED
        lbl   CDATA  #IMPLIED
        insert-date    NUMBER       #IMPLIED
        insert-leg     IDREF        #IMPLIED
        repeal-date    NUMBER       #IMPLIED
        repeal-leg     IDREF        #IMPLIED
        amend-date     NUMBER       #IMPLIED
        amend-leg      IDREF        #IMPLIED
>
```

That is, it contains a required title element, followed by unstructured content. It has a required lbl attribute and a required id attribute.

The insert-date attribute should be used to insert the date YYYYMMDD that the SCHEDULE was inserted. The insert-leg should be used to insert the ID of the legislation that inserted the SCHEDULE.

The repeal-date attribute should be used to insert the date YYYYMMDD that the SCHEDULE was repealed. The repeal-leg should be used to insert the ID of the legislation that repealed the SCHEDULE.

The amend-date attribute should be used to insert the date YYYYMMDD that the SCHEDULE was amended. The amend-leg should be used to insert the ID of the legislation that amended the SCHEDULE.

Examples

1979 No. 141 The charge to income tax - SCHEDULE 1

Income Tax

1. Income tax shall be charged . . .

```
<schedule lbl ="1" id="CWACT-1979141-SCH-1">
<title>Income tax</title>
<p>Income tax shall be charged . . . </>.
```

The title gets marked up as Level "Heading Level 2". Dates get treated the same way as in Regs DTD Elements. See there for details.

FORM

```
<!ELEMENT       form  - -       (title, formreg, front, back?) >
<!ATTLIST form          %reqlbl;
                        %reqid;>
```

Each form has a title, regulation, a front and an optional back. Each has a required lbl attribute and a required ID.

Example

FORM A<
    Regulation 7<
   (Front of Form)<
  COMMONWEALTH OF AUSTRALIA<
Trade Practices Act 1974-Sub-section 88 (1)<
  EXCLUSIONARY PROVISIONS:<
  APPLICATION FOR AUTHORIZATION<

To the Trade Practices Commission: Application is hereby made under sub-section 88 (1) of the Trade (Back of Form)<

APPENDIX D-continued

Keying Guide for Australian
Legislation Documents

DIRECTIONS<
1. Where there is insufficient space on this form to furnish the required information, the information is to be shown on separate sheets, numbered consecutively and signed by or on behalf of the applicant.
<FORM lbl="a" ID="CWACT-19790141-FORM-A">
<FORMREG>Regulation 7</FORMREG>
<FRONT>
<AS IS>
COMMONWEALTH OF AUSTRALIA<
   Trade Practices Act 1974-Sub-section 88 (1)<
     EXCLUSIONARY PROVISIONS:<
     APPLICATION FOR AUTHORIZATION<
To the Trade Practices Commission: Application is hereby made under sub-section 88 (1) of the Trade
</ASIS>
</FRONT>
<BACK>
<ASIS>
DIRECTIONS<
1. Where there is insufficient space on this form to furnish the required information, the information is to be shown on separate sheets, numbered consecutively and signed by or on behalf of the applicant.
</ASIS>
</BACK>
</FORM>
Forms get marked up with a Paragraph Style 'Forms'. The markup of "Front" and "Back" gets inserted as hidden text (hidden text is visible on the screen but doesn't show when the Form gets printed.

FORM ELEMENTS

FORMREG
<!ELEMENT    formreg  - -     (#PCDATA) >
see above example
FRONT
<!ELEMENT    front  - -     (asis) >
see above example
BACK
<!ELEMENT    back  - -     (asis) >
see above example
ASIS
<!ELEMENT    asis  - -     (#PCDATA) >
date is displayed as-is
see above example

HEADER ELEMENTS

HEADER
<!ELEMENT    header  - -     (scope?, updated?) >
SCOPE
<!ELEMENT    scope  - -     (%text;)  >
UPDATED
<!ELEMENT    updated  - -     (%text;)  >

NOTE ELEMENTS

NOTES
<!ELEMENT    notes -     O (note+) >
List of notes at the start of an act
NOTE
<!ELEMENT    note  - -     (%/plevel;) >
<!ATTLIST    note id  ID     #REQUIRED >
A single note
Forms get marked up with a Paragraph Style 'Forms'. The markup of 'Front' and 'Back' gets inserted as hidden text (hidden text is visible on the screen but doesn't show when the Form gets printed.

STRUCTURAL ELEMENTS

TITLE
A generic title, which may occur in several different contexts.
Covered in Acts DTD Elements, Regs DTD Elements and so on.

INLINE ELEMENTS

BOLD
Used to mark any inline text which is set in a bold face other than a title or a label. It may contain text or any inline elements other than <bold>.
It has no attributes.
ILEQN
An inline equation. This is a mathematical equation which is embedded in a line of text characters or other inline elements. See the attached description of equations for further details.

APPENDIX D-continued

Keying Guide for Australian
Legislation Documents

ITAL
Used to mark any inline text which is set in a italic face other than a title or a label. It may contain
text or any inline elements other than <italic>.
It has no attributes.
QUOTE
A sequence of text characters or inline elements surrounded by single or double paired quotation
marks. The quotation mark characters must not be entered as text characters or entity references
as they will be generated automatically.
SUBSCR
A Subscript (inferior).
SUPER
A superscript (superior).
Brought over from SGML to Folio Views with no changes.
CROSS REFERENCES NOTEREF
A reference to a NOTE element normally used in a TITLE element
Implemented as a popup link.
TEMPREF
A reference to a piece of legislation where the ID is not known. The tempref element will
converted to an XREF element at a later date (when the ID is known).
Not converted.
RNGREF
A cross reference to a sequential range of targets, e.g. see Sections 3 to 7.
It has two required attributes, startref and endref. Startref is the id of the first of the targets
referenced and endref is the id of the last target referenced. For a description of id strings, see the
description of the xref element.
Converted as a Query Link.
XREF
A cross reference to a single target. It has a single attribute, ref, which must contain the id string
of the target of the reference. Ids are not being entered on elements during keying, but will be
generated automatically from the lbl attribute of elements.
However, for xrefs it is necessary to work out what the id string of the target will be.
The format of id strings is described below:
Converted as a jumplink.
ID Strings
Cross references to sections of Acts and Act Schedules should be marked up using the xref
element as described above.
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
Id strings are made up of four sequential fields separated by a "-" (dash) character
as follows
field1-field2-field3-field4
field 1 is the type of document which is being referenced. The current valid value is ACT.
field2 is an abbreviated form of the year and number of the Act, e.g. 19880001 is 1988 No. 1.
field3 identifies the type of object being referenced. Valid values are:
ORD    order
DIV     division
SCH    schedule in an Act
SEC     section in an Act
CH      chapter in an Act
PT      part in an Act
NOTEa note
field4 is the identifier of the element being referenced, which is formed by concatenating the
values of the lbl attributes of the referenced element and its ancestor elements, separated by a"."
(point) character. e.g. 1 or 1.1 or 1.1.a or 1.1.a.iv
Examples
<section lbl="1">   <!-- id is ACT-19790141-SEC-1-->
<title>The charge to income tax.</>
<list>
<li lbl="1">
<p>Income tax shall be charged. . .</>
Implemented us jumpdestination.
BLOCK LEVEL ELEMENTS DPEQN
A display equation. This is a mathematical equation which is set on one or more lines by itself.
See the attached description of equations for further details.
It has no attributes.
It has no attributes.
LIST
A list of related lines of text which are not sub, s-sub or ss-sub elements.
LI
An item in a list. This is a single line of text within a list.
It has a single attribute, marker, which has allowed values of bullet, dash or none, with a default of
none. If a marker character precedes the list item then the relevant value should be entered for
the attribute. The marker character should not be entered as text. If any marker character other
than a bullet or dash is found, contact SGMLSE for a change to the DTD.

APPENDIX D-continued

Keying Guide for Australian
Legislation Documents

P
A single line of text.
BLOCKQUOTE
A non-inline quote. The quotation mark characters must not be entered as text characters or entity references as they will be generated automatically
TBLBLK
A container element for a table which has a title. It contains a required title element followed by a single table.
It has no attributes.
The above elements get implemented either without conversion or using paragraph styles.
TABLE ELEMENTS General
Arbortext tables expressed in tagged ASCII form must follow this basic structure:
<table>
<rowrule>
for each row
{
    <tablerow>
    <cell rule>
    for each column
    {
    <tablecell>text</tablecell>
    <cellrule>
    }
    </tablerow>
    <rowrule>
}
</table>
TABLE
The <table> tag has three required attributes. They must be specified correctly or the table will not be handled properly.
ncols=NUMBER The number of columns in the table. This value MUST agree with the number of columns expressed by the required cwl attribute.
Wdm=(25|50|75|100) The numbers indicate the width of the table as a percentage of the page width.
cwl=LIST   where LIST is a list of integers each separated by a colon. Each integer represents the relative width of a column.
Example
A four column table which is the full width of the page. The second and third columns are twice the width of the first column, and the fourth column is three times the width of the first:
<table ncols="4" wdm="100"cwl="1:2:2:3">
or, equivalently,
<table ncols="4" wdm="100" cwl="5:10:10:15">
CELLRULE
Empty element. Specifies a vertical rule. It has a single attribute, rty, which specifies the type of rule. Valid values for rty are:

| | |
|---|---|
| "." | (point)for a blank rule, |
| "-" | (dash)for a single rule, |
| "=" | (equals) for a double rule, |
| "+" | (plus) for a bold rule. |

Example
<cellrule rty=".">
for a blank rule, or
<cellrule rty="-">
for a single rule.
ROWRULE
Empty element. Specifies a sequence of horizontal rules, one per cell in the row. It has a single attribute, rtl, which is a colon-delimited list of rule type specifiers. There must be one rule type specifier for each cell in the row. The valid specifiers are as for cellrule above.
Example
For a four-column table
<rowrule rtl="-:.:.:-">
would draw a horizontal rule above cells one and four.
TABLEROW
Specifies a row in the table. It has a single attribute, hdr, which specifies whether or not the row is a header row in a table which will be repeated over page breaks. The only valid value is ""1""(one), which indicates that the row is a header row. An omitted value for hdr indicates that the row is not a header row. A value is only valid on the first <tablerow>in the table.
Example
<tablerow hdr="1">
indicates that the row is a header row (iff the <tablerow>is the first in the table, else it will generate an error).
<tablerow>
indicates that the row is not a header row if the <tablerow>is the first in the table.
TABLECELL
Indicates a cell in a row in a table. It has four optional attributes:

APPENDIX D-continued

Keying Guide for Australian
Legislation Documents chj= (b|1|r|c) Horizontal justification for that cell.
b         for both right and left justified,
1         for flush left,
r         for flush right,
c         for centred.
Default: left justified
cvj =(t|c|b)    Vertical justification for that cell.
t         for top justified,
c         for centred, or
b         for bottom justified.
Default: top justified
spn= INTEGER    For horizontally spanned columns. VAL is a whole number representing how many columns are spanned. Note that for horizontal spans, the text appears in the LEFTMOST cell in the span, and all other cells in the span should be void of text.
Default: I
vspn=INTEGER    For vertically spanned rows. VAL is a whole number representing how many rows are spanned. Note that for vertical spans, the text appears in the LOWEST cell in the span, and all other cells in the span should be void of text.
Default: 1
Arbortext table example

```
-----------------------------------------------------------------
|foo       |    fum      |                          |
|          |             |    fee                   |
-----------------------------------------------------------------
|          spanned       |    ugh                   |
|                        |                          |
-----------------------------------------------------------------
```

<tbl>
<table wdm="100"cwl="3:4:3">
<rowrule rtl="-:-:-">
<tablerow hdr="1">
<cellrule rty="-">
<tablecell>foo</tablecell>
<cellrule rty="-">
<tablecell chj="c">fum</tablecell>
<cellrule rty="-">
<tablecell chj="r"cvj="b">fee</tablecell>
<cellrule rty"-">
</tablerow>
<rowrule rtl"-:-:-">
<tablerow>
<cellrule rty="-">
<tablecell spn="2"chj="c">spanned</tablecell>
<cellrule rty="-">
<tablecell chj="c">ugh</tablecell>
<cellrule rty="-">
</tablerow>
<rowrule rtl="-:-:-">
</table>
</tbl>
Tables get converted to Microsoft Word tables and then converted into Folio Views.
EQUATION ELEMENTS General
This maths DTD is a subset of the Arbortext maths DTD, which itself is derived from the AAP maths DTD.
In maths mode, all spaces are ignored (except in a <phr>element as described below). Correct spacing is handled automatically.
All alphabetical characters and symbols are treated as variables and set in italic face, unless they occur within <phr>, <rm>or <rf>elements.
All numeric characters and operators are set in roman face, unless they occur within an <it> element.
Greek symbols should be entered using the <g>element rather than entity references. E.g. <g>a</g>produces alpha, <g>b</g>beta, etc. Any entity references for Greek characters which appear in equations will be flagged as errors by the parsing program.
B
Bold text in an equation.
DE
Denominator of a fraction.
F
Inline equation.
FD
Display equation.
FEN
Fence. A pair of bracketed delimiters. The attribute Ip (left post) defines the type of the left delimiter as below, and the following element rp (right post) defines the type of the right delimiter.
<!ATTLIST fen lp (par|sqb|cub|ang|vb) vb         --

APPENDIX D-continued

Keying Guide for Australian
Legislation Documents par  left parenthesis  (
  sqb  left square bracket [
  cub  left curly brace  {
  ang  left angle bracket  <
  vb  left vertical bar  |
-->
FR
Fraction.
G
Greek character or characters. Valid characters are:
  char  equivalent entity
  a  alpha
  b  beta
  c  chi
  d  delta
  D  Delta
  e  epsilon
  3  epsiv
  4  phiv
  f  phis
  F  Phi
  g  gamma
  G  Gamma
  h  eta
  i  iota
  j  thetav
  k  kappa
  l  lambda
  L  Lambda
  m  mu
  n  nu
  p  pi
  2  piv
  P  Pi
  q  thetas
  Q  Theta
  r  rho
  s  sigma
  S  Sigma
  9  rhov
  t  tau
  u  upsilon
  U  Upsilon
  v  sigmav
  w  omega
  W  Omega
  x  xi
  X  Xi
  y  psi
  Y  Psi
  z  zeta
INF
Inferior. Subscript in an equation.
IT
Italic text in an equation.
NU
Numerator of a fraction.
OVL
Overline.
PHR
Phrase. In a phrase all characters are set in roman face and keyed space characters are
preserved. A phrase is essentially a temporary escape out of maths mode back into normal text
mode.
RAD
Radical or root. Contains a radicand (<rcd>), which is the constructs which appear beneath the
top horizontal bar, and an optional radix (rdx), which is the power of the root (e.g. square, cube, 4,
etc.).
RCD
Radicand. The content of a root construct.
RDX
Radix. The power of a root.
RF
Roman Function. A function name set in roman face, such as log, sin, cos, lim, arg, etc. It differs
from the <rm> element in that preceding and following space characters are generated to separate
it from surrounding characters.
RM
Roman face. Used to force an alpha character to be displayed in normal face rather than be

APPENDIX D-continued

Keying Guide for Australian Legislation Documents treated as a variable and displayed in italic face.
RP
Right delimiter of a fence. It has a single attribute, post, which defines the type of the delimiter.
Valid values are the same as for the Ip attribute of the <fen> element, except that they specify the
right hand match for the relevant left post.
SUP
Superior. A superscript in an equation.
UNL
Underline.
Arbortext equation examples
. . . by multiplying by the fraction -
    A
    B
where -
<p>. . . by multiplying by the fraction -</>
<dpeqn><fr><nu><rm>A</ ></ ><de><rm>B</ ></ ></></>
<p>where -</p>
. . . by the formula -
  gross taxable income
    net assets
<p>. . . by the formula -</>
<dpeqn><fr><nu><phr>gross taxable income</></><de><phr>net
assets</ ></ ></ ></>
Equations get converted to Microsoft Word equations and then converted into Folio Views.
Alternatively equations get converted to images and added to Folio Views as images.

APPENDIX E

```
<!SGML      "ISO 8879:1986"
--
     ArborText's default SGML declaration, modified to allow longer id/idrefs, and to
use a number of special characters within them.
--
CHARSET
BASESET "ISO 646-1983//CHARSET
International Reference Version (IRV)//ESC 2/5 4/0"
DESCSET
                                    0         9        UNUSED
                                    9         2        9
    11        2 UNUSED
    13        1 13
    14        18 UNUSED
    32        95 32
    127       1 UNUSED
    128       128 "High-order characters"
CAPACITY SGMLREF
    TOTALCAP              200000
    ENTCAP                          35000
    ENTCHCAP              35000
    ELEMCAP               35000
    GRPCAP                          150000
    EXGRPCAP              35000
    EXNMCAP               35000
    ATTCAP                          50000
    ATTCFICAP             35000
    AVGRPCAP              35000
    NOTCAP                          35000
    NOTCHCAP              35000
    IDCAP                           35000
    IDREFCAP              35000
    MAPCAP                          35000
    LKSETCAP              35000
    LKNMCAP               35000
SCOPE           DOCUMENT
SYNTAX
    SHUNCHAR 0 1 2 3 4 5 6 7 8 9 10 11 12 13 14 15 16 17
             18 19 20 21 22 23 24 25 26 27 28 29 30 31 127
BASESET "ISO 646-1983//CHARSET
    International Reference Version (IRV)//ESC 2/5 4/0""
DESCSET 0       128       0
    128         128       "High-order characters"
FUNCTION RE               13
    RS          10
    SPACE                 32
```

APPENDIX E-continued

```
    TAB SEPCHAR                     9
NAMING LCNMSTRT " "
    UCNMSTRT " "
    LCNMCHAR "-./[ ]"
    UCNMCHAR "-./[ ]"
    NAMECASE GENERAL YES
            ENTITY NO
DELIM      GENERAL SGMLREF
    SHORTREF SGMLREF
NAMES                 SGMLREF
QUANTITY SGMLREF
    ATTCNT           100
    ATTSPLEN    960
    BSEQLEN          960
    DTAGLEN          16
    DTEMPLEN    16
    ENTLVL           16
    GRPCNT           100
    GRPGTCNT    96
    GRPLVL           16
    LITLEN                800
    NAMELEN          64
    NORMSEP          2
    PILEN            1024
    TAGLEN           960
    TAGLVL           24
FEATURES
MINIMIZE DATATAG NO          OMITTAG  YES  RANK  NO SHORTTAG
YES
LINK SIMPLE NO IMPLICIT NO         EXPLICIT NO
OTHER   CONCUR NO                  SUBDOC NO         FORMAL YES
APPINFO NONE>
<!DOCTYPE legislation
[
<!----
    DTD for Scantext/Abha Legislation - (C) Turn-Key Systems 1997
                    History:
                        1997-10-13: fix hist at beginning of regs
                        1997-10-07: restore <target> tag
                        1997-10-02: enhanced support for regulations (hist, unconv etc)
-->
<!-- useful characters such as — -->
<!ENTITY % ISOpub public ""ISO 8879-1986//ENTITIES Publishing//EN"">
%ISOpub;
<!-- PARAMETER ENTITIES USED TO SIMPLIFY DTD MARKUP -->
<!entity % major
"schedule|intcon|article|annex|clause|chapter|part|division|subdivn|section|subs ec|reg|subreg"
    -- major levels -->
<!entity % minor "defn|para|subpar1|subpar2|subpar3|subpar4|point"
    -- minor levels -->
<!entity % secreg "section | reg"
    -- used where either sections or regs are appropriate -->
<!entity % level "%major; | %minor;"
    -- all levels -->
<entity % refs "term | l.ref | h.ref"
    -- references which can be found in normal text -->
<!entity % raw "(rawtext | rawtable | unconverted)*"
    -- material such as forms which remains as raw text -->
<!entity % effect "sc"
    -- typographical effects (more to be added later) -->
<!entity % text "(%refs; | %effect; | #PCDATA)*"
    -- normal text (including refs defined above) -->
<!entity % hnote "hist | note"
    -- hist and note are temporarily interchangeable -->
<!entity % body "(p+ | repealed), (%hnote;)*"
    -- body of a legislative element -->
<!entity % lev.id "((label, desc?) | (desc, label?))"
    -- reversible level id -->
<!-- MASTER ELEMENT -->
<!element legislation - - (act | regulations)+
    -- Acts and Regs are currently supported -->
<!-- DEFINITIONS OF ACTS AND CONSTITUENT ELEMENTS -->
<!element act            - - (desc, (%hnote; | %raw;)*,
    longtitle, preamble?,
    (chapter+ | part+ | section+),
    Schedule*, hist*)>
<!element longtitle - - (#PCDATA)>
<!element preamble - - (p+) +(para)>
<!element regulations - - (desc, (%hnote; | %raw;)*,
    (chapter+ | part+ | reg+),
```

APPENDIX E-continued

```
    schedule*, hist*)>
<!-- MAJOR LEVELS -->
<!element chapter - - (label, desc, (%hnote;)*,
    (((%secreg;)*, part*) | article+))>
<!element part - - (label?, desc, hist*,
    (((%secreg;)*, division*) | (article+ | clause+)))>
<!element division - - (label?, desc, (p | %hnote;)*,
    (((%secreg;)*, subdivn*) | clause+))>
<!element subdivn - - (label?, desc, (%hnote;)*,
    ((%secreg;)+ | clause+))>
<!element section - - (%lev.id;,
    ((subsec +, (modules | module +)? | repealed))>
<!element subsec - - (%lev.id;,
    ((p, (p | note)*, hist*) | (repealed, note*, hist*)))>
<!element modules - - (%lev.id;,
    module+)>
<!element module - - (%lev.id;,
    (submod + | repealed))>
<!element submod - - (%lev.id;,
    ((p, (p | %hnote; | method | tabloid)*) | (repealed, (%hnote;)*)))>
<!element reg - - (label?, desc, hist?,
    (subreg + | repealed))>
<!element subreg - - (label, desc?, hist'?,
    ((p, (p | note)*, hist*) | (repealed, note*, hist*)))>
<!-- SCHEDULES, CONVENTIONS etc -->
<!element schedule - - (label?, desc?, hist*,
    (chapter+ | part+ | section+ item+ | p+1 |tabloid+ | intcon)?,
    %raw;)>
<!element intcon - - (desc, preamble,
    (part+| division+ | subdivn+ | article+), annex*)>
<!element annex - - (label?, desc, p*,
    (part* | division* | clause* | para*,
<!element article - - (label, desc?) para*))>
    (division* 1 clause* 1 para*))>
<!element clause - - (((label, desc?) | (desc, label)), p+)>
<!element item - - (label?, desc?, %body;)>
<!-- DEFINITIONS AND MINOR LEVELS -->
<!element defn - - (%body;)>
<!element note - - (label?, p+)>
<!element hist - - (label?, (p+ | raw;))
<!element point - - (p+)>
<!element para - - (label?, %body;)>
<!element subpar1 - - (label?, %body;)>
<!element subpar2 - - (label?, %body;)>
<!element subpar3 - - (label?, %body;)>
<!element subpar4 - - (label?, %body;)>
<!element method - - (%lev.id;, (p | %hnote; | step)+)>
<!element step - - (label, %body;)>
<!-- COMMON CONSTITUENT ELEMENTS -->
<!element label - - (%text;)
    -- chapter number, section number, etc. -->
<!element desc - - (%text;)
    -- chapter name, section name, etc. -->
<!element term - - (%text;)
    -- defined term -->
<!element repealed - o EMPTY
    -- indicates that the enclosing level has been repealed -->
<!element p - - (%minor | refs; | %effect | tabloid | amend | target | #PCDATA)*
    -- textual paragraph at any level -->
<!-- UNCONVERTED MATERIAL -->
<!element unconverted - - CDATA
    -- yet to be converted (eg. complex schedules) -->
<!element rawtext - - CDATA
    -- unconverted text (eg. forms) -->
<!element rawtable - - CDATA
    -- unconverted tables (eg. amended provisions) -->
<!-- CROSS-REFERENCES -->
<!element l.ref - - (%text;) -- legislation ref -->
<!element h.ref - - (%text;) -- history ref -->
<!-- AMENDMENT MARKUP-->
<!element amend - - (%refs | %effect | quote | #PCDATA)*
    -- amendment = action + text -->
<!element target - - (#PCDATA)
-- target of amendment -->
<!element quote - - (label | desc | p | %level | %refs | %effect | #PCDATA)*
    --    quoted material -->
<!-- PSEUDO-TABLES -->
<!element tabloid - - (label?, desc?, (head | row)+)>
<!element head - - (cell+)>
<!element row - - (cell+)>
```

APPENDIX E-continued

```
<!element cell - - (#PCDATA|p)*>
<!-- EFFECTS -->
<!element sc -- (#PCDATA) -- small caps -->
<!-- ATTRIBUTE LISTS -->
<!attlist act juris (cth | nsw | vic | qld | sa | wa | tas | act | nt |limp)
                          #REQUIRED -- jurisdiction --
            year        CDATA        #REQUIRED -- year assented --
            number      CDATA        #REQUIRED -- act number --
            reps        CDATA        #IMPLIED -- 2nd reading (HR) --
            senate      CDATA        #IMPLIED -- 2nd reading (Sen) --
            assent      CDATA        #IMPLIED -- assent date --
            cdate       CDATA        #IMPLIED -- commencement -->
<!attlist regulations juris (cth | nsw | vic | qld | sa | wa | tas | act | nt | imp)
#REQUIRED -- jurisdiction --
            Year        CDATA        #REQUIRED -- year assented --
            number      CDATA        #REQUIRED -- act number
            reps        CDATA        #IMPLIED -- 2nd reading (HR) --
            senate      CDATA        #IMPLIED -- 2nd reading (Sen) --
            notified    CDATA        #IMPLIED -- notification date --
            cdate       CDATA        #IMPLIED -- commencement
<!attlist schedule id   ID           #IMPLIED -- legislation id --
            cdate       CDATA        #IMPLIED -- commencement --
            refsec      CDATA        #IMPLIED -- referring section -->
<!attlist chapter id    ID           #IMPLIED -- legislation id --
            cdate       CDATA        #IMPLIED -- commencement
<attlist part id        ID           #IMPLIED -- legislation id --
            cdate       CDATA        #IMPLIED -- commencement
<!attlist division id   ID           #IMPLIED -- legislation id --
            cdate       CDATA        #IMPLIED -- commencement
<!attlist subdivn id    ID           #IMPLIED -- legislation id --
            cdate       CDATA        #IMPLIED -- commencement
<!attlist section id    ID           #IMPLIED -- legislation id --
            cdate       CDATA        #IMPLIED -- commencement -->
<attlist subsec id      ID           #IMPLIED -- legislation id --
            cdate       CDATA        #IMPLIED -- commencement -->
<!attlist reg id        ID           #IMPLIED -- legislation id --
            cdate       CDATA        #IMPLIED -- commencement -->
<!attlist subreg id     ID           #IMPLIED -- legislation id --
            cdate       CDATA        #IMPLIED -- commencement -->
<!attlist l.ref ref     IDREF        #IMPLIED -- legislation idref -->
<!attlist term id       ID           #IMPLIED -- term id
]>
```

Industrial Applicability

It is apparent from the above that the arrangements described are applicable to the electronic publishing industry.

The foregoing describes only some embodiments of the present invention, and modifications and/or changes can be made thereto without departing from the scope and spirit of the invention, the embodiments being illustrative and not restrictive.

What is claimed is:

1. A computer readable medium for managing electronic information, comprising:
   a plurality of predefined portions of text-based data with at least one of said plurality of predefined portions of text-based data being stored;
   at least one modified predefined portion of text-based data, said at least one modified predefined portion of text-based data being created based at least in part on modifications to at least one of said plurality of predefined portions of text-based data; and said at least one modified predefined portion of text-based data being stored;
   a plurality of links comprising at least one of code or a markup language, at least one of said plurality of predefined portions of said text-based data and said at least one modified predefined portion of text-based data being associated with at least one of said plurality of links; and
   a plurality of attributes for organizing at least one of said plurality of predefined portions of text-based data and said at least one modified predefined portion of text-based data, at least one of said plurality of attributes defining a point in a multidimensional space.

2. The computer readable medium according to claim 1, wherein searching of the recording medium is allowed.

3. The computer readable medium according to claim 2, wherein said searching allows search based on one or more of the said plurality of attributes.

4. The computer readable medium according to claim 2, wherein said searching is based on at least one of (i) one or more of the said plurality of predefined portions of text-based data, (ii) said at least one modified predefined portion of text-based data, and (iii) a word or phrase within at least one or more of the said plurality of predefined portions of text-based data or said at least one modified predefined portion of text-based data.

5. The computer readable medium according to claim 1, wherein a search engine allowing search of at least one of said plurality of predefined portions of text-based data uses at least one of said plurality of attributes, wherein at least one of said plurality of attributes are associated with at least one of said plurality of predefined portions of text-based data for retrieving one or more of said plurality of predefined portions of text-based data by using at least one of said plurality of attributes to define a point in said multidimensional space.

6. The computer readable medium according to claim 1, wherein said text-based data is encoded using one or more Document Type Definitions (DTD) or Style Sheet Mechanisms (SSM).

7. The computer readable medium according to claim 1, wherein said plurality of links comprises any data in addition to the text-based data.

8. The computer readable medium according to claim 7, wherein at least one of said plurality of links comprises code or markup that allows departure and destination points to be created between said plurality of predefined portions of text-based data.

9. The computer readable medium according to claim 1, wherein at least one of said plurality of links comprises an identification code for a corresponding one of said plurality of predefined portions of text-based data.

10. The computer readable medium according to claim 1, wherein a first database comprises said plurality of predefined portions of text-based data.

11. The computer readable medium according to claim 10, wherein a second database comprises said plurality of attributes for managing said first database.

12. The computer readable medium according to claim 1, wherein at least one of said plurality of predefined portions of text-based data are associated with one or more attributes.

13. The computer readable medium according to claim 1, wherein at least one of said plurality of predefined portions of text-based data is capable of being modified by performing one of the group consisting of adding at least one attribute to said at least one of said plurality of predefined portions of text-based data, deleting at least one attribute from said at least one of said plurality of predefined portions of text-based data, and modifying at least one of the attributes of said at least one of said plurality of predefined portions of text-based data.

14. The computer readable medium according to claim 1, wherein at least one of said plurality of predefined portions of text-based data are capable of being modified by performing one of the group consisting of adding data to said at least one of said plurality of predefined portions of text-based data, deleting data from said at least one of said plurality of predefined portions of text-based data, and modifying data of said at least one of said plurality of predefined portions of text-based data.

15. The computer readable medium according to claim 1, wherein at least one of said plurality of predefined portions of text-based data comprises legislation.

16. The computer readable medium according to claim 15, wherein at least one of said plurality of predefined portions of text-based data is a provision of legislation.

17. The computer readable medium according to claim 16, wherein said provision of legislation is one of a section or schedule of an Act, or a section or schedule of a regulation.

18. The computer readable medium according to claim 1, wherein said recording medium is made from one of the group consisting of magnetic media, optical media, and magneto-optical media.

19. The computer readable medium according to claim 1, wherein at least one of said plurality of predefined portions of text-based data is a block of text-based data that is larger than a single word but smaller than an entire document.

20. The computer readable medium according to claim 1, wherein said multidimensional space is configured to permit point-to-point movement within said multidimensional space.

21. The computer readable medium according to claim 1, wherein a selectable link allows display of a first of versions of at least one of said plurality of predefined portions of text-based data.

22. The recording medium according to claim 1, wherein said electronic information comprises a document and wherein said document comprises more than one of said predefined portions.

23. The recording medium according to claim 1, wherein said electronic information comprises a computer file and wherein said computer file comprises more than one of said predefined portions.

24. The recording medium according to claim 1, wherein said multidimensional space includes at least two axes and wherein for each of said at least two axes, navigation along a first axis is possible both before and after making a unidirectional movement along a second axis.

25. The recording medium according to claim 1, wherein said multidimensional space includes a time axis.

26. The recording medium according to claim 25, wherein said time axis does not restrict navigation to predefined portions contained in the same document name.

27. The recording medium according to claim 25, wherein the time axis has the capability of representing intervals of time during which no version of the predefined portion is valid.

28. The recording medium according to claim 25, wherein navigation along the time axis can indicate that the predefined portion is inactive after a certain date.

29. The recording medium according to claim 1, wherein the multidimensional space comprises non-terminal nodes in a hierarchy and wherein said non-terminal nodes do not possess scope.

30. The recording medium according to claim 1, wherein the multidimensional space comprises non-terminal nodes in a hierarchy and wherein said non-terminal nodes do not possess content.

31. The recording medium according to claim 1, wherein the multidimensional space comprises non-terminal nodes in a hierarchy and wherein said non-terminal nodes possess neither scope nor content.

32. A computer-implemented method for managing electronic information, the method comprising:
   providing a plurality of predefined portions of text-based data with at least one of said plurality of predefined portions of text-based data being stored;
   providing at least one modified predefined portion of text-based data, said at least one modified predefined portion of text-based data being created based at least in part on modifications to at least one of said plurality of predefined portions of text-based data; and said at least one modified predefined portion of text-based data being stored;
   associating at least one of said plurality of predefined portions of text-based data and said at least one modified predefined portion of text-based data with at least one of a plurality of finks comprising at least one of code or a markup language; and
   a plurality of attributes for organizing at least one of said plurality of predefined portions of text-based data and said at least one modified predefined portion of text-based data, at least one of said plurality of attributes defining a point in a multidimensional space;
   wherein said multidimensional space is capable of or involves more than three dimensions.

33. The method according to claim 32, further comprising allowing searching within the system.

34. The method according to claim 33, wherein said searching is based on one or more of the said plurality of attributes.

35. The method according to claim 33, wherein said searching is based on at least one of (i) one or more of the said plurality of predefined portions of text-based data, (ii) said at least one modified predefined portion of text-based data, and (iii) a word or phrase within at least one or more of the said plurality of predefined portions of text-based data or said at least one modified predefined portion of text-based data.

36. The method according to claim 32, further comprising allowing searching of at least one of said plurality of predefined portions of text-based data using at least one of said plurality of attributes, wherein one of said plurality of attributes are associated with said plurality of predefined portions of text-based data for retrieving one or more of said plurality of predefined portions of text-based data by using at least one of said plurality of attributes to define a point in said multidimensional space.

37. The method according to claim 32, wherein said text-based data is encoded using one or more Document Type Definitions (DTD) or Style Sheet Mechanisms (SSM).

38. The method according to claim 32, wherein said plurality of links comprises any data in addition to the text-based data.

39. The method according to claim 38, wherein at least one of said plurality of links comprises code or markup that allows departure and destination points to be created between said plurality of predefined portions of text-based data.

40. The method according to claim 32, wherein at least one of said plurality of links comprises an identification code for a corresponding one of said plurality of predefined portions of text-based data.

41. The method according to claim 32, wherein a first database comprises said plurality of predefined portions of text-based data.

42. The method according to claim 41, wherein a second database comprises said plurality of attributes for managing said first database.

43. The method according to claim 32, wherein at least one of said plurality of predefined portions of text-based data are associated with one or more attributes.

44. The method according to claim 32, wherein at least one of said plurality of predefined portions of text-based data is capable of being modified by performing one of the group consisting of adding at least one attribute to said at least one of said plurality of predefined portions of text-based data, deleting at least one attribute from said at least one of said plurality of predefined portions of text-based data, and modifying at least one of the attributes of said at least one of said plurality of predefined portions of text-based data.

45. The method according to claim 32, wherein at least one of said plurality of predefined portions of text-based data is capable of being modified by performing one of the group consisting of adding data to said at least one of said plurality of predefined portions of text-based data, deleting data from said at least one of said plurality of predefined portions of text-based data, and modifying data of said at least one of said plurality of predefined portions of text-based data.

46. The method according to claim 32, wherein at least one of said plurality of predefined portions of text-based data comprises legislation.

47. The method according to claim 46, wherein at least one of said plurality of predefined portions of text-based data is a provision of legislation.

48. The method according to claim 47, wherein said provision of legislation is one of a section or schedule of an Act, or a section or schedule of a regulation.

49. The method according to claim 32, wherein at least one of said plurality of predefined portions of text-based data is a block of text-based data that is larger than a single word but smaller than an entire document.

50. The method according to claim 32, wherein said multidimensional space is configured to permit point-to-point movement within said multidimensional space.

51. The method according to claim 32, wherein a selectable link allows display of a list of versions of at least one of said plurality of predefined portions of text-based data.

52. The method according to claim 32, wherein the at least three dimensions are axes along which, or along some combination of which, point-to-point movement is permitted.

53. A computer-implemented system for managing electronic information, the system comprising:
    a plurality of predefined portions of text-based data stored in a memory device and accessible over a network with at least one of said plurality of predefined portions of text-based data being stored;
    at least one modified predefined portion of text-based data, said at least one modified predefined portion of text-based data being created based at least in part on modifications to at least one of said plurality of predefined portions of text-based data; and said at least one modified predefined portion of text-based data being stored so that the at least one of said plurality of predefined portions of text-based data and said corresponding modified predefined portion of text-based data are both stored;
    a plurality of links stored in said memory device comprising at least one of code or a markup language at least one of said plurality of predefined portions of said text-based data and said at least one modified predefined portion of text-based data being associated with at least one of said plurality of links; and
    a plurality of attributes for organizing and retrieving at least one of said plurality of predefined portions of text-based data and said at least one modified predefined portion of text-based data, at least one of said plurality of attributes defining a point in a multidimensional space;
    wherein at least one of said plurality of predefined portions of text-based data and said at least one modified predefined portion of text-based data are locatable by a processor executing instructions stored in said memory device by using at least one of plurality of attributes to define points in said multidimensional space.

54. A computer-implemented method for managing electronic information, the method comprising:
    providing a plurality of predefined portions of text-based data with at least one of said predefined portions of text-based data being stored;
    providing at least one modified predefined portion of text-based data, said at least one modified predefined portion of text-based data being created based at least in part on modifications to at least one of said plurality of predefined portions of text-based data; and said at least one modified predefined portion of text-based data being stored so that the at least one of said plurality of predefined portions of text-based data and said corresponding modified predefined portion of text-based data are both stored;
    associating at least one of said plurality of predefined portions of said text-based data and said at least one modified predefined portion of text-based data with at least one of a plurality of links comprising at least one of code or a markup language; and
    a plurality of attributes for organizing at least one of said plurality of predefined portions of text-based data and said at least one modified predefined portion of text-based data, at least one of said plurality of attributes defining a point in a multidimensional space;

wherein at least one of said plurality of predefined portions of text-based data and said at least one modified predefined portion of text-based data are locatable by using at least one of said plurality of attributes to define points in said multidimensional space.

55. A method for electronically managing text-based data, the method comprising:

dividing said text-based data into a plurality of portions of text-based data; amending at least one of said plurality of portions of text-based data;

storing at least one of said plurality of portions of text-based data; storing said amended portion of text-based data;

providing a plurality of attributes, wherein at least one of said plurality of attributes defines at least in part a manner in which at least one of said plurality of portions of text-based data and said amended portion of text-based data can is organizable and linkable in a multidimensional space;

associating at least one of said plurality of portions of text-based data and said amended portion of text-based data with at least one link comprising at least one of code or markup language enabled at least in part by at least one of said plurality of attributes;

enabling a user to search at least one of said plurality of portions of text-based data and said amended portion of text-based data using at least one of said plurality of attributes; and allowing the results of said search be available to a user by:

providing at least one of said plurality of portions of text-based data or said amended portion of text-based data in response to said search; and providing one or both of (I) text, or (ii) one or more selectable links representing at least one additional attribute.

56. The method according to claim 55, wherein said searching uses one or more attributes.

57. The method according to claim 55, wherein at least one of said plurality of portions of text-based data and said amended portion of text-based data are encoded using one or more Document Type Definitions (DTD) or Style Sheet Mechanisms (SSM).

58. The method according to claim 55, wherein said at least one link comprises any piece of information additional to the text of at least one of said plurality of portions of text-based data and said amended portion of text-based data.

59. The method according to claim 58, wherein said at least one link comprises code that allows departure and destination points to be created between at least one of said plurality of portions of text-based data and said amended portion of text-based data.

60. The method according to claim 55, wherein said at least one link comprises an identification code for a corresponding at least one of said plurality of portions of text-based data or said amended portion text-based data.

61. The method according to claim 55, wherein said amended portion of text-based data is amended by performing at least one of the group consisting of adding data to one of said plurality of portions of text-based data, deleting data from one of said plurality of portions of text-based data, and modifying data of one of said plurality of portions of text-based data.

62. The method according to claim 55, wherein at least one of said plurality of portions of text-based data and said amendment portion of text-based data comprises legislation or material related to a provision of said legislation.

63. The method according to claim 62, wherein at least one of the plurality of portions of text-based data is a respective provision of said legislation or material related to a provision of said legislation.

64. The method according to claim 63, wherein said provision is a section, schedule or appendix of an Act, or a section, schedule or appendix of a regulation.

65. The method according to claim 55, wherein at least one of said plurality of predefined portions of text-based data is a block of text-based data that is larger than a single word but smaller than an entire document.

66. The method according to claim 55, wherein said multidimensional space is configured to permit point-to-point movement within said multidimensional space.

67. The method according to claim 55, wherein a selectable link allows display of a list of versions of at least one of said plurality of predefined portions of text-based data.

68. A computer implemented system for managing electronic information, the system comprising:

a plurality of predefined portions of text-based data stored in a memory device with at least one of said plurality of predefined portions of text-based data being stored;

at least one modified predefined portion of text-based data also stored in said memory device, said at least one modified predefined portion of text-based data being created based at least in part on modifications to at least one of said plurality of predefined portions of text-based data; and said at least one modified predefined portion of text-based data being stored;

a plurality of links also stored in said memory device comprising at least one of code or a markup language, at least one of said plurality of predefined portions of said text-based data and said at least one modified predefined portion of text-based data being associated with at least one of said plurality of links; and a plurality of attributes for organizing at least one of said plurality of predefined portions of text-based data and said at least one modified predefined portion of text-based data, at least one of said plurality of attributes defining a point in a multidimensional space.

69. The system according to claim 68, wherein searching of a database is allowed.

70. The system according to claim 68, wherein said searching allows one or more searches based on one or more of the said plurality of attributes.

71. The system according to claim 68, wherein said searching is based on at least one of (i) one or more of said plurality of predefined portions of text-based data, (ii) said at least one modified predefined portion of text-based data, and (iii) a word or phrase within at least one or more of said plurality of predefined portions of text-based data or said at least one modified predefined portion of text-based data.

72. The system according to claim 68, further allowing search of at least one of said plurality of predefined portions of text-based data using at least one of said plurality of attributes, wherein at least one of said plurality of attributes is associated with said at least one of said plurality of predefined portions of text-based data for retrieving one or more of said plurality of predefined portions of text-based data by using at least one of said plurality of attributes to define a point in said multidimensional space.

73. The system according to claim 68, wherein at least one of said plurality of links comprise any data in addition to the text-based data.

74. The system according to claim 68, wherein at least one of said plurality of links comprises an identification code for a corresponding one of said plurality of predefined portions of text-based data.

75. The system according to claim 68, wherein at least one of said plurality of predefined portions of text-based data is associated with one or more attribute.

76. The system according to claim 68, wherein at least one of said plurality of predefined portions of text-based data comprises legislation.

77. The system according to claim 76, wherein said provision of legislation is one of a section or schedule of a statute, rule or regulation.

78. The system according to claim 68, wherein at least one of said plurality of predefined portions of text-based data is a block of text-based data that is larger than a single word but smaller than an entire document.

79. The system according to claim 68, wherein said multidimensional space is configured to permit point-to-point movement within said multidimensional space.

80. The system according to claim 68, wherein a selectable link allows display of a list of versions of at least one of said plurality of predefined portions of text-based data.

81. A method of electronically managing data, comprising the steps of:
providing at least one of a plurality of predefined portions of text-based data in a multidimensional space;
providing at least one modified predefined portion of text-based data in said multidimensional space;
providing a plurality of attributes identifying or describing characteristics of at least one of said plurality of predefined portions and said at least one modified predefined portion provided in said multidimensional space;
associating at least one of said plurality of predefined portions and said at least one modified predefined portion with at least one link, comprising either code or markup language, which link is associated with at least one of said plurality of attributes;
enabling a user to search at least part of said plurality of predefined portions or said at least one modified predefined portion, using at least one of said plurality of attributes;
allowing the results of said search to be published to a user by:
allowing the provision of a first predefined portion in response to said search, said first predefined portion corresponding to one of said plurality of predefined portions or said at least one modified predefined portion; and
allowing the provision of one or more links, wherein upon the selection of one of said one or more links, a second predefined portion is allowed to be displayed,
wherein said second predefined portion is related to said first predefined portion or said at least one modified predefined portion based on at least one attribute, and is represented by a point in said multidimensional space; and,
wherein said multidimensional space is an unbounded area capable of, or involving, more than three dimensions.

82. The method of claim 81 where the multidimensional space comprises a relational database.

83. The method of claim 81 wherein the plurality of attributes is comprised of one or more of a group including title, creation date, effective date, modification date, end date, identification number, version, author, user, document type, jurisdiction, time of view, or subject.

84. The method of claim 81 wherein the multidimensional space comprises multiple databases.

85. The method of claim 81 wherein the displayed portion and its related portion are not located on the same axis of the multidimensional space.

86. The method of claim 81 wherein the displayed second portion is not located on the same axis as the first predefined portion or said at least one modified predefined portion.

* * * * *